US010116456B2

(12) United States Patent
Jeong et al.

(10) Patent No.: US 10,116,456 B2
(45) Date of Patent: *Oct. 30, 2018

(54) METHOD AND APPARATUS FOR OPTIMIZING INTERNET COMMUNICATIONS

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,233

(22) Filed: Apr. 17, 2017

(65) Prior Publication Data

US 2017/0222819 A1 Aug. 3, 2017

Related U.S. Application Data

(63) Continuation of application No. 14/674,659, filed on Mar. 31, 2015, now Pat. No. 9,628,976.

(30) Foreign Application Priority Data

Jun. 23, 2014 (KR) .................. 10-2014-0076798
Aug. 13, 2014 (KR) .................. 10-2014-0104963
(Continued)

(51) Int. Cl.
*H04M 11/00* (2006.01)
*H04L 12/14* (2006.01)
(Continued)

(52) U.S. Cl.
CPC .......... *H04L 12/14* (2013.01); *G06Q 20/322* (2013.01); *H04L 12/1407* (2013.01);
(Continued)

(58) Field of Classification Search
None
See application file for complete search history.

(56) References Cited

U.S. PATENT DOCUMENTS 9,628,976 B2 * 4/2017 Jeong .................. H04W 4/24
2012/0281566 A1 11/2012 Pelletier et al.
(Continued)

FOREIGN PATENT DOCUMENTS

EP      2 670 174 A2    12/2013
WO   2006/040256 A1    4/2006

OTHER PUBLICATIONS

Huawei et al., Exposure of Network Service and Capabilities to 3rd Party, May 16, 2014, S1-141303, 3GPP TSG-SA WG1 Meeting #66, Sapporo, Japan.
(Continued)

*Primary Examiner* — Erika Washington
(74) *Attorney, Agent, or Firm* — Jefferson IP Law, LLP

(57) ABSTRACT

An apparatus and a method by a terminal in a wireless communication system are provided. The method includes transmitting first information including a public land mobile network identifier (PLMN ID) for a sponsored service, to a first server operated by a service provider, receiving, in response to the first information, second information including a token related to the sponsored service from the first server, transmitting third information requesting the sponsored service based on the token to a second server operated by a network operator corresponding to the PLMN ID, and receiving authentication information from the second server.

20 Claims, 26 Drawing Sheets

(30) Foreign Application Priority Data

Aug. 21, 2014 (KR) .................. 10-2014-0109232
Sep. 17, 2014 (KR) .................. 10-2014-0123867

(51) Int. Cl.
*H04W 4/24* (2018.01)
*G06Q 20/32* (2012.01)
*H04W 84/04* (2009.01)
*H04L 29/06* (2006.01)
*H04L 12/24* (2006.01)

(52) U.S. Cl.
CPC ...... *H04L 12/1439* (2013.01); *H04L 41/5029* (2013.01); *H04L 63/08* (2013.01); *H04W 4/24* (2013.01); *H04W 84/042* (2013.01); *H04M 2215/32* (2013.01)

(56) References Cited

U.S. PATENT DOCUMENTS

| | | |
|---|---|---|
| 2013/0316674 A1 | 11/2013 | Cho et al. |
| 2014/0141763 A1 | 5/2014 | Suh et al. |
| 2014/0165155 A1 | 6/2014 | Zhang |

OTHER PUBLICATIONS

3rd Generation Partnership Project; Technical Specification Group Services and System Aspects; Study on Machine-Type Communications (MTC) and Other Mobile Data Applications Communications Enhancements (Release 12), Dec. 2013, pp. 1-151, 3GPP TR 23.887, V12.0.0, Sophia Antipolis, France.

\* cited by examiner

METHOD AND APPARATUS FOR OPTIMIZING INTERNET COMMUNICATIONS

CROSS-REFERENCE TO RELATED APPLICATION(S)

This application is a continuation application of prior application Ser. No. 14/674,659, filed on Mar. 31, 2015, which will issue as U.S. Pat. No. 9,628,976 on Apr. 18, 2017, and claims the benefit under 35 U.S.C. § 119(a) of a Korean patent application filed on Jun. 23, 2014 in the Korean Intellectual Property Office and assigned Serial number 10-2014-0076798, of a Korean patent application filed on Aug. 13, 2014 in the Korean Intellectual Property Office and assigned Serial number 10-2014-0104963, of a Korean patent application filed on Aug. 21, 2014 in the Korean Intellectual Property Office and assigned Serial number 10-2014-0109232, and of a Korean patent application filed on Sep. 17, 2014 in the Korean Intellectual Property Office and assigned Serial number 10-2014-0123867, the entire disclosure of each of which is hereby incorporated by reference.

TECHNICAL FIELD

The present disclosure relates to a method and an apparatus for optimizing Internet communications. More particularly, the present disclosure relates to a method and an apparatus for effectively exchanging information between nodes in wireless communication systems, in order to optimize Internet communications.

BACKGROUND

In general, wireless communication systems have been developed to provide voice services allowing for a user's mobility. The wireless communication systems have been growing to encompass data services as well as voice services, and they have considerably advanced to provide high speed data services over recent years. However, the current wireless communication systems have limitations, such as a lack of resources, and insufficiency of high speed data services, so more advanced wireless communication systems are in demand.

In order to meet such demands, the 3rd Generation Partnership Project (3GPP) has standardized technology of the wireless communication system, based on various radio access networks (RAN) such as Evolved-Universal Mobile Telecommunications System (UNITS) Terrestrial Radio Access Network (E-UTRAN)/UTRAN/Global System for Mobile Communications (GSM) Edge RAN (GERAN).

A 3GPP standard-based communication system may support various kinds of services and devices. For example, the 3GPP standard-based communication system may support communication devices related to the Internet of Things (IoT), in which people are not, or are seldom involved, as well as typical communication devices, such as smart phones directly used by people. In addition, the 3GPP standard-based communication system may provide a device management service, and a communication service, by which specific information is transmitted to or received from devices, as well as voice services and multimedia services.

In the case of a multitude of devices that use the Internet of Things, short message service (SMS) messages and data, which are exchanged between the devices using the IoT, may increase. In this case, other services for the device may deteriorate due to the transaction of the messages.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for optimizing Internet communication. More specifically, the present disclosure provides a method and an apparatus for effectively exchanging information between nodes in a wireless communication system, in order to optimize Internet communication.

Another aspect of the present disclosure is to provide a method and an apparatus for controlling to maintain the quality of various services provided by the communication system, in which there are many devices that transmit and receive messages through communication provider networks, and by which the complexity of the system increases due to the same.

Another aspect of the present disclosure is to provide a method and an apparatus for preventing the quality of the Internet from deteriorating due to the exchange of short message service (SMS) messages or data, when there are many devices that transmit and receive messages through communication provider networks, thanks to the commercialization of the Internet of Things (IoT).

In accordance with an aspect of the present disclosure, a terminal in a wireless communication system is provided. The terminal includes a transceiver configured to transmit and receive a signal, and a controller configured to transmit first information including a public land mobile network identifier (PLMN ID) for a sponsored service, to a first server operated by a service provider, to receive, in response to the first information, second information including a token related to the sponsored service from the first server, to transmit third information requesting the sponsored service based on the token to a second server operated by a network operator corresponding to the PLMN ID, and to receive authentication information from the second server.

In accordance with another aspect of the present disclosure, a server in a wireless communication system is provided. The server includes a transceiver configured to transmit and receive a packet, and a controller configured to store first information related to a token authorized by the network operator and a service provider. The token corresponds to a public land mobile network identifier (PLMN ID) of the network operator, to receive second information requesting a sponsored service from a terminal, to determine whether the terminal is authorized to use the sponsored service based on the first information related to the token and the second information requesting the sponsored service, and to transmit third information indicating whether the terminal is authorized to use the sponsored service.

In accordance with another aspect of the present disclosure, a method by a terminal in a wireless communication system is provided. The method includes transmitting first information including a public land mobile network identifier (PLMN ID) for a sponsored service, to a first server operated by a service provider, receiving, in response to the first information, second information including a token related to the sponsored service from the first server, transmitting third information requesting the sponsored service based on the token to a second server operated by a network operator corresponding to the PLMN ID, and receiving authentication information from the second server.

In accordance with another aspect of the present disclosure, a method by a server in a wireless communication system is provided. The method includes storing first information related to a token authorized by the network operator and a service provider, wherein the token corresponds to a public land mobile network identifier (PLMN ID) of the network operator, receiving second information requesting a sponsored service from a terminal, determining whether the terminal is authorized to use the sponsored service based on the first information related to the token and the second information requesting the sponsored service, and transmitting third information indicating whether the terminal is authorized to use the sponsored service.

In addition, embodiments of the present disclosure may provide a method and an apparatus for changing services, such as data charging of a sponsored data service, or traffic, according to a contract between a service provider and a communication network provider, and the activities of a user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other objects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
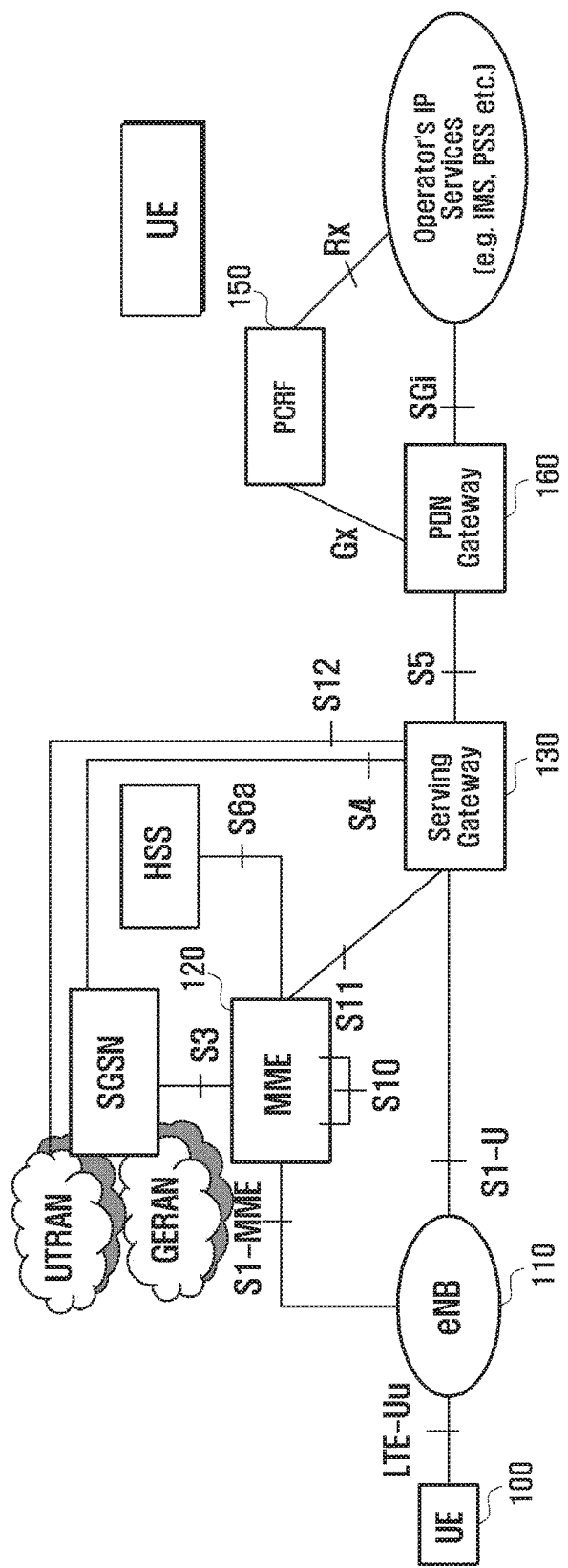
FIG. 1 is a diagram illustrating a structure of a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size.

The advantages and features of the present disclosure and ways to achieve them will be apparent by making reference to various embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more central processing units (CPUs) within a device or a security multimedia card.

In the following description of various embodiments of the present disclosure, a detailed description of known functions or configurations incorporated herein will be omitted when it is determined that the detailed description thereof may unnecessarily obscure the subject matter of the present disclosure.

Also, in a detailed description of various embodiments of the present disclosure, a basic $3^{rd}$ Generation Partnership Project (3GPP) Long Term Evolution (LTE) system will be considered as a main subject. However, various embodiments of the present disclosure may be applied even to other communication/computer systems having a similar technical background and a similar system form without significantly departing from the scope of the present disclosure. This applicability may be determined by those skilled in the art in the technical field of the present disclosure.

For example, the present technology directed to the LTE system may also be applied to the universal mobile telecommunications system (UMTS) terrestrial radio access network (UTRAN)/global system for mobile communications (GSM) edge RAN (GERAN) system having the similar system architecture. With regard to this, evolved Node B (eNB) RAN node may be replaced by radio network controller (RNC)/base station controller (BSC), serving gateway (S-GW) may be omitted or incorporated in serving general packet radio service (GPRS) support node (SGSN), and packet data network gateway (P-GW) may correspond to gateway GPRS support node (GGSN). Further, the concept of a bearer in the LTE system may correspond to a packet data protocol (PDP) context in the UTRAN/GERAN system.

Although the various embodiments of the present will be described on the assumption that the main service is a short message service (SMS), it is obvious for those skilled in the art to understand that the various embodiments of the present disclosure may be applied to other data services or message services, such as Internet protocol (IP)-based data communication services without departing from the scope of the present disclosure.

FIG. 1 is a diagram illustrating a structure of a communication system according to an embodiment of the present disclosure. The communication system may be a mobile communication system based on LTE according to an embodiment of the present disclosure.

Referring to FIG. 1, as shown in the drawing, a wireless access network of an LTE mobile communication system is comprised of an eNB or an evolved UTRAN (EUTRAN) 130, a mobility management entity (MME) 120, and an S-GW 130.

User equipment (UE) 100 may connect with external networks through the eNB 110, the S-GW 130, and a P-GW 160. The UE may make a PDN connection in order to transmit and receive data through the P-GW, and a single PDN connection may include one or more Evolved Packet System (EPS) bearers.

An application function (AF) 140 is a device for exchanging information related to applications with a user in the level of applications.

A policy charging and rules function (PCRF) 150 is a device for controlling a policy related to the quality of service (QoS) for the user, and a policy and charging control (PCC) rule corresponding to the policy is transferred to the P-GW 160 to be thereby applied.

The eNB 110 is a RAN node and the eNB 110 corresponds to an RNC of an UTRAN system and a BSC of a GERAN system. The eNB 110 is connected with the UE 100 through a wireless channel to play a role similar to the typical RNC/BSC.

User traffic including real-time services, such as a voice over IP (VoIP) service through the IP, is served through a shared channel in the LTE system. Therefore, a device that collects status information on the UE 100 for scheduling is required, and the eNB 110 may operate as such a device.

The S-GW 130 is a device for providing data bearers, and it may create and eliminate data bearers according to the control of the MME 120.

The MME 120 is a device for controlling various operations, and a single MME 120 may be connected with a plurality of eNBs.

The policy charging and rules function (PCRF) 150 is an entity for controlling overall QoS and charging of traffic.

Although not shown in the drawing, the communication system structure may include a mobile switching center (MSC), and a gateway mobile switching center (GMSC). The GMSC plays a role of a gateway to a communication provider network for circuit switched services, such as a voice service, or an SMS. The MSC is a device for controlling the circuit-switching (CS) domain.

Hereinafter, a method and an apparatus for optimizing Internet communications, according to an embodiment of the present disclosure, will be described. Particularly, a method and an apparatus for effectively exchanging information between nodes in a wireless communication system to optimize Internet communications will be described in the following embodiment. The following embodiment may be applied to a communication method of communication devices that support the Internet of Things (IoT).

When there are many user devices that transmits and receives messages through a communication provider network in a mobile communication system (e.g., when the number of user devices that use the IoT increases), or when the complexity of the system increases due to an increase in the number of user devices, the quality of various services provided by the communication system may be degraded. In order to address the problem above, the present embodiment will provide a method and an apparatus to improve communication efficiency in spite of deterioration of the quality of services provided by a communication system.

If the number of user devices that use a messaging service (e.g., an SMS) increases, other services (e.g., a voice service) may not be properly provided due to processing the messaging service, so the quality thereof may deteriorate. Therefore, a method and an apparatus for preventing the quality of other services for user equipment from deteriorating even with a multitude of user devices that use the messaging service, are required.

When the UE switches from an idle state to a connection state for the messaging service, it may be useless to configure the context for other services except for the messaging service. Accordingly, when the UE is provided with only the messaging service, a method and an apparatus for selectively configuring the context only for the messaging service are required.

Figure 2:
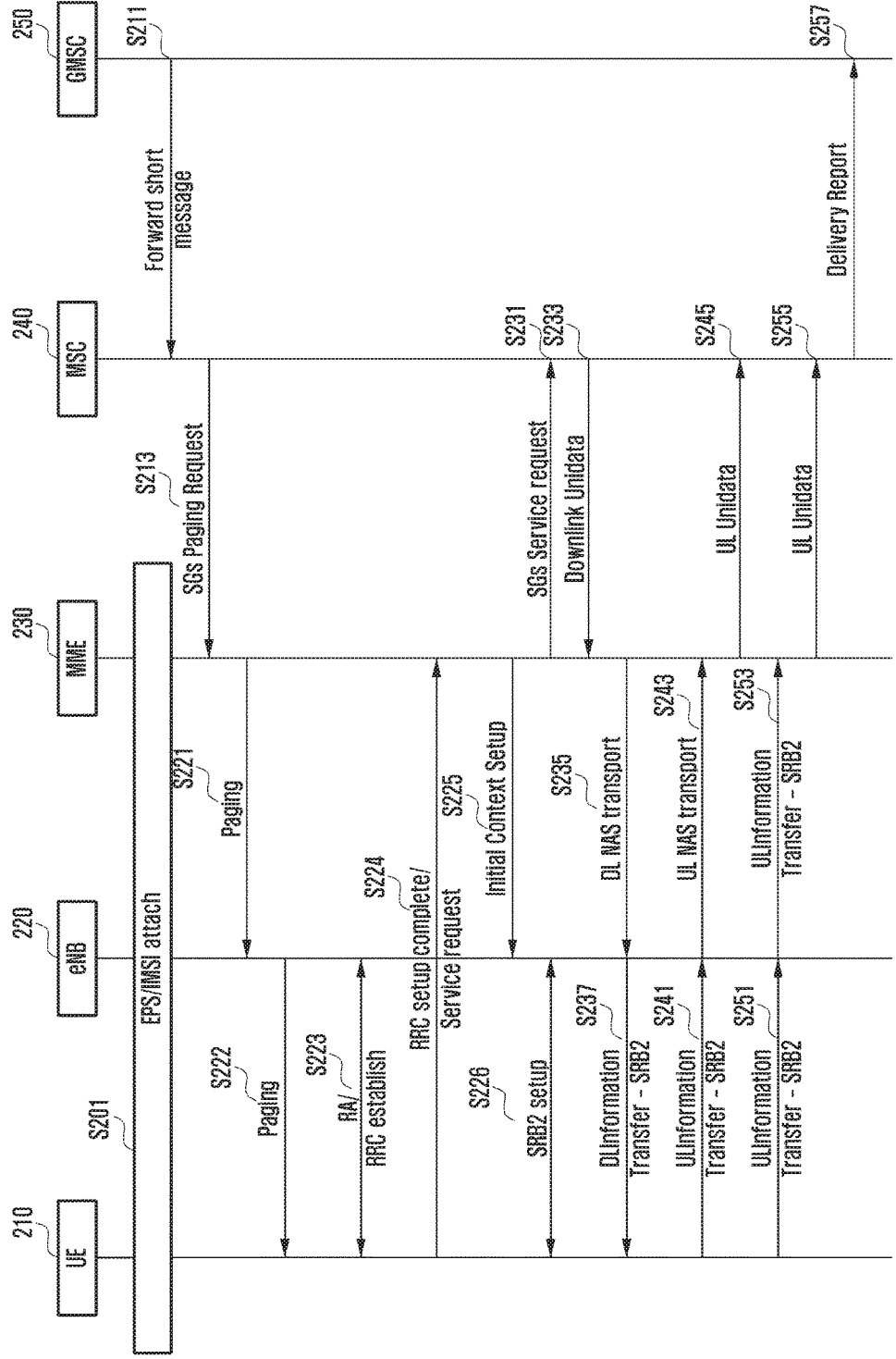
FIG. 2 illustrates an operation of user equipment (UE) and a communication system for transmitting messages according to an embodiment of the present disclosure.

FIG. 2 illustrates an operation of UE and a communication system for transmitting messages according to an embodiment of the present disclosure.

Referring to FIG. 2, a communication system according to the embodiment of the present disclosure may include UE 210, an eNB 220, an MME 230, an MSC 240, and a GMSC 250. Functions of the entities have been described with reference to FIG. 1 above.

The UE 210 has been attached to the communication provider network to thereby receive SMS messages at operation S201.

If the GMSC 250 receives a mobile terminating (MT) SMS message for the UE 210 from an external network, the GMSC 250 may forward the SMS message to the MSC 240 through, for example, a forward short message at operation S211.

When the MSC 240 receives the SMS message from the GMSC 250, the MSC 240 may transmit a message stating that a service for the UE has occurred, for example, a signalling gateway (SGs) service request message, to the MME 230 at operation S213.

The MME 230 may determine a paging operation according to connection status of the UE 210. If the UE 210 is in an idle mode, the MME may transfer a paging message to the eNB. If the UE 210 is in a connection mode, the operations S221 to S226 may be omitted. If the UE 210 is in the idle mode, the MME 230 may transmit a paging request message to the eNB at operation S221.

When the paging message is received from the MME 230, the eNB 220 may begin the paging operation with the UE 210 at operation S222.

The UE that has received the paging message from the eNB may perform an operation of random access and an operation of establishing an RRC connection at operation S223.

The UE 210 may transmit an RRC connection setup completion message that includes a service request message during the establishment of the RRC connection. The eNB 220 may forward the service request message received from the UE 210 to the MME 230 at operation S224.

The MME 230 may perform an operation of setting the context of the UE in the eNB 220 at operation S225.

The eNB 230 may perform the establishment of a signaling radio bearer (SRB) and a data RB (DRB) with the UE, according to the UE context received from the MME 230. In this operation, an SRB2 that is able to transmit a non-access stratum (NAS) message is established at operation S226.

The MME 230 may transmit a service request message, i.e., a message requesting for SMS transmission in the present embodiment, for example, an SGs service request message, to the MSC 240 at operation S231.

The MSC 240 may transmit the SMS message received from the GMSC 250 to the MME 230, wherein the SMS message may be included in an SGs downlink (DL) unidata message at operation S233.

The MME 230 may transmit the SMS message received from the MSC 240 to the UE 210 through the eNB 220. At this time, the MME 230 may include the SMS message in the NAS message (e.g., DL NAS transport, or DL generic NAS transport) to be thereby transmitted, and the NAS message is included in a message, e.g., an S1 Application Protocol (S1AP) DL NAS transport message, which is forwarded to the eNB, to be thereby transferred at operation S235. The 3GPP has determined that the SMS message is to be transmitted using the NAS message, even though the SMS message is not a control message but user data.

The eNB 220 may transmit the DL NAS transport message received from the MME 230 to the UE 210 using SRB2 (a "DLinformation" transfer message) at operation S237

The UE 210 may transmit an acknowledgement (ACK) message upon the receipt of the SMS message, and the ACK message is forwarded to the MSC 240 through the eNB 220, and the MME 230 in operations S241, S243 and S245. The UE 210 transmits the ACK message using SRB2 (an "uplink (UL) information" transfer message). The UE 210 may transmit ULInformation (Transfer—SIB 2) to the eNB 220 in operations S241. The eNB 220 may transmit UL NAS transport to the MME 230 in operations S243. The MME 230 may transmit UL Unidata to the MSC 240 in operations S245.

The UE 210 may transmit a delivery report stating that the received SMS message has been correctly stored, and the delivery report is forwarded to the GMSC 250 through the eNB 220, the MME 230, and the MSC 240 at operations S251, S253, S255, and S257. The UE may transfer the delivery report using SRB2 (the "ULinformation" transfer message).

Afterwards, the UE 210 may receive an ACK message in response to the delivery report through SRB2.

Although the operation of the UE and the network is described in the case of the MT (i.e., reception of messages) SMS message for the UE in the present embodiment, the operation of the UE and the network in the case of a mobile originating (MO) (i.e., transmission of messages) message may be similar to the same. The case of the MO message is different from the embodiment above in that the paging operation of the embodiment is not required, and the UE transmits an SMS message to the GMSC through the eNB, the MME, and the MSC. In addition, in the case of the MO message, the UE receives an ACK message in response to the SMS message from the GNSC, receives a delivery report of the SMS message from the GMSC, and transmits an ACK message in response to the delivery report to the GMSC. The UE transmits the ACK message for the SMS message or the delivery message using a UL message ("ULinformation" transfer/UL NAS transport), and receives the ACK message for the SMS message and the delivery report using a DL message ("DLinformation" transfer/DL NAS transport).

In addition, in the present embodiment, in order to transmit one SMS message to the UE, the NAS message transmission (using SRB2) is performed four times in total. Therefore, if the number of pieces of UE transmitting and receiving SMS messages increases, transmission of NAS messages may become frequent. Accordingly, as the transmission of SMS messages increases, the general NAS procedure (the TA update, the EPS session management (ESM) procedure, and the like) using the same SRB2 may be affected in operation thereof. Particularly, the devices using the IoT are more likely to use SMS messages as communication means, and in this case, frequent transmission and reception of SMS messages may degrade the quality of other services.

In addition, if priority of resource allocation to the SRB2 in the eNB is higher than those to the DRBs, the SMS message that is a kind of general user data is transmitted through the SRB2, so this may cause a delay of transmission of control messages through the DRB. For example, when SMS and IP Multimedia Subsystem (IMS)-based services are supported through the communication provider network and the number of SMS messages to be processed by the eNB increases, the resource allocation of the DBR for transmitting control messages, for example, an invite session initiation protocol (SIP) message for starting a voice call, of the IMS-based service may be delayed due to the resource allocation of the SRB2 for transmitting the SMS messages. In this case, the call configuration of a voice service, which is sensitive to the transmission delay, may be delayed due to the transmission of the SMS messages that are not sensitive to the transmission delay. Likewise, when the resource allocation for the DRB is delayed due to an increase in the number of SMS messages to be processed by the eNB, the resource allocation to the ongoing voice call (using an IMS media bearer) is not stable to thereby lower the quality of the voice service.

Hereinafter, a method and an apparatus to address the problems above will be described through the various embodiments of the present disclosure.

The first embodiment suggests that if NAS message transmission (e.g., message transmission through the SRB2) is carried out for user data, for example, SMS messages, the priority of a logical channel (LC) for the SRB2 is lowered for a predetermined time. The priority may mean priority of resource allocation to the LC, and resource scheduling for the LC may be performed based on the priority. In order to indicate the priority, indication information or priority values may be used. For example, the LC given a low priority value may be allotted with the resource first. The priority may indicate the order of resource allocation to a plurality of LCs in the same UE. Moreover, the priority may indicate the order of resource allocation to a plurality of LCs in a plurality of pieces of UE in the eNB. The priority set forth above may be applied to the embodiments of FIGS. 3 to 12.

Although typically, the NAS messages have not been separated according to a type, in the embodiment of the present disclosure, the NAS messages may be divided into NAS messages for user data (e.g., data for SMS messages), and general NAS messages. In addition, in the case of NAS message transmission for user data, the priority of the LC for the same may be adjusted. That is, the priority of the LC for the SRB2 may be configured to be lower than that of the LC for the general NAS message or the DRB for a predetermined time. The priority may correspond to the order of scheduling. In addition, a timer may be additionally adopted to set the time for adjusting the priority. This enables the other SRB2 (e.g., NAS procedure) or the DRB (e.g., IMS signaling, or media transmission) to be allotted with the resource, or prevents the delay of the resource allocation to the same, even with the occurrence of SRB2 transmission for user data.

Figure 3:
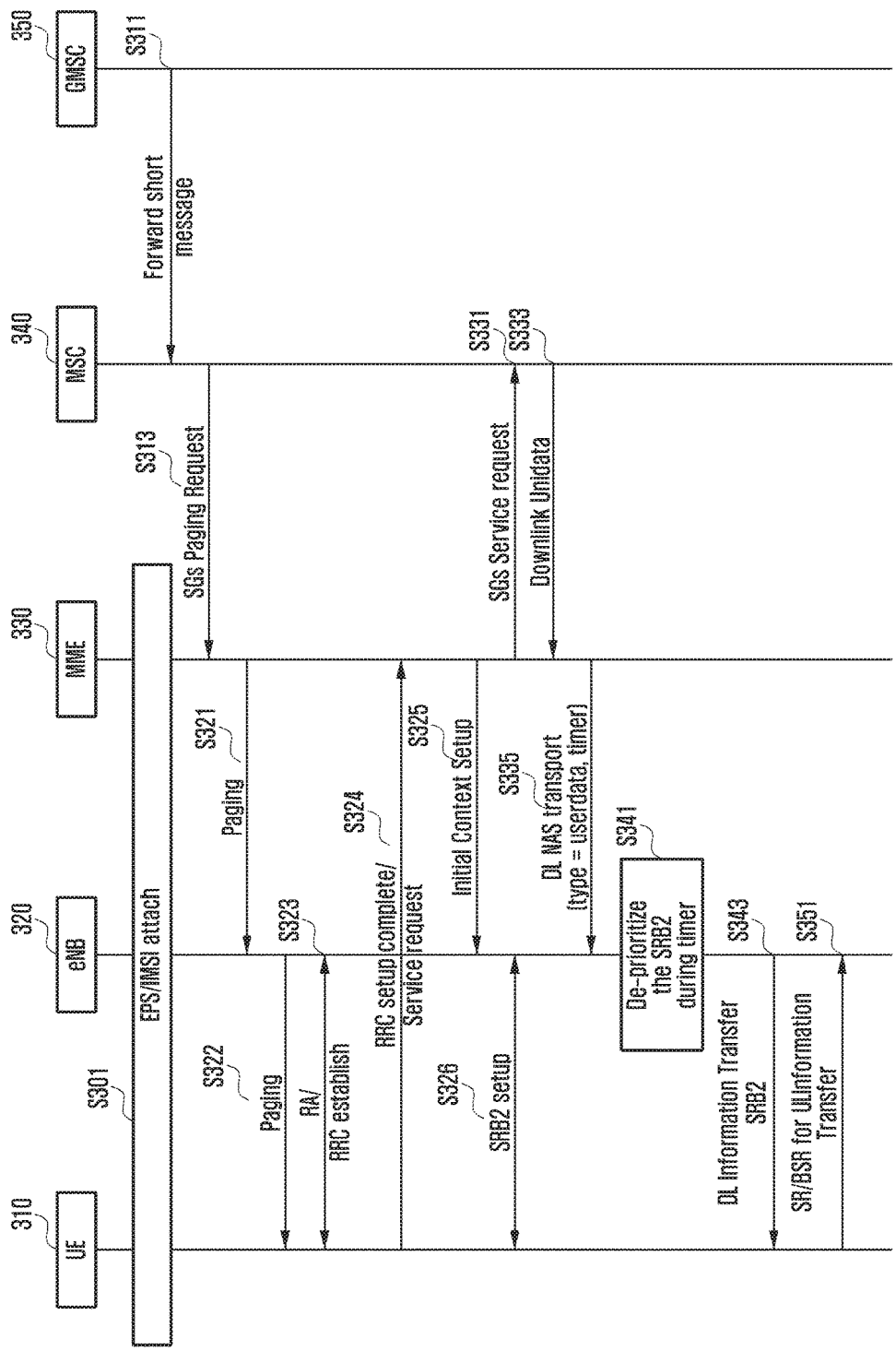
FIG. 3 illustrates an example for processing mobile terminating (MT) short message service (SMS) messages according to an embodiment of the present disclosure.

FIG. 3 illustrates an example for processing MT SMS messages according to an embodiment of the present disclosure.

Referring to FIG. 3, operations S301 to S333 of FIG. 3 are the same as operations S201 to S233 of FIG. 2, so the detailed description thereof will be omitted here.

The MME 330 may include information on the type of NAS message to be transmitted, i.e., information stating that the NAS message to be transmitted includes not the general EPS mobile management (EMM) or ESM message but the SMS message (or user data, or messages), in a message to be sent to the eNB 320 for SMS transmission, e.g., a DL NAS transport message at operation S335. The information may be configured as information showing transition priority of the NAS message including user information rather than information indicating the type of NAS message as describe above. In addition, the message may further include a timer. After transmitting the SMS message (user data, or messages), the eNB transmits message related to the SMS message using the SRB2. In doing so, the timer refers to a value corresponding to a specific amount of time for which the priority of scheduling for the LC of the SRB2 is temporarily lowered.

The eNB 320 may recognize information on the type of NAS message or priority information from the DL NAS transport message received from the MME, and based thereon, may adjust the priority of the LC corresponding to a bearer for transmitting the NAS message at operation S341. If the type of NAS message is configured as not the EMM or ESM message but the SMS message (user data, or messages), or the transition priority of the NAS message is configured to be low, in an S1-AP message, e.g., a DL transport message, received from the MME 330, the eNB 320 may lower the priority of scheduling (resource allocation) of the LC for the SRB2 used in transmitting the corresponding NAS message for a predetermined period of time. In addition, if the DL transport message, for example, the S1_AP message, includes a timer value, the eNB 320 may trigger the timer, and may maintain the low priority of scheduling of the LC for the SRB2 until the configured timer expires. The lowering of the priority of scheduling of the LC for the SRB2 may be applied to the case where the UE 310 requests resource allocation of the LC for the SRB2 for transmitting a UL NAS message, as well as the case of transmitting the DL NAS message. Although the eNB 320 receives the timer information from the MME in the present embodiment, the eNB 320 may have its own timer to be configured and triggered. For example, as a result of analyzing the received DL NAS transport message, if the NAS message relates to user data, or information instructing to lower the priority of the NAS message is included therein, the eNB 320 may configure and trigger the timer.

The eNB 320 may transfer the NAS message received from the MME 330 to the UE 310, based on the configured priority at operation S343. The UE 310 may transmit a UL NAS message in response to the NAS message received from the eNB 320 at operation S351. The priority of the LC and the configuration of the timer may be applied to resource allocation of the LC for the SRB2 in the case of UL transition of the UE 310 as well.

Figure 4:
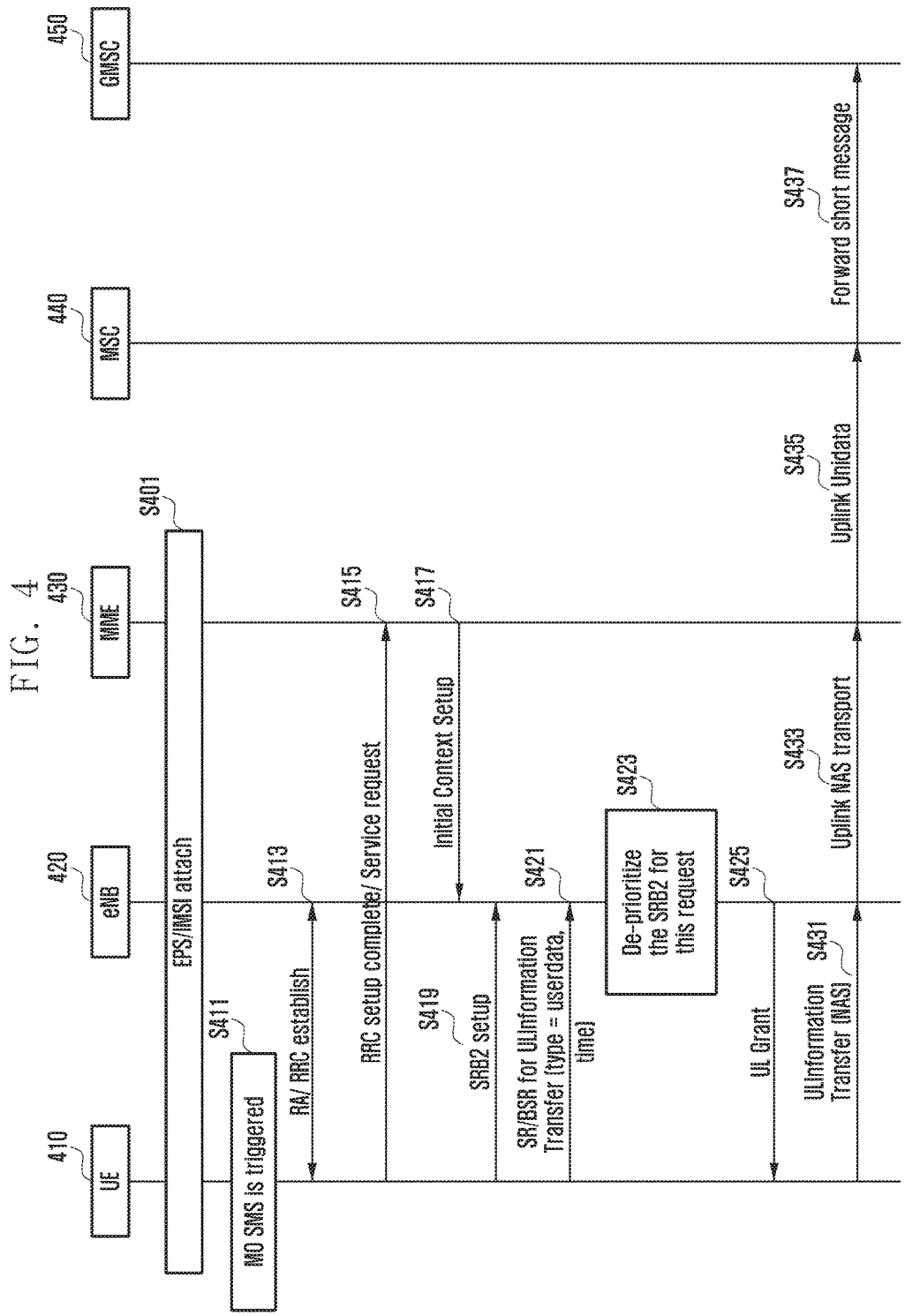
FIG. 4 illustrates an operation of user equipment and a network for processing mobile originating (MO) SMS messages according to an embodiment of the present disclosure.

FIG. 4 illustrates an operation of UE and a network for processing MO SMS messages according to an embodiment of the present disclosure.

Referring to FIG. 4, a UE 410 has been attached to the communication provider network to thereby transmit and receive data at operation S401.

The UE 410 may trigger an MO SMS message at operation S411.

If the UE 410 is in an idle state, the UE 410 may perform establishment of an RRC connection for SMS transmission at operation S413.

The UE 410 may transmit a service request message to an MME 430 through an eNB 430. The message is contained in an RRC setup completion message to be thereby transmitted to the eNB 420, and the eNB may forward the same to the MME 430 at operation S415.

The MME 430 may perform setting the context of the UE in the eNB 420.

The eNB 420 may perform establishment of an SRB and a DRB with the UE 410 in operation S419, according to the UE context received from the MME at operation S417. This is the operation of RRC connection reconfiguration.

After the setup of SRB2 is completed, the UE 410 may transmit a resource allocation request message, i.e., a scheduling request (SR) message, or a buffer status request (BSR) message for transmitting a message through the UL at operation S421. The message may include information on the type of NAS message to be transmitted, i.e., information stating that the NAS message to be transmitted includes not the general EMM or ESM message but the SMS message (user data, or messages). The information may be configured as information showing the transition priority of the NAS message rather than the information indicating the type of NAS message as describe above. In addition, the message may further include a timer. After transmitting the SMS message (user data, or messages), the eNB transmits message related to the SMS message using the SRB2. In doing so, the timer refers to a value corresponding to a specific amount of time for which the priority of scheduling for the LC of the SRB2 is temporarily lowered.

The eNB 420 may recognize that resource allocation to the SRB2 is required, but eNB 420 may recognize information on the type or the priority, based on the SR message or the BSR message received from the UE 410. If the type of information included in the scheduling request message of the UE 410 is configured not as the general EMM or ESM message but the SMS message (user data, or messages), or the transition priority of the NAS message is configured to be low, the eNB 320 may temporarily lower the priority of scheduling (resource allocation) of the LC for the SRB2 used in transmitting the corresponding NAS message. For example, the scheduling may be configured to be later than the LC for other bearers. In addition, if the S1_AP message, for example, the DL NAS transport message, includes a timer value, the timer may be triggered, the low priority of scheduling of the LC for the SRB2 may be maintained until the configured timer expires. The eNB 420 may configure and trigger the timer without receiving the timer information from the UE 410.

The eNB 420 may inform the UE of the UL grant according to the scheduling result at operation S425.

The UE 410 may transmit an NAS message including an SMS message using the UL resource allotted by the eNB 420 at operation S431. The message is included in an RRC information transfer message to be thereby transferred to the eNB 420. The eNB 420 may extract the NAS message from the RRC message received from the UE 410 to thereby forward the same to the MME 430 at operation S433, and the MME 430 may extract the SMS message from the NAS message to thereby forward the same to an MSC 440 at operation S435. Finally, the SMS message may be forwarded from the MSC 440 to a GSMC 450 at operation S437.

In transmitting the SMS message, the SRB2 is still used, but the priority thereof is temporarily lowered in the embodiment above. That is, considering that the UE transmits the SMS message using the NAS message, the priority of the LC for the SRB2 is adjusted upon the request for resource allocation to the LC for the SRB2. In addition to use of the SRB2, in the embodiment of the present disclosure, the UE may make a request to the eNB for resource allocation to the LC for other DRBs rather than the SRB2, and may transmit the NAS message including the SMS message using a UL resource allotted by the eNB.

Hereinafter, a method according to the second embodiment of the present disclosure in order to address the problem above will be described. In the present embodiment, a new type of RB is introduced to transmit or receive user data, such as SMS messages, through a control plane, so that the transmission quality of a general control plane message (i.e., EMM/ESM NAS messages), or the DRB that should be given a high priority, is prevented from deteriorating due to the user data, such as the SMS message, which is transmitted or received through the control plane.

Figure 5:
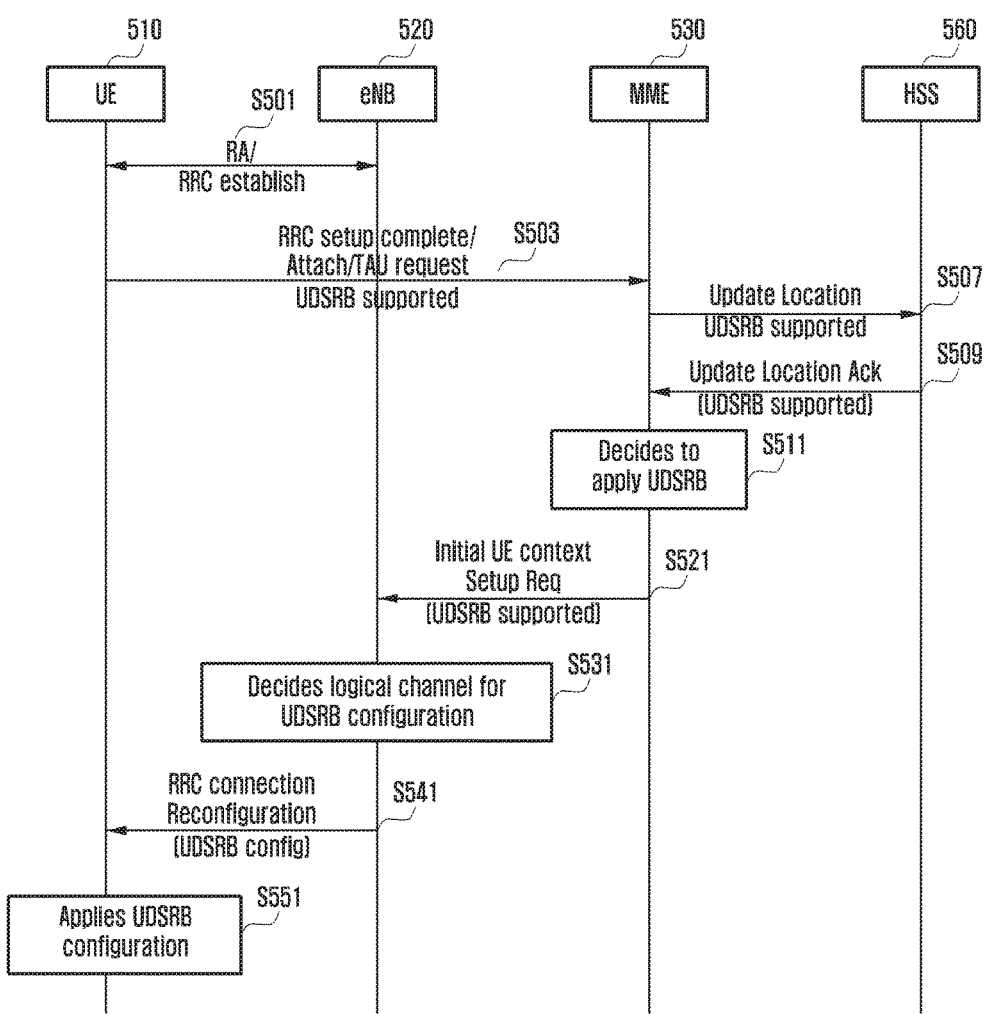
FIG. 5 illustrates an operation of configuring a radio bearer (RB) for transmitting user data through a control plane according to an embodiment of the present disclosure.

FIG. 5 illustrates an operation of configuring an RB for transmitting user data through a control plane according to an embodiment of the present disclosure. In the present description, the RB for transmitting user data through the control plane (NAS) is defined as a UDSRB for convenience of explanation, but it may be defined in another name such as SRB3.

Referring to FIG. 5, a UE 510 may perform an operation of RRC connection establishment for attaching thereof or TA updating at operation S501.

The UE 510 may transmit to an RRC setup completion message, an attaching message, or a TAU request message to an MME 530 through an eNB 520 at operation S503. The UE 510 may include information showing support of the UDSRB of the UE 510 or a request for support thereof in the RRC setup completion message, the attaching message, or the TAU request message.

The MME 530 may transmit an update location message for the UE 510 to a home subscriber server (HSS) 560 at operation S507. The MME 530 may include information showing whether or not the current network supports the UDSRB in the update location message for the UE 510, which is transmitted to the HSS 560. The information may be included in the case where information stating the UE 510 supports the UDSRB is received, or a request for supporting the UDSRB is received from the UE 510.

The HSS 560 may transmit an update location ACK message including subscription information of the UE 510 to the MME 530 at operation S509. If the UE is able to support the UDSRB or the UE has subscribed to a service using the UDSRB, the HSS 560 may include information showing that the UE supports the UDSRB in the subscription information (included in the update location ACK message) sent to the MME 530. In addition, the HSS 560 may forward basic QoS information (e.g., priority of resource allocation, charging information, and the like) of the UDSRB together with the information above to the MME 530.

The MME 530 may determine whether or not the UDSRB is to be applied to the UE 510 at operation S511. In doing so, the MME 530 may consider the support information of the UDSRB received from the UE 510, and the subscription information (UDSRB support information) received from the HSS.

Although the UE 510 transmits the support information of the UDSRB or the information including the UDSRB request to the MME in the present embodiment, the information above may not be included in the "Attach/TAU request" operation. In this case, the MME 530 may determine whether or not the UDSRB is to be applied, based on the subscription information received from the HSS 560.

When the MME 530 determines that the UDSRB is to be applied to the UE 510, the MME 530 may include information stating that the UDSRB is applied in a message when setting the UE context in the eNB 520 at operation S521. To this end, an S1_AP message. e.g., an initial UE context setup message, transmitted from the MME 530 to the eNB 520, may include information stating that the UDSRB is supported. In addition, when the MME 530 determines that the UDSRB is to be applied to the UE 510, the message may further include QoS information, for example, priority information for resource allocation, which is applied to the UDSRB as well as the information above.

When the UDSRB is to be applied to the UE 510, the eNB 520 may configure the UDSRB according to the UE context received from the MME 530 at operation S531. The configuration of the UDSRB includes creation of LC information for the UDSRB. That is, the bearer context of the UDSRB is configured between the MME and the UE, and the configuration of the UDSRB bearer includes creation of LC information corresponding to the UDSRB between the UE and the eNB.

In the case of applying the UDSRB to the UE 510, the eNB 520 may transfer information for configuring the UDSRB to the UE 510 at operation S541. At this time, the UDSRB information may be transmitted through an RRC connection reconfiguration message. For example, "SRB-ToAddMod" field of "RadioResourceConfigDedicated IE" in the RRC connection reconfiguration message may be utilized. At this time, the priority of the LC for the UDSRB may be designated in "LogicalChannelConfig" field included in the "SRB-ToAddMod", wherein the priority of the UDSRB may be configured to be lower those of other SRBs. In addition, the priority of the UDSRB may be configured to be lower than the LC of the DRB that is supposed to have a high priority, e.g., the DRB that uses QoS class identifier (QCI) 1 or QCI 5.

The UE 510 having received the UDSRB configuration information from the eNB 520, may create an UDSRB according to the configuration information. Afterwards, the SMS messages may be transmitted through a control plane using the UDSRB.

Although the UE transmits the information stating that the UDSRB is supported or the information on the request for the UDSRB to the core network (MME) through the NAS message in the present embodiment, such information may be transferred to the core network through the eNB using the RRC message. In this case, the UE may transfer the information in the form of UE radio capability or feature group indicator (FGI) in the process of RRC connection establishment or UE radio capability enquiry. If the eNB receives the information from the UE, the eNB may forward the same to the MME. At this time, an S1-AP message, e.g., an initial UE context setup response message or a UE radio capability match response message may be used.

Figure 6:
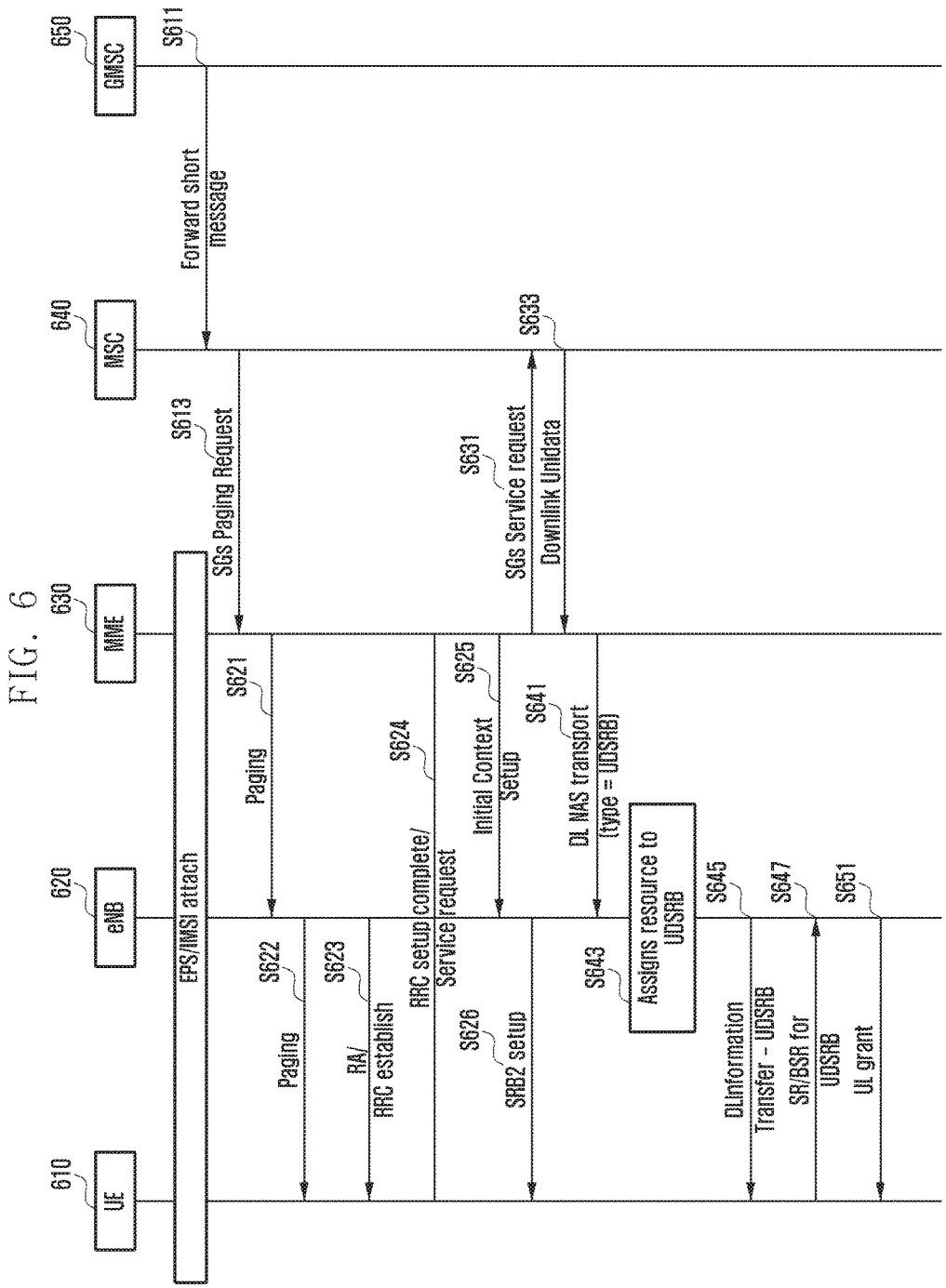
FIG. 6 illustrates an operation of user equipment and a network for processing MT SMS messages in a case of using a user data signalling RB (UDSRB) according to an embodiment of the present disclosure.

FIG. 6 illustrates the operation of a UE and a network for processing MT SMS messages in a case of using a UDSRB according to an embodiment of the present disclosure.

Referring to FIG. 6, operations S601 to S633 of FIG. 6 are the same as operations S201 to S233 of FIG. 2, so the detailed description thereof will be omitted here.

The MME 630 may transmit a message to the eNB 620 for SMS transmission at operation S641. The message may be, for example, a DL NAS transport message. The MME 630 may include information on the type of NAS message to be transmitted, i.e., information stating that the NAS message to be transmitted includes not the general EMM or ESM message but the SMS message (user data, or messages), in the message to be sent to the eNB 620. The information may be configured as information showing the transition priority of the NAS message rather than information indicating the type of NAS message as describe above.

The eNB 620 may forward the NAS message received from the MME 630 to the UE 610. If the type of NAS message is configured as not the EMM or ESM message but the SMS message (user data, or messages), or the transition priority of the NAS message is configured to be low, in an S1-AP message, e.g., a DL transport message, received from the MME 630, the eNB should use the UDSRB rather than the SRB2 when transmitting the corresponding NAS message. At this time, the eNB may apply the scheduling (resource allocation) of the LC for the UDSRB according to the UDSRB context at operation S643.

The eNB 620 may transmit the NAS message (including SMS messages) received from the MME 630 to the UE 610 using the allotted resource at operation S645. At this time, the RRC message used for the same (e.g., the "DLData-Transfer" message) may be transmitted using the UDSRB rather than the SRB2.

In the case where the UE 610 is to transmit packet data for a response (ACK) message to the received SMS message or a delivery report, the UE 610 may request resource allocation by transmitting an SR message or a BSR message of the LC for the UDSRB in operation S647.

The eNB 620, as set forth above, may allot the UL grant to the UE by applying the scheduling of the LC for the UDSRB at operation S651.

Figure 7:
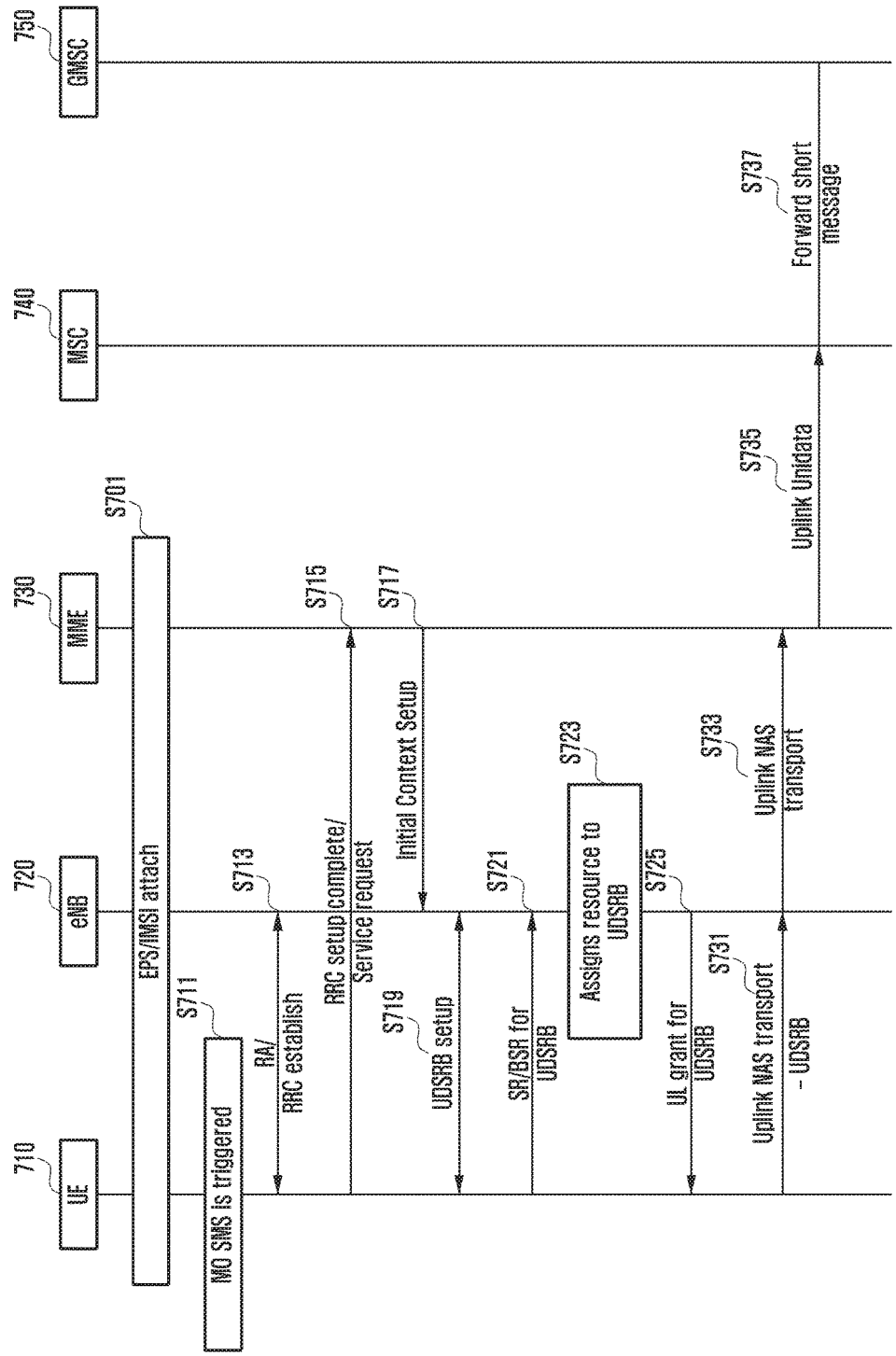
FIG. 7 illustrates an operation of user equipment and a network for processing MO SMS messages in a case of using a UDSRB according to an embodiment of the present disclosure.

FIG. 7 illustrates an operation of UE and a network for processing MO SMS messages in a case of using a UDSRB according to an embodiment of the present disclosure.

Referring to FIG. 7, operations S701 to S717 of FIG. 7 are similar to operations S401 to S417 of FIG. 4, so the detailed description thereof will be omitted here.

In operation S719, an eNB 720 may transmit information for UDSRB configuration to a UE 710. This operation is similar to operation S541 of FIG. 5. At this time, the information for UDSRB configuration may be transferred through the RRC connection reconfiguration message. In addition, the priority of the UDSRB may be configured to be lower than the LC of the DRB that is supposed to have a high priority, for example, the DRB that uses QCI 1 or QCI 5. After the UDSRB configuration is completed, the UE 710 may transmit a resource allocation request message, i.e., a scheduling request message, or a buffer status request message for transmitting the message through the UL at operation S721. The request message relates to the SMS message (or data transmitted through the control plane) of the UE, so the message corresponds to the LC of the UDSRB rather than the SRB2. That is, the LC of the SR or the BSR should be configured as the UDSRB.

The eNB 720 recognizes that resource allocation to the UDSRB is required, and may perform scheduling according to information (e.g., priority) on the LC for the UDSRB. As a result of the scheduling, the UDSRB may not be prioritized for the resource allocation, compared to the LC of SRB0/1/2 or the DRB of a high priority (e.g., the DRB of the bearer of QCI 1 or QCI 5) at operation S723.

The eNB 720 may inform the UE 710 of the UL grant according to the result of scheduling in operation S725.

The UE 710 may transmit an NAS message including an SMS message using the UL resource allotted by the eNB 720 at operation S731. This message is included in an RRC message, for example, a UL data transfer message, to be thereby forwarded to the eNB 720. The eNB 720 may extract the NAS message from the RRC message received from the UE 710 to thereby forward the same to the MME 730 at operation S733, and the MME 730 may extract the SMS message from the NAS message to thereby forward the same to the MSC 740 at operation S735. Finally, the SMS message may be transferred from the MSC 740 to the GSMC 750 at operation S737.

In the case of using the UDSRB as described above, the UE may transmit and receive data using a user plane (using the DRB), or using a control plane (using the UDSRB). In the case where data transmission/reception of the UE only through the control plane is required, information on the DRB does not need to be configured in the course of setting the context of the UE. That is, in the case of transmitting and receiving the data using only the UDSRB, the operation of configuring the DRB may be omitted to thereby reduce the number of exchanged messages and the size of the message. The third embodiment of the present disclosure will be described with reference to FIG. 8 below.

Figure 8:
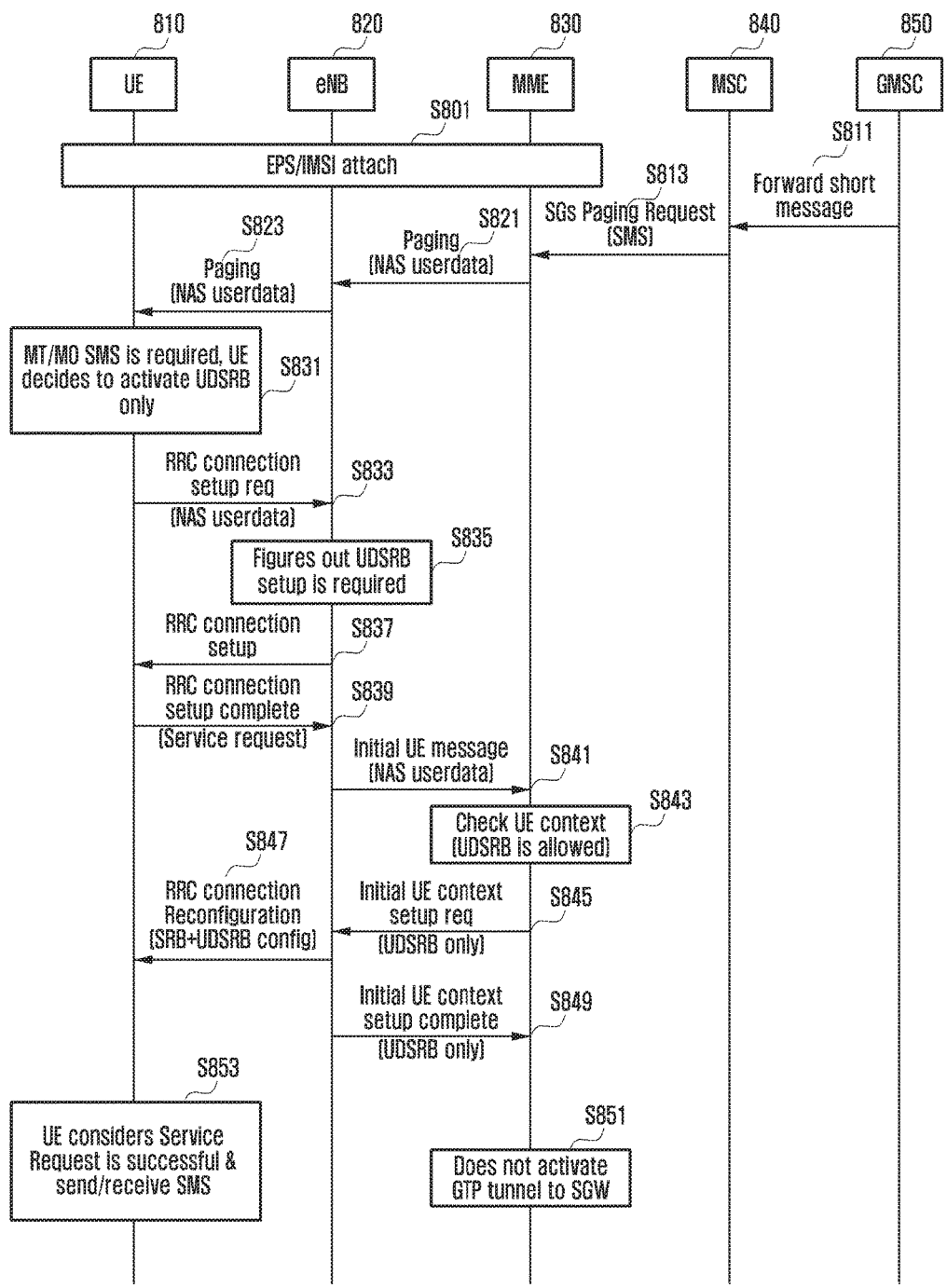
FIG. 8 illustrates an operation of user equipment in a case where data transmission/reception through a control plane is required without other packet switch (PS) data transmission/reception according to an embodiment of the present disclosure.

FIG. 8 illustrates an operation of a user device in a case where data transmission/reception though only a control plane is required without other PS data transmission/reception according to an embodiment of the present disclosure.

Referring to FIG. 8, operations S801 to S813 are similar to operations S201 to S213 of FIG. 2 as are a MSC 840 and GMSC 850 similar to MSC 240 and GMSC 250, so the detailed description thereof will be omitted.

If an MT SMS message (or data transmitted through the control plane) for a UE 810 occurs, an MME 830 may transmit data information transmitted through the control plane, or information on NAS user data to an eNB 820 during the paging operation at operation S821.

The eNB 820 may recognize the occurrence of the paging for the MT SMS message (or data transmitted through the control plane), based on the information received from the MME 820, and may include data information transmitted through the control plane, for example, information on NAS user data, in the paging message to thereby transmit the same to the UE.

The UE 810 may recognize that the SMS message or data is to be received through the control plane, based on the message received in operation S823. In this case, the UE 810 may determine whether or not there is general data to be transmitted and received through the user plane (DRB) at operation S831. Based on the determination result, the UE 810 may determine whether or not only the UDSRB is to be used. In addition, the creation of the DRB may be omitted.

When it is determined that there is no data to be transmitted and received through the user plane, the UE may perform operations S833 to S853 in order to receive data. When the MO data to be transmitted and received through the control plane occurs in the UE, the UE may determine whether or not there is general data to be transmitted and received through the user plane (DRB), and if it is determined that there is no data to be transmitted and received, the UE may perform operations S833 to S853 as described below, in order to receive the data.

The UE 810 may inform the eNB that an RRC connection needs to be established because of data transmission and reception through the control plane, in establishing the RRC connection at operation S833. This may be made by configuring the establishment cause of the RRC connection request message as "mo-NAS-userdata" (in the case of transmission), or "mt-NAS-userdata" (in the case of reception).

The eNB 820 may identify that the UE 810 wishes to establish the RRC connection because of data transmission and reception through the control plane, based on information received from the UE 810. Accordingly, the eNB may figure out that configuration of the context for the UDSRB is required, whereas configuration of the context for other DRBs is not required at operation S835.

The eNB 820 and the UE 810 may establish the RRC connection through operations S837 and S839.

After the establishment of the RRC connection, the eNB 820 may transfer an initial UE message to the MME 830 at operation S841. The information stating that the UE 810 makes establishment of the RRC connection because of data transmission/reception through the control plane may be transmitted when forwarding an initial UE message. For example, the UE 820 may transfer RRC establishment cause ("mo-NAS-userdata," or "mt-NAS-userdata") together. According to this, the MME 830 may figure out that configuration of the context for the UDSRB is required with respect to the UE, whereas configuration of the context for other DRBs is not required.

The UE 810 may include information stating that a data transmission/reception service through the control plane is requested in the initial UE message, e.g., the service request message, and may transmit the same. According to this, the MME 830 may figure out that configuration of the context for the UDSRB is required with respect to the UE 810, whereas configuration of the context for other DRBs is not required.

When the MME 830 recognizes that a data transmission/reception service through the control plane is requested by the UE, the MME 830 may determine whether or not the UDSRB may be used, that is, whether or not there is available context of the UDSRB for the UE at operation S843. When it is determined that the UDSRB is available for the UE and configuration of the context for other DRBs is unnecessary, the MME 830 may transmit a request message for setting the UE context to the eNB 820 at operation S845. For example, only the context of the SRB and the UDSRB may be included in the initial UE context setup request message to be thereby transmitted. Alternatively, the MME 830 may include information stating that only the SRB and the UDSRB are to be used for the UE in the message to be thereby transferred. In addition to the information, the MME 830 may further include QoS information to be applied to the UDSRB, for example, the resource allocation priority, in the message.

In the case of applying the UDSRB to the UE 810, the eNB 820 may configure the UDSRB according to the UE context received from the MME 830. The configuration of the UDSRB may include creation of LC information for the UDSRB. If the message received from the MME does not contain the context information of the DRB, or contains information stating that only the UDSRB and the SRB are to be used, the eNB may configure the SRB and the UDSRB without configuration of the DRB.

In the case of applying the UDSRB to the UE 810, the eNB 820 may transfer information for configuring the UDSRB to the UE 810 at operation S847. At this time, the UDSRB information may be transmitted through an RRC connection reconfiguration message. More specifically, "SRB-ToAddMod" field of "Radio Resource Config Dedicated IE" in the RRC connection reconfiguration message may be utilized. At this time, the priority of the LC for the UDSRB may be designated in "LogicalChannelConfig" field included in the "SRB-ToAddMod", wherein the priority of the UDSRB may be configured to be lower those of other SRBs. In addition, the priority of the UDSRB may be configured to be lower than the LC of the DRB that is supposed to have a high priority, e.g., the DRB that uses QCI 1 or QCI 5. In addition, the eNB 820 may information on the SRB in the message to be thereby transmitted.

The UE 810 having received the configuration information on the UDSRB and the SRB from the eNB 820, may create an UDSRB according to the configuration information. Afterwards, the SMS messages transmitted through the control plane may be transmitted using the UDSRB.

The eNB 820 may transmit a message to the MME 830 to inform that the setting of the context for the UE has been completed at operation S849. For example, the eNB 820 may inform the MME 830 of the completion of the context setup through an initial UE context setup completion message that may include information stating that the configuration has been completed using only the UDSRB and the SRB.

The MME 830 may determine whether or not creation/renewal of a SGW and a general packet radio service (GPRS) tunnelling protocol (GTP) tunnel is to be performed, based on the context setup completion message received from the eNB. In the case where only the UDSRB and the SRB are configured in the UE 810, the MME 830 does not perform the creation/renewal of the SGW and the GTP tunnel at operation S851. That is, the MME 830 may not perform an operation of transmitting a modify bearer request message.

The configuration of the UDSRB was described in the third embodiment of the present disclosure. However, the embodiment of the present disclosure may be applied to SMS messages using the SRB2 as shown in the first embodiment as well as the UDSRB configuration. That is, the SMS message or data may be transmitted or received using the SRB2 without configuration of the UDSRB that is a separate bearer for transmitting the SMS message or the user data through the control plane. In this case, likewise, when the DRB for transmitting and receiving general data does not need to be configured, only the SRB2 and the SRB may be configured. At this time, the configuration of the DRB may be omitted.

Since the SMS message has a predetermined message transmission pattern (i.e., SMS-ACK-Delivery Report-ACK transmission/reception) as mentioned above, the UE and the eNB may know when the transaction of the SMS message terminates. When the transaction of the SMS message is finished, the RRC connection with the UE may be disconnected to thereby reduce unnecessary battery consumption and prevent waste of available resources of the eNB. The fourth embodiment of the present disclosure will be described with reference to FIG. 9 below.

Figure 9:
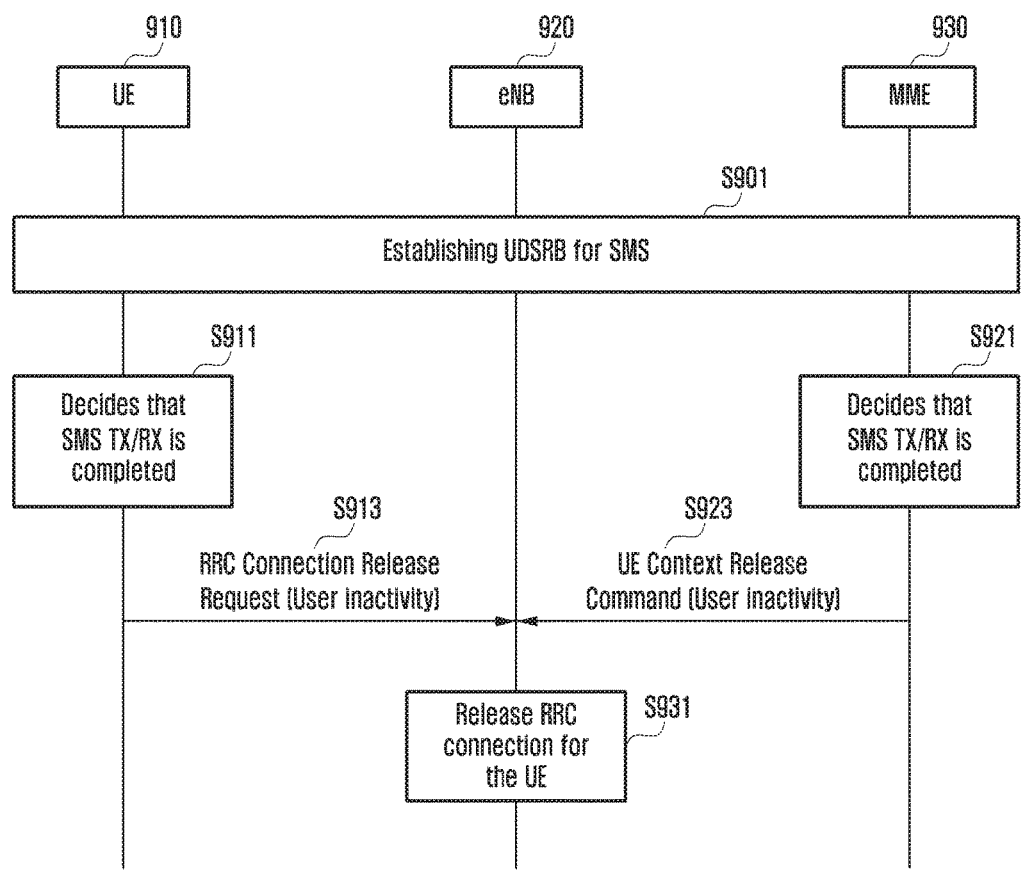
FIG. 9 illustrates an operation of releasing a radio resource control (RRC) connection when SMS transmission is completed according to an embodiment of the present disclosure.

FIG. 9 illustrates an operation of releasing an RRC connection when transmission of an SMS message is completed according to an embodiment of the present disclosure.

Referring to FIG. 9, in the present embodiment, a UE 910 and the network may transmit and receive data only through the control plane (i.e., the SRB and the UDSRB have been configured without configuration of the DRB), as described in the embodiment above at operation S901.

When the UE determines that transaction of the SMS message has been completed at operation S911, the UE may transmit an RRC connection release request to the eNB at operation S913. At this time, the UE 910 may further include information stating that there are no more activities of the UE, or data transmission has been terminated, in the request.

The MME may determine completion of the transaction of the SMS message. If the MME 930 determines that the transaction of the SMS message has been completed at operation S921, the MME 930 may transmit a UE context release request to an eNB 920 at operation S923. At this time, a MME 930 may further include information stating that there are no more activities of the UE 910, or data transmission has been terminated, in the request.

The eNB may recognize that the UE 910 may be disconnected through at least one of two processes above (informing by the UE, or informing by the MME). The eNB 920 that has recognized that the UE 910 may be disconnected, may release the signaling connection and all of resources for the UE 910 at operation S931. In addition, the eNB may transmit an RRC connection release message to the UE in order to disconnect the RRC connection with the UE.

Although the RRC connection release of the UE is requested based on the completion of the SMS message in the present embodiment, the UE may make a request for the RRC connection release in other cases, for example, in the case where the UE identifies that general data transmission and reception using the DRB has been completed.

In the embodiment above, the UE may make a request for the RRC connection release using an UE assistant information message. This message may include information on preferable power configuration of the UE, which has been turned to be in a low power consumption, information showing that activities of the user have been finished ("endofuserActivity"), an RRC connection release request, and the like. When the eNB receives the UE assistant information message including the information above from the UE, the eNB may release the RRC connection of the UE.

In addition, the UE may transmit the RRC connection release request message not to the eNB but to the MME. In this case, the UE may transmit the NAS message including information stating that the RRC connection need to be released or the activities of the user have been completed, to the MME. The MME having received the message may transmit an instruction for releasing the S1 or UE context to the eNB.

Figure 10:
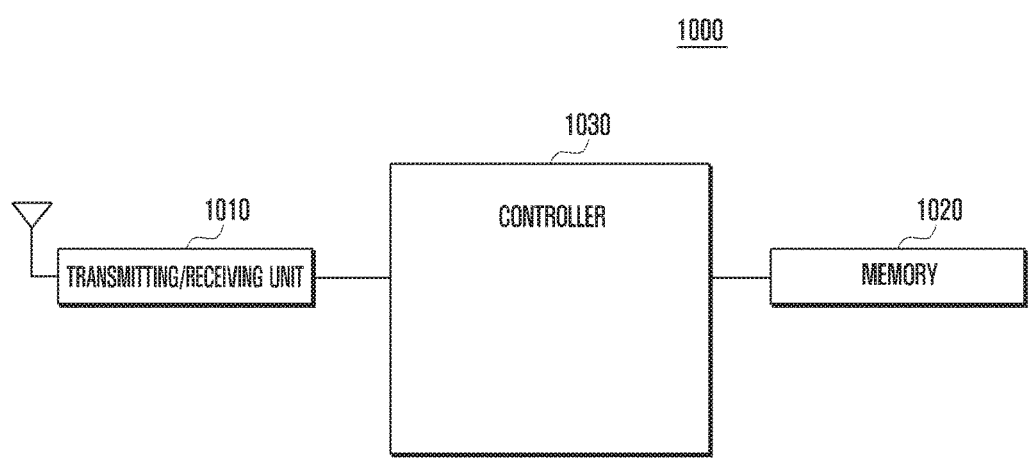
FIG. 10 is a block diagram of communication equipment according to an embodiment of the present disclosure.

FIG. 10 is a block diagram of communication UE according to an embodiment of the present disclosure.

Referring to FIG. 10, a UE 1000 may include a transmitting/receiving unit 1010, a memory 1020, and a controller 1030. The transmitting/receiving unit 1010 may communicate with at least one network node. The memory 1020 may store information and various programs for operating the UE 1000. The controller 1030 may control overall operations of the UE 1000. The controller 1030 may control the operation of the UE according to the first to the fourth embodiments of the present disclosure.

According to an embodiment of the present disclosure, the controller 1030 may control to transmit an attaching request message including UDSRB request information, or a TAU resource message, to receive the UDSRB configuration information from the eNB, to create an UDSRB, based on the UDSRB configuration information, and to receive user data through the control plane using the created UDSRB. At this time, the UDSRB may be an RB for transmitting and receiving the user data through the control plane.

In addition, the controller 1030 may control to establish a logical channel (LC) between the UE corresponding to the UDSRB and the eNB when creating the UDSRB. In addition, the controller may control to receive information on scheduling of wireless resources for the UDSRB from the eNB, and the priority of the UDSRB for scheduling may be configured to be lower than those of other SRBs or DRBs having QCI values in a predetermined range.

In addition, the controller 1030 may determine whether or not there is data to be transmitted or received through the user plane. If there is no data to be transmitted or received through the user plane, the controller 1030 may transmit the RRC connection request message for transmitting and receiving the user data using the control plane, and may control to omit the configuration of the DRB, in response to the RRC connection request message.

In addition, the controller 1030 may determine whether or not the transaction of the user data using the UDSRB is completed, and if it is determined to be completed, the controller 1030 may control to transmit the RRC connection release message to the eNB to thereby release the RRC connection with the eNB.

Although the UE 1000 is divided into blocks in configuration and functions in the present embodiment for convenience of explanation, the present disclosure is not limited thereto. In addition, the UE 1000 may perform the operation of the UE described in FIGS. 2 to 9 as well as the operation of FIG. 10.

In addition, the controller 1030 of the UE may control the UE to perform the operation described in the various embodiments as shown in FIGS. 13 to 26.

In addition, the controller 1030 may transmit first information including a public land mobile network identifier (PLMN ID) for a sponsored service, to a first server operated by a service provider, receive, in response to the first information, second information including a token related to the sponsored service from the first server, transmit third information requesting the sponsored service based on the token to a second server operated by a network operator corresponding to the PLMN ID and receive authentication information from the second server.

In addition, the controller 1030 may configure a packet filter for the sponsored service and identify volume of packet transmission and reception for the sponsored service based on the packet filter.

In addition, the controller 1030 may display information of the sponsored service based on the identified volume of packet transmission and reception for the sponsored service. The token includes at least one of information on allowed volume of packet transmission and reception for the sponsored service and information on allowed time of the sponsored service. Also, the display information includes at least one of information on remaining volume of packet transmission and reception for the sponsored service based on the information on allowed volume and the identified volume and information on remaining time of the sponsored service based on the information on allowed time.

In addition, the controller 1030 may display at least two applications related to each of at least two sponsored services. The application includes status information corresponding to the each of the sponsored service.

The sponsored service is a specific service that the service provider pays charge of a traffic between the terminal and the service provider to the network operator.

Figure 11:
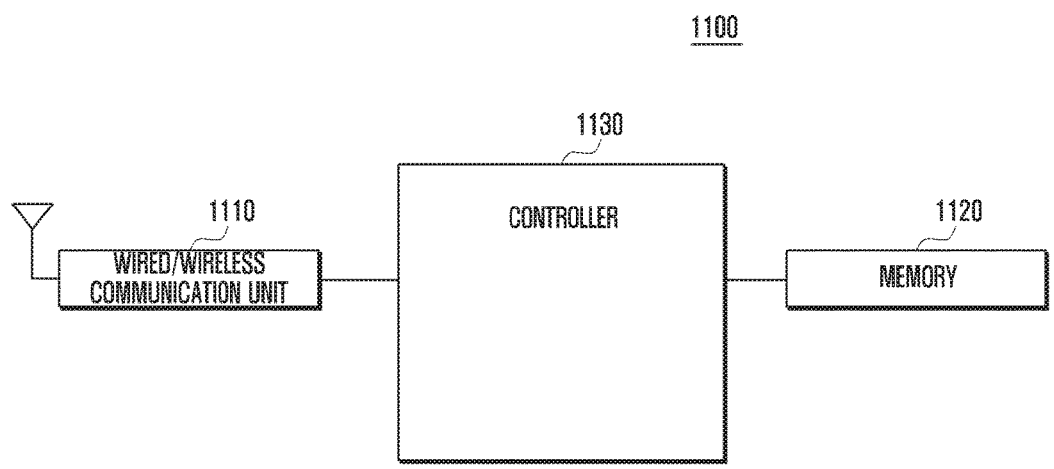
FIG. 11 is a block diagram of an evolved Node B (eNB) according to an embodiment of the present disclosure.

FIG. 11 is a block diagram of an eNB according to an embodiment of the present disclosure.

Referring to FIG. 11, an eNB 1100 may include a wired/wireless communication unit 1110, a memory 1120, and a controller 1130. The wired/wireless communication unit 1110 may communicate with at least one of the network nodes. The memory 1120 may store information and various programs for operating the eNB 1100. The controller 1130 may control overall operations of the eNB 1100. The controller 1130 may control the operation of the eNB according to the first to the fourth embodiments of the present disclosure.

According to an embodiment of the present disclosure, the controller 1130 may control to forward the attaching request message or the TAU resource message received from the UE to the MME, and to receive the UE context setup message including information indicating the support of the UDSRB for the UE, from the MME. In addition, the controller 1130 may control to configure the UDSRB in the UE, based on the UE context setup message, and to transmit and receive user data using the set UDSRB. At this time, the UDSRB may be an RB for transmitting and receiving the user data through the control plane.

In addition, the controller 1130 may control to establish a logical channel (LC) between the UE corresponding to the UDSRB and the eNB when creating the UDSRB.

In addition, the controller 1130 may control scheduling of wireless resources for the UDSRB in the UE, and the priority of the UDSRB for scheduling may be configured to be lower than those of other SRBs or DRBs having QCI values in a predetermined range.

Although the eNB 1100 is divided into blocks in configuration and functions in the present description for convenience of explanation, the present disclosure is not limited thereto. In addition, the eNB 1100 may perform the operation of the eNB described in FIGS. 2 to 9 as well as the operation of FIG. 11.

In addition, the controller 1130 of the eNB may support the UE to communicate with an upper layer node in the various embodiments as shown in FIGS. 13 to 26.

Figure 12:
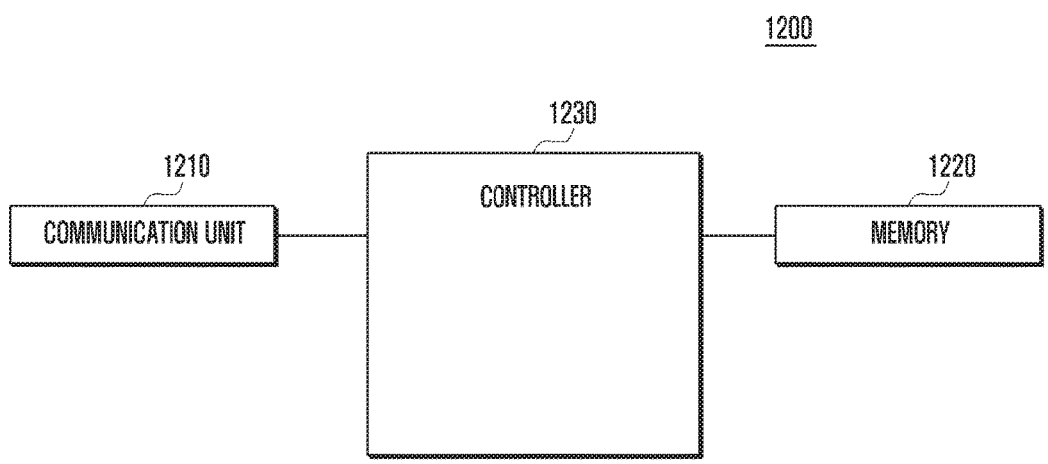
FIG. 12 is a block diagram of a mobility management entity (MME) according to an embodiment of the present disclosure.

FIG. 12 is a block diagram of an MME according to an embodiment of the present disclosure.

Referring to FIG. 12, an MME 1200 may include a communication unit 1210, a memory 1220, and a controller 1230. The communication unit 1210 may communicate with at least one of network nodes. The memory 1220 may store information and various programs for operating the MME 1200. The controller 1230 may control overall operations of the UE 1000. The controller 1030 may control the operation of the MME 1200 according to the first to the fourth embodiments of the present disclosure.

According to an embodiment of the present disclosure, the controller 1230 may control to receive the attaching request message, or the TAU resource message from the UE, and to transmit the location area update message to the HSS, based on the request message. In addition, the controller 1230 may control to receive subscriber information including the UDSRB support indication information of the UE from the HSS, and to determine the application of the UDSRB to the UE, based on the subscriber information. At this time, the UDSRB may be an RB for transmitting and receiving the user data through the control plane.

In addition, the controller 1230 may control to determine whether or not the UDSRB is applied to the UE, based on UDSRB request information included in the attaching message or the TAU request message and UDSRB support indication information of the subscriber information. In addition, when the UDSRB is determined to be applied, the controller 1230 may control to transmit the UE context setup message including the UDSRB support indication information, to the eNB.

In addition, the controller 1230 may determine whether or not there is data to be transmitted or received through the user plane for the UE. If there is no data to be transmitted or received through the user plane, the controller 1230 may control to transmit information stating that configuration of the DRB is not required.

Although the MME 1200 is divided into blocks in configuration and functions in the present description for convenience of explanation, the present disclosure is not limited thereto. In addition, the MME 1200 may perform the operation of the MME described in FIGS. 2, 3, 4, 5, 6, 7, 8, and 9, 19, and 20 as well as the operation of FIG. 12.

Although the various embodiments of the present disclosure have been described with reference to the drawings for convenience of explanation, the various embodiments may be performed independently, or by a combination thereof.

Although the GMSC and the MSC of a communication provider network are included the transmission path for SMS messages in the present specification and drawings for convenience of explanation and general understanding of the disclosure, the present disclosure is not limited thereto. The transmission path for SMS messages may include other network entities. For example, in the case of using T4/T5 interfaces, the MT SMS message may be transferred to an MTC-IWF through an SMS-SC/GMSC/IWMSC, and the MTC-IWF may forward the same to the MME.

A network provider may make an agreement with the third party (or service providers) to provide various services. For example, the network provider and the third party may make a sponsorship contract with each other to thereby provide a sponsored data or charging service by which the third party provides services in the communication provider network, and the third party pays for a traffic transmission/reception charge of the services on behalf of users.

For example, in the case where a shopping mall service provider makes an agreement with a communication network provider to thereby launch a sponsored data service for on-line shopping, the user may be provided with an on-line shopping service without payment for a communication data charge. In this case, the shopping service provider may expect an increase in sales due to an increase in the number of users, or advertisement income through the on-line shopping mall.

An operation of the present disclosure is described hereinafter by taking an example of cellular network, which, however, should be understood as explanation only, not to limit the present disclosure to the cellular network. It should be understood that various embodiments of the present disclosure may be applied to a network for catastrophe, a web real time communication (RTC), and so on as well as the cellular network.

Figure 13:
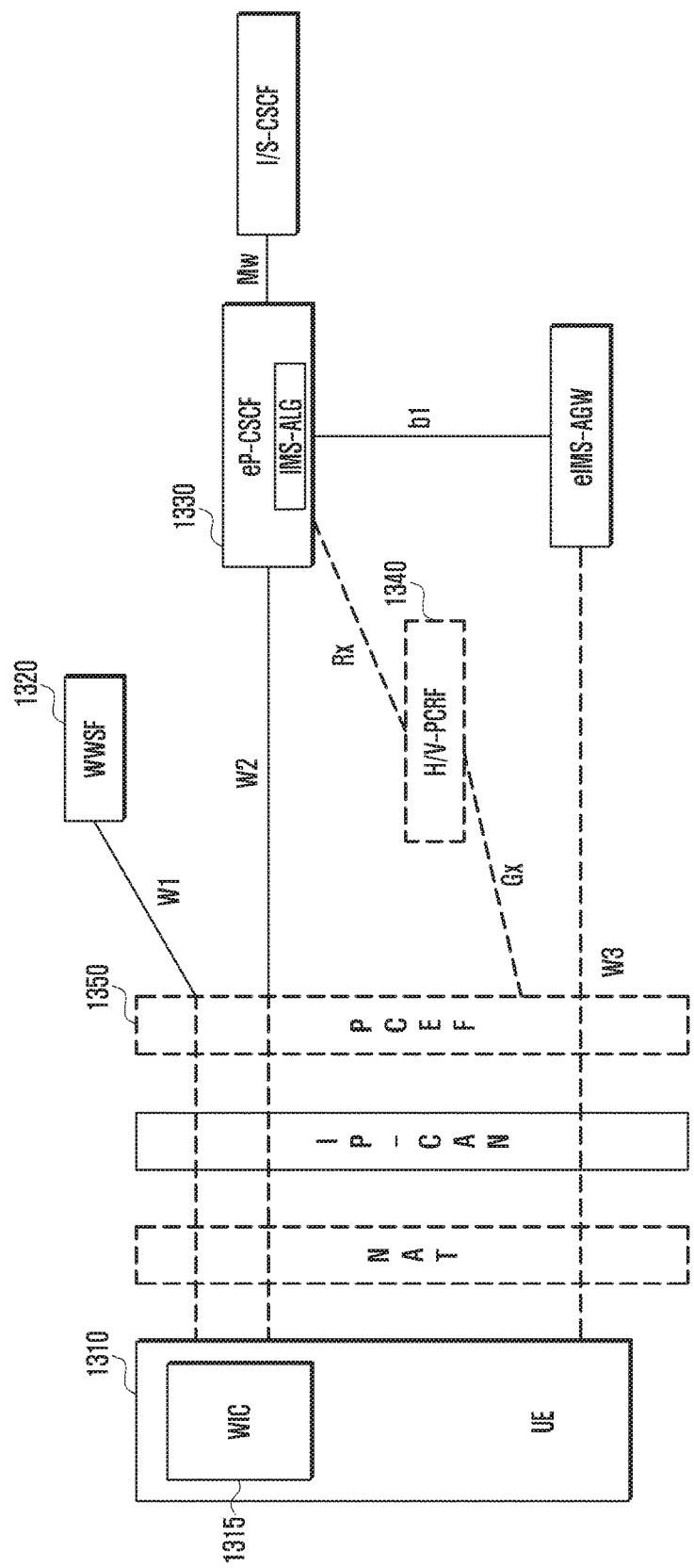
FIG. 13 illustrates a network structure for providing a sponsored data service according to an embodiment of the present disclosure.

FIG. 13 illustrates a network structure for providing a sponsored data service.

Referring to FIG. 13, a WebRTC IMS client (WIC) 1315 is client software for a specific communication service in a UE 1310. According to various embodiments of the present disclosure, the WIC 1315 may be a client for taking a web real-time communication (WebRTC) service of 3GPP.

A WebRT web server function (WWSF) 1320 is a web server introduced by the service provider for providing a service. In some of the various embodiments of the present disclosure, the WWSF 1320 may be a sever for providing the WebRTC service. The WWSF 1320 may include a communication unit for communication with another network node and a controller for controlling overall operations of the WWSF. The controller of the WWSF may control to perform the operation of the WWSF (a web server) that will be described with reference to FIGS. 14, 15, 16, 17, 18, 19, and 20.

An enhanced P-CSCF (eP-CSCF) 1330 is an improved proxy-call session control function (P-CSCF) for supporting an interworking service with the third party service provider. In some of the various embodiments of the present disclosure, the eP-CSCF 1330 may be an improved device for providing the WebRTC service. In general, the entity that performs additional operations for providing services is called a service enabling server (SES).

The SES 1330 may include a communication unit for communication with another network node, and a controller for controlling overall operations of the SES. The controller of the SES may control to perform the operation of the SES that will be described with reference to FIGS. 14 to 20.

A PCRF 1340 is an entity for generally controlling the QoS or charging for services of the providers, according to the present disclosure. The PCRF may include a communication unit for communication with another network node, and a controller for controlling overall operations of the PCRF. The controller of the PCRF may control to perform the operation of the PCRF that will be described with reference to FIGS. 14 to 20.

A P-GW 1350 (i.e., a policy and charging enforcement function (PCEF)) may apply and execute a rule, i.e., a policy and charging control rule, that is to be applied by the PCRF 1340. The P-GW may include a communication unit for communication with another network node, and a controller for controlling overall operations of the P-GW. The controller of the P-GW may control to perform the operation of the P-GW that will be described with reference to FIGS. 14 to 20.

Although the network structure for providing the 3GPP WebRTC service is adopted for the simplicity and clarification of explanation in the description of the drawings and the following various embodiments of the present disclosure, the primary subject matter of the present disclosure is not limited to the WebRTC service, and it may be applied to other web services without significant modification. In this case, the WIC 1315 inside the UE 1310 may be comprised of client software for general web services. In addition, the WWSF 1320, and the eP-CSCF 1330 may be comprised of a general web server, and a network device for supporting interwork between the network provider and the third party service provider, respectively.

In addition, the UE 1310 may refer to the WIC 1315 in the UE in the following various embodiments of the present disclosure.

Figure 14:
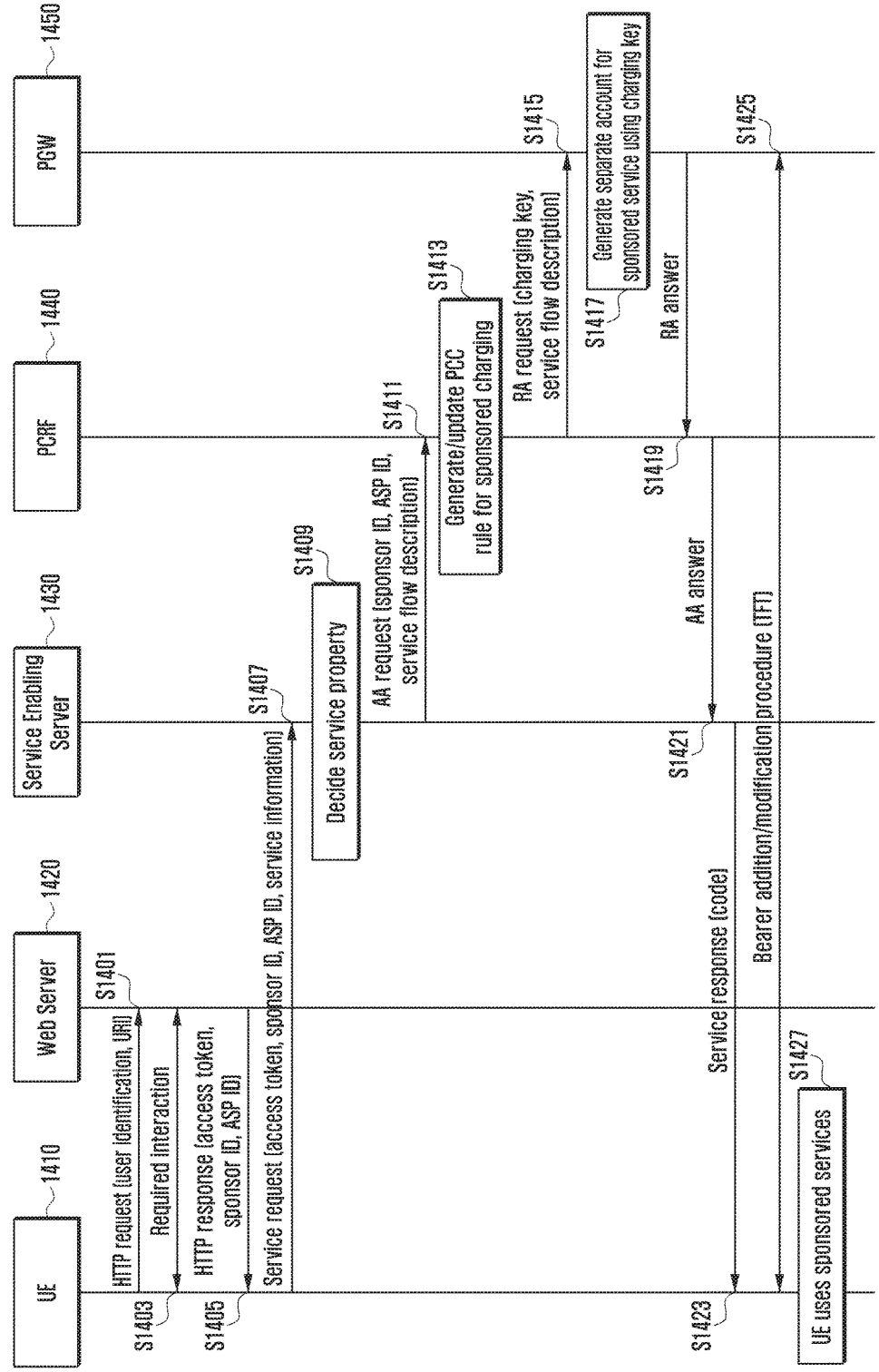
FIG. 14 illustrates a method for providing a sponsored data service to a user according to an embodiment of the present disclosure.

FIG. 14 illustrates a method for providing a sponsored data service to a user according to an embodiment of the present disclosure.

Referring to FIG. 14, A UE 1410 may transmit a request message to a web server (the WWSF) 1420 in order to take a web service provided at operation S1401. The message may be a message using hypertext transfer protocol (HTTP GET or POST methods, and may include a user ID, and a uniform resource identifier (URI) for requested pages or resources. The message may further includes a PLMN ID for the terminal.

The UE 1410 and the web server 1420 may additionally exchange messages with each other. During the operation of exchanging messages, information on mutual authentication between the UE and the web server may be exchanged at operation S1403.

The web server 1420 may transfer information for providing the web service of sponsored data to the UE 1410 at operation S1405. The message may be a message using HTTP GET, POST or PUT methods, and may include an access token that shows that access of the UE to the communication provider network and use of the sponsored data service have been approved. In addition, the message may further include a sponsor ID, and an application service provider identifier (ASP ID). Furthermore, the message may include a PLMN ID. Although the access token is separated from other service-related information in the description above, all kinds of service-related information may be included in the access token.

The access token is information that is configured in a format agreed by the service provider and the communication network provider, and the access token may be preliminarily issued by the communication network provider to be thereby transferred to the service provider. Particularly, the access token may contain information stating that the UE has been approved to use the sponsored data service, and may additionally include information showing the properties (e.g., maximum data usage, allowed time, the type of service, and the like) of sponsored data.

The access token is information to determine authority for a specific service or a resource, which is encoded according to a predetermined rule between the web server and the communication provider network (the SES in the present disclosure). In addition, in order to prevent abuse or spoofing thereof, the access token should be used under security according to a predetermined rule between the same. To this end, the following method may be used.

The network provider provides a group of access tokens that may be issued to users in the web server, and the web server uses the access tokens one by one.

The network provider and the web server have credible authentication information (e.g., pre-shared key), and create and verify the access token according to the same rule. For example, the web server creates the access token using at least one of a user ID, a service provider ID (the sponsor ID, or application service provider ID), current time, a PLMN ID, or other service-related information, and a pre-shared key. The communication provider network (SES) verifies whether or not a received access token is valid using the information above and the pre-shared key.

The UE 1410 may transmit a service request message for using a service through the communication provider network to a SES 1430 (or the eP-CSCF) at operation S1407. The SES 1430 may be an operator server (or a network operator server) and the operator server may be corresponding to the PLMN ID of the terminal. The message may be encoded using the HTTP protocol, or the SIP protocol. Particularly, in using the SIP protocol, the message may use a register method or an invite method. The request message may include the access token received in the operation above. In addition, the request message may further include the sponsor ID and the ASP ID. In addition, the request message may further include the PLMN ID of the communication network provider. In addition, the request message may further include additional information (e.g., ID, or address) of the web service to be provided to the user.

The SES 1430 (or network operator server) stores information related to the access token. The access token is information that is configured in a format agreed by the service provider and the communication network operator server, and the access token may be preliminarily issued by the communication network operator server to be thereby transferred to the service provider. The access token may correspond to a PLMN ID of the network operator server. The SES 1430 may check whether the UE is entitled to use the sponsored data service through the information receive from the UE at operation S1409. The SES 1430 may check whether the UE is entitled to use the sponsored data service based on the information received from the UE and the information related to the access token. During the operation, the SES 1430 may use a part of or all of the access token transmitted from the UE 1410. In addition, the SES 1430 may perform information exchange with the UE 1410 for additional authentication and security.

The network operator server may include a transmitting/receiving unit, a memory, and a controller. In addition the controller is configured to store first information related to a token authorized by the network operator and a service provider, wherein the token corresponds to a PLMN ID of the network operator, receive second information requesting the sponsored service from a terminal, determine whether the terminal is authorized to use the sponsored service based on the first information related to the token and the second information requesting the sponsored service and transmit third information indicating whether the terminal is authorized to use the sponsored service. The sponsored service is a specific service that the service provider pays charge of a traffic between the terminal and the service provider to the network operator.

If the UE 1410 is entitled to use the sponsored data service, the SES 1430 may transmit a policy configuration request message to a PCRF 1440 to begin the sponsored data service at operation S1411. The message may use a diameter protocol. The message may use one of the instructions, such as "AA request," "Accounting request," "Credit-Control request," or "Re-Auth request." The message may include the sponsor ID and the ASP ID. In addition, the message may further include the PLMN ID of the communication network provider.

In addition, the message may include a service descriptor by which a service data flow of an actual service may be recognized. The service descriptor may include at least one of an IP address, a port, a domain name, an application ID, or a URI, by which the service is to be provided. In addition, the message may include information showing the properties (e.g., data usage, allowed time, charging method, and the like) of the sponsored data service, and the information may be obtained through a part of or all of the access token received from the UE. Hereinafter, a service descriptor and a service flow descriptor are regarded as the same meaning.

The PCRF 1440 may create a PCC rule, based on the information received from the SES 1430, or may renew an old PCC rule that has been previously created for use at operation S1413. Particularly, the created or renewed PCC rule may include information on the sponsored data.

The PCRF 1440 may transmit a message for transferring the created or renewed PCC rule to a P-GW 1450 (PCEF) at operation S1415. The message may use a diameter protocol. The message may use one of the instructions, such as "AA request," "Accounting request," "Credit-Control request," or "Re-Auth request." The message may include a charging key for separate charging of the sponsored data. The charging key for the sponsored data service may not be allotted to each user, but the charging key may be allotted to be shared with respect to a specific sponsor and a specific application service provider. In addition, the message may include a service descriptor by which a service data flow (SDF) to be charged according to the sponsored charging method may be identified. If the UE is not entitled to use data services except for the sponsored data service, the service descriptor may be configured so that a gate is closed in the case of the SDF except for the SDF to which the sponsored charging is applied.

The P-GW 1450 (PCEF) may begin to control charging and traffic according to the received PCC rule at operation S1417. Particularly, the sponsored data is charged for, by using not a general charging method but the received charging key. In the case where use of specific data is not allowed (e.g., when all of data services except for the sponsored data service are blocked), the PCEF 1450 may control traffic according to the gate status of the received PCC rule.

The P-GW 1450 may transmit a response message informing that the requested PCC rule has been successfully applied, to the PCRF 1440 at operation S1419. The message may use one of the instructions, such as "AA request," "Accounting request," "Credit-Control request," or "Re-Auth request."

The PCRF 1440 may transmit a response message informing that the rule for the request sponsored data service has been successfully applied, to the SES 1430 at operation S1421. This message may use a diameter protocol. The message may use one of the instructions, such as "AA request," "Accounting request," "Credit-Control request," or "Re-Auth request."

The SES 1430 may transmit a message informing that registration of a service is completed, to the UE 1410 at operation S1423. This message may be encoded using the HTTP protocol, or the SIP protocol. Particularly, in the case of using the SIP protocol, the message may be a message using 200 OK. The message may include information stating that the sponsored data service has been applied. In addition, the message may include information (e.g., maximum allowed data usage, allowed time, and the like) of the sponsored data service. The message may include authentication result which indicates whether the UE 1410 has an authority to use, perform or apply the sponsored data service.

When the creation or correction of an EPS bearer is required due to the sponsored data service, the P-GW 1450 may trigger an operation for the same at operation S1425. In this operation, packet filters created by the P-GW 1450 for the sponsored data service may be installed in the UE. In the case where use of specific data is not allowed (e.g., when all of data services except for the sponsored data service are blocked), the UE 1410 may be installed with packet filters that are configured to allow packet transmission/reception for a specific IP flow as well.

The UE 1410 may use the web service in the sponsored data method. When information on the sponsored data service is received through the operation above, the information may be displayed to the user at operation S1427. The UE 1410 may output or display additional information according to the methods described FIGS. 21 to 26.

The access token may include more detailed information for the sponsored data service in the various embodiments of the present disclosure. For example, the access token may include information on user grades. That is, the provided sponsored data service may be differentiated depending on the UE grades (or priority). To this end, the service provider may issue the access token to be different according to the service grades of users, and the UE 1410 that has received the access token may forward the same to the SES 1430. Then, the SES 1430 may separate user grades according to the access token. According to this, the properties (e.g., maximum allowed data usage, allowed time, charging method, and the like) of the sponsored data service may be differentiated. More specifically, for example, the sponsored data service may be given up to 1 GB to the UE 1410 of more than a predetermined grade, whereas it may be given up to 200 MB to the UE 1410 of less than the predetermined grade.

Figure 15:
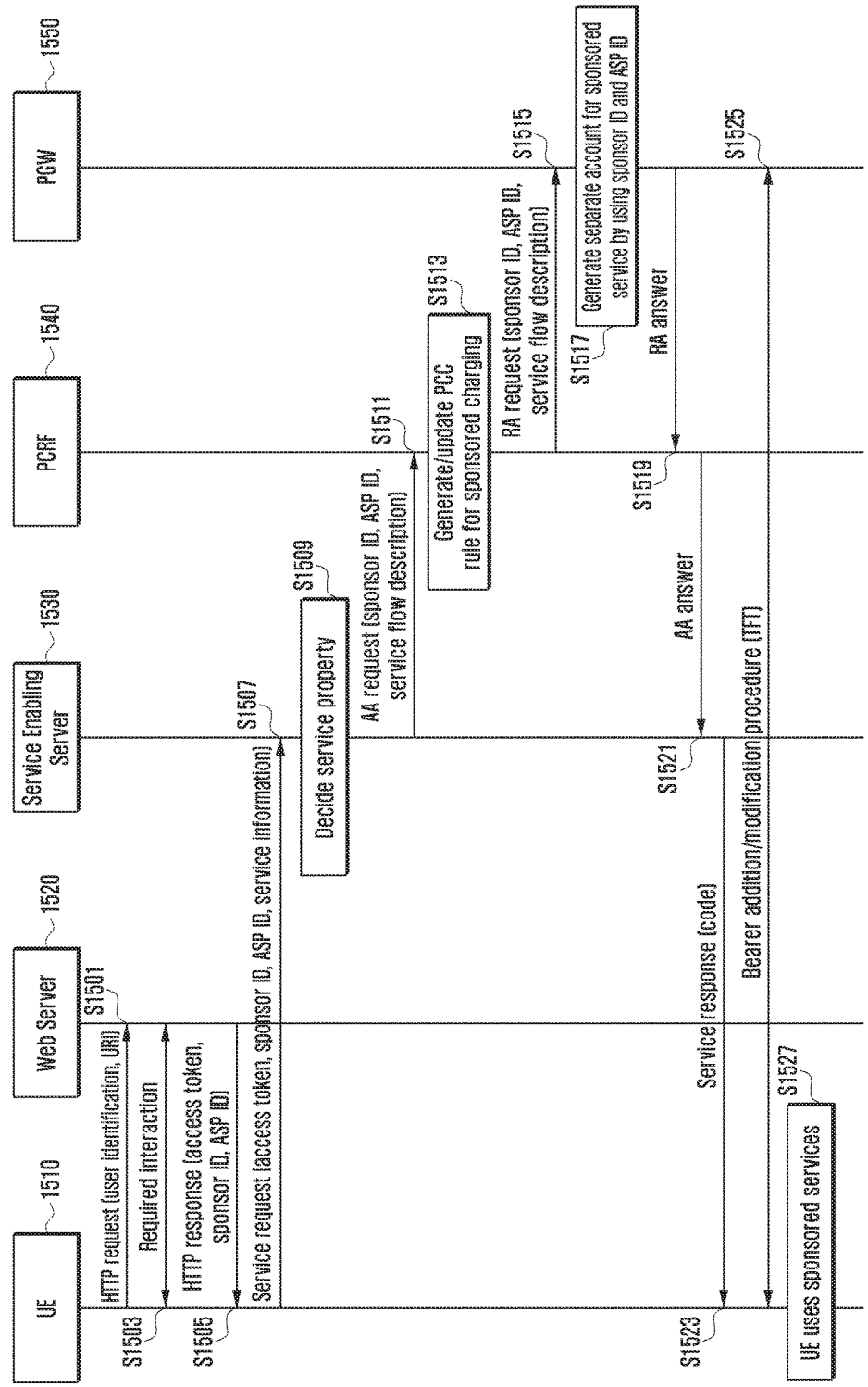
FIG. 15 illustrates a modification of FIG. 14 wherein a charging key is not used according to an embodiment of the present disclosure.

FIG. 15 illustrates a modification of FIG. 14, in which a charging key is not used.

Referring to FIG. 15, operations S1501 to S1513 are identical or similar to operations S1401 to S1413 of FIG. 14, so the detailed description thereof will be omitted.

In operation S1515, a PCRF 1540 may transmit a message for transferring the created or renewed PCC rule to a P-GW 1550 (PCEF). The message may use a diameter protocol. The message may use one of the instructions, such as "AA request," "Accounting request," "Credit-Control request," or "Re-Auth request." The request message may further include the sponsor ID and the ASP ID. In addition, the message may include a service descriptor for identifying an SDF to be charged for the sponsored data service. If the UE is not entitled to use data services except for the sponsored data service, the service descriptor may be configured so that a gate is closed in the case of the SDF except for the SDF of the sponsored data service.

The P-GW 1550 (PCEF) may begin to control charging and traffic according to the received PCC rule at operation S1517. Particularly, the sponsored data is charged for, by not using a general charging method but using the received sponsor ID and the ASP ID with respect to the sponsor and a specific service provider. In the case where use of specific data is not allowed (e.g., when all of data services except for the sponsored data service are blocked), the PCEF 1550 may control traffic according to the gate status of the received PCC rule.

Next operations are identical or similar to the operations of FIG. 14, so the detailed description thereof will be omitted.

In the various embodiments of FIG. 14 and FIG. 15, the UE 1410 or 1510 may receive information from the web server 1420 or 1520, and the PCC rule may be created for the sponsored data service corresponding to the web service. Particularly, the SES 1430 or 1530, or the PCRF 1440 or 1540 should identify the IP flow (or the service data flow) of the sponsored data service. If the web server has a constant address or port, it may be pre-configured in the SES 1430 or 1530, or the PCRF 1440 or 1540 of the communication provider network for use. However, if the address or port of the web server is dynamically changed in the case of a contents delivery network (CDN), cache, or NAT, it is impossible to pre-configure the same. Thus, operations S1519 to S1527 are similar to operations S1419 to S1427 of FIG. 14 and therefore a detailed description thereof will be omitted.

In order to address the problem above, the embodiment of the present disclosure provides a method by which a server of the service provider may transfer addresses (addresses and ports), which are to be used for the service, to the UE 1510, and the UE may forward the same to the communication provider network. Accordingly, the embodiment of the present disclosure provides a method in which, even with dynamic addresses of the web service (and the content therein), the IP flow of the sponsored data service may be accurately identified. Hereinafter, the address refers to information on the location where a specific traffic occurs, including a URI as well as an IP address, a port, or a domain name.

Figure 16:
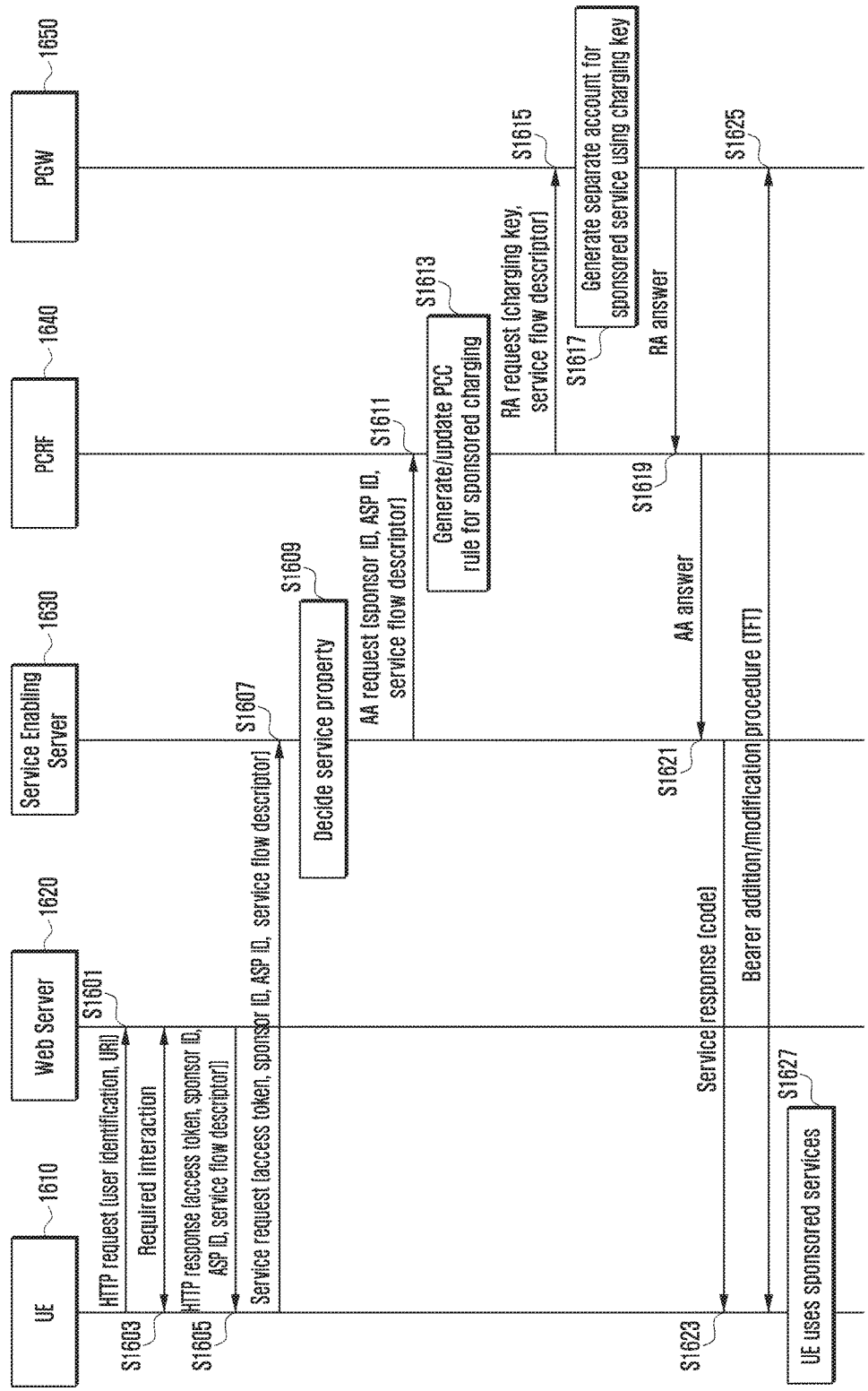
FIG. 16 illustrates a method for additionally transferring an address of a web service according to an embodiment of the present disclosure.

FIG. 16 illustrates a method for additionally transferring an address of a web service according to an embodiment of the present disclosure.

Referring to FIG. 16, operations S1601 to S1603 are identical or similar to operations S1401 to S1403 of FIG. 14, so the detailed description thereof will be omitted.

In operation S1605, a web server 1620 may transfer information for providing the web service as sponsored data to a UE 1610 at operation S1605. The message may be a message using HTTP GET, POST or PUT methods, and may include an access token that shows that access of the UE to the communication provider network and use of the sponsored data service has been approved. In addition, the message may further include the sponsor ID, and the ASP ID. Furthermore, the message may include the PLMN ID of the communication network provider. Although the access token is separated from other service-related information in the description above, all kinds of service-related information may be included in the access token.

The access token is information that is configured in a format agreed by the service provider and the communication network provider, and the access token may be preliminarily issued by the communication network provider to be thereby transferred to the service provider. Particularly, the access token may contain information stating that the UE has been approved to use the sponsored data service, and may additionally include information showing the properties (e.g., maximum data usage, allowed time, the type of service, and the like) of sponsored data. Particularly, the message may include an address (or an address list) to be accessed by the UE for the service. For example, in the case where the user should download image data from a URI 1 and video data from a URI 2, respectively, the message may include all of the addresses. Such address information is referred to as a service flow descriptor. The service flow descriptor may be transmitted separately from, or together with, the access token.

The access token is information to determine authority for a specific service or a resource, which is encoded according to a predetermined rule between the web server and the communication provider network (the SES in the present disclosure). In addition, in order to prevent abuse or spoofing, the access token should be used under security according to a predetermined rule between the same. To this end, the following method may be used.

The network provider provides a group of access tokens that may be issued to users in the web server, and the web server uses the access tokens one by one.

The network provider and the web server have credible authentication information (e.g., pre-shared key), and create and verify the access token according to the same rule. For example, the web server creates the access token using at least one of a user ID, a service provider ID (the sponsor ID, or application service provider ID), current time, a PLMN ID, or other service-related information, and a pre-shared key. The communication provider network (SES) verifies whether or not a received access token is valid using the information above and the pre-shared key.

In operation S1607, the UE 1610 may transmit a service request message for using a service through the communication provider network to an SES 1630 (or the eP-CSCF). The message may be encoded using the HTTP protocol, or the SIP protocol. Particularly, in using the SIP protocol, the message may use a register method or an invite method. The request message may include the access token received in the operation above. In addition, the request message may further include the sponsor ID and the ASP ID. In addition, the request message may further include additional information (e.g., ID, or address) of the web service to be provided to the user. Particularly, the message may include an address (or an address list) to be accessed by the UE for the service. For example, in the case where the user should download images from a URI 1 and videos from a URI 2, respectively, the message may include all of the addresses. Furthermore, the message may include a PLMN ID of the communication network provider. Although the access token is separated from other service-related information including the service address in the description above, sponsor and service-related information may be included in the access token to be encoded.

In operation S1609, the SES 1630 may check whether the UE 1610 is entitled to use the sponsored data service through the information receive from the UE 1610. During the operation, the SES 1630 may use a part of or all of the access token transmitted from the UE 1610. In addition, the SES 1630 may perform information exchange with the UE 1610 for additional authentication and security. In addition, the SES 1630 may recognize information to configure the PCC rule or the packet filters to be installed in the UE, based on a service flow descriptor, i.e., the list of addresses to be accessed by the UE for the service later, which is received from the UE 1610.

In operation S1611, if the UE 1610 is entitled to use the sponsored data service, the SES 1630 may transmit a policy configuration request message to a PCRF 1640 to begin the sponsored data service. The message may use a diameter protocol. The message may use one of the instructions, such as "AA request," "Accounting request," "Credit-Control request," or "Re-Auth request." The message may include the sponsor ID and the ASP ID. In addition, the message may include a service descriptor by which a service data flow of an actual service may be recognized.

The service descriptor may include at least one of an IP address, a port, a domain name, an application ID, or a URI, by which the service is to be provided. In addition, the message may include information showing the properties (e.g., data usage, allowed time, charging method, and the like) of the sponsored data service, and the information may be obtained through a part of or all of the access token received from the UE 1610. The message may include the service flow descriptor, i.e., the list of addresses to be accessed by the UE 1610 for the service later, which is received from the UE 1610. The information may be used in configuring a corresponding SDF, when the PCRF 1640 creates or renews the PCC rule for the sponsored data service. The service flow descriptor may be transmitted separately from or together with the access token.

Next operations are identical or similar to operations after the operation S1413 of FIG. 14, so the detailed description thereof will be omitted.

Although, the charging key is used for the sponsored charging in the embodiment of FIG. 16, as in FIG. 14, the present disclosure is not limited thereto, and the embodiment may be applied to the service charging using the sponsor ID and the ASP ID, as in FIG. 15. In this case, operations S1613 to S1617 of FIG. 16 may be replaced with operations S1513 to S1517 of FIG. 15. Operations S1619 to S1627 are similar to operations S1419 to S1427 of FIG. 14 and therefore a detailed description thereof will be omitted.

According to an extended embodiment of the present disclosure, a conditional sponsored data service may be provided. That is, the sponsored data service may be provided only when a specific condition is satisfied. More specifically, when the user uses an on-line shopping service, the charging in the sponsored data method may be withheld. Then, once the user actually buys a product, the service provider may pay for the data on behalf of the user. The condition above may be configured in the server for providing the sponsored data service.

Figure 17:
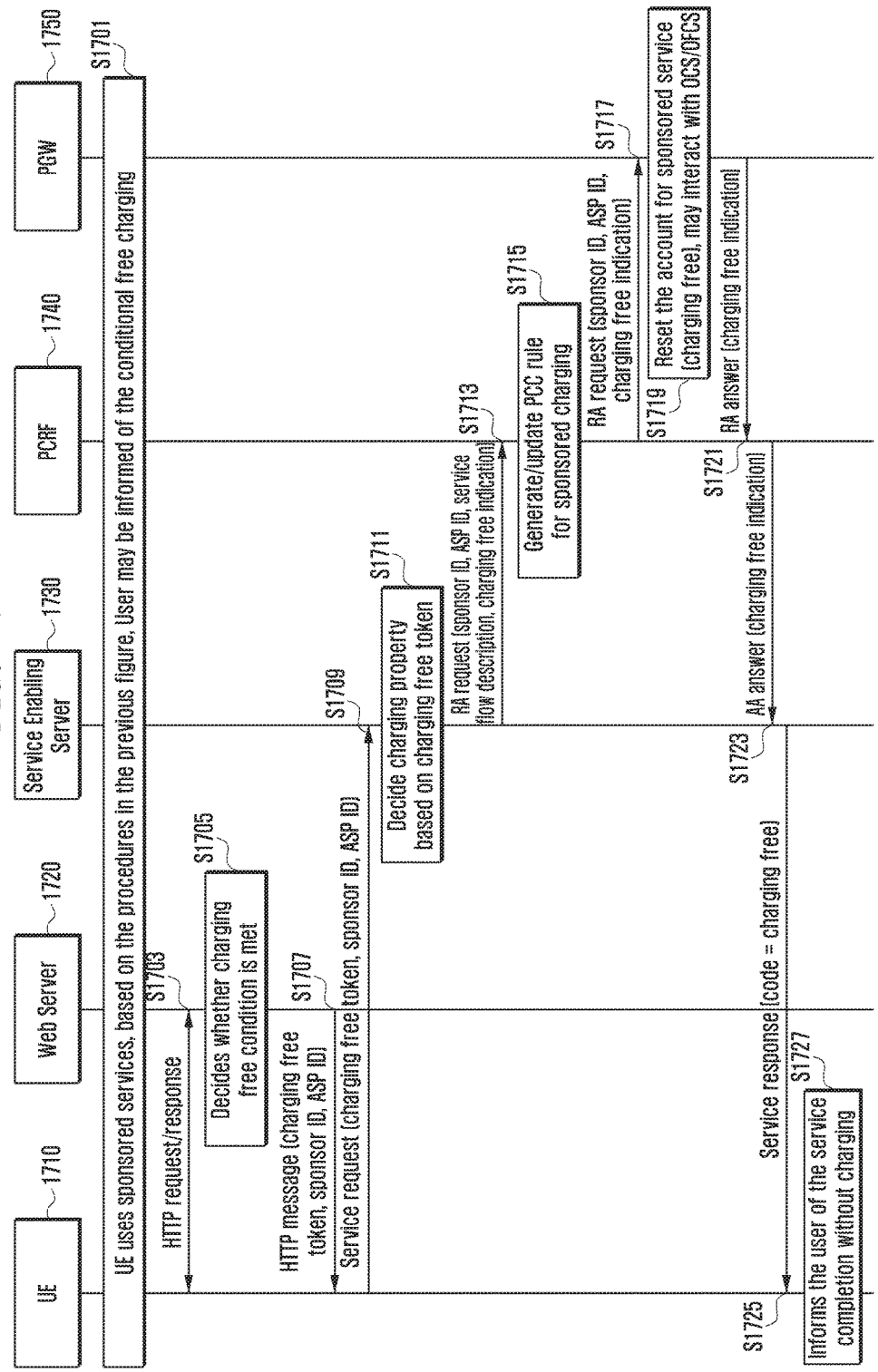
FIG. 17 illustrates a method for providing a conditional free sponsored data service according to an embodiment of the present disclosure.

FIG. 17 illustrates a method for providing a conditional free sponsored data service according to an embodiment of the present disclosure.

Referring to FIG. 17, a UE 1710, a web server 1720, and the communication provider network have completed information exchange for using the sponsored data service according to the various embodiments of FIGS. 14 to 17. The present embodiment is different from the various embodiments above in that the web service provider does not pay for all of the data charges resulting from the sponsored data service, but pays for the same provided that a specific condition is satisfied. Accordingly, the UE 1710 may display information on the conditional sponsored data service through a screen to the user in operation S1701.

The UE 1710 and the service provider web server 1720 exchange messages for the service at operation S1703. During the operation above, the web server 1720 may continue to check whether or not a condition for a free sponsored data service is satisfied at operation S1705. The condition may include the case in which transaction of buying a product in the on-line shopping mall has been completed, or the case in which transaction of viewing a specific advertisement more than a predetermined number of times has been completed.

If the condition for free data is satisfied, the web server 1720 may transmit information by which the sponsored data is provided free of charge, to the UE 1710 at operation S1707. This message may be a message using HTTP GET, POST or PUT methods, and may include an access token that shows that a free sponsored data service has been approved. In addition, the message may further include the sponsor ID, and the ASP ID.

The access token of the present embodiment is different from the first access token showing that use of the sponsored data has been approved. The access token is information that is configured in a format agreed by the service provider and the communication network provider, and it may be preliminarily issued by the communication network provider to be thereby transferred to the service provider. Particularly, the access token of the present embodiment may contain information stating that the UE has been approved to use the sponsored data service, and may additionally include information showing that the sponsored data service is to be converted into a free service during the service.

The UE 1710 may transmit a service request message for using a service through the communication provider network to an SES 1730 (or the eP-CSCF) at operation S1709. The message may be encoded using the HTTP protocol, or the SIP protocol. Particularly, in using the SIP protocol, the message may use a register method, an invite method, or an option method. The request message may include the access token received in the operation above. In addition, the request message may further include the sponsor ID and the ASP ID.

The SES 1730 may check whether or not the UE 1710 is entitled to use the sponsored data service free of charge through the information receive from the UE 1710 at operation S1711. During the operation, the SES 1730 may use a part of or all of the access token transmitted from the UE 1710. In addition, the SES 1730 may perform information exchange with the UE 1710 for additional authentication and security.

If the UE 1710 is entitled to use the sponsored data service free of charge, the SES 1730 may transmit a request message informing that the sponsored data service is to be converted into a free service, to the PCRF 1740. The message may use a diameter protocol. The message may use one of the instructions, such as "AA request," "Accounting request," "Credit-Control request," "Session Termination request" or "Re-Auth request." The message may include the sponsor ID and the ASP ID.

In addition, the message may include a service descriptor by which a service data flow of an actual service may be recognized. The service descriptor may include at least one of an IP address, a port, a domain name, an application ID, or a URI, by which the service is to be provided. In addition, the message may include information showing the properties (e.g., data usage, allowed time, charging method, and the like) of the sponsored data service, and the information may be obtained through a part of or all of the access token received from the UE 1710. Furthermore, the message may include information stating that the sponsored data service is free of charge.

A PCRF 1740 may create a PCC rule, based on the information received from the SES 1730, or may renew an old PCC rule that has been previously created for use at operation S1715. Particularly, the created or renewed PCC rule may include information stating that the sponsored data service is free of charge.

The PCRF 1740 may transmit a message for transferring the created or renewed PCC rule to a P-GW 1750 (PCEF) at operation S1717. The message may use a diameter protocol. The message may use one of the instructions, such as "AA request," "Accounting request," "Credit-Control request," "Session Termination request," or "Re-Auth request." The message may include a charging key for separate charging of the sponsored data. The charging key for the sponsored data service may not be allotted to each user, but it may be allotted to be shared with respect to a specific sponsor and a specific application service provider. In addition, the message may include a service descriptor by which an SDF to be charged according to the sponsored charging method may be identified.

If the UE 1710 is not entitled to use data services except for the sponsored data service, the service descriptor may be configured so that a gate is closed in the case of the SDF except for the SDF to which the sponsored charging is applied. Furthermore, the message may include information stating that the sponsored data service is free of charge.

The P-GW 1750 (PCEF) may begin to control charging and traffic according to the received PCC rule at operation S1719. Particularly, the sponsored data is charged for, by not using a general charging method but using the received charging key. In the case where use of specific data is not allowed (e.g., when all of data services except for the sponsored data service are blocked), the PCEF 1750 may control traffic according to the gate status of the received PCC rule.

In addition, the P-GW 1750 may determine that the sponsored data service is free of charge, based on the message received from the PCRF 1740, and then may not charge for the data, or may invalidate previously collected charging information. If necessary, the PCEF 1750 may exchange information with an on-line charging system (OCS) or an off-line charging system (OFCS) to inform them of the free sponsored data service.

The P-GW 1750 may transmit a response message informing that the requested PCC rule has been successfully applied, to the PCRF 1740 at operation S1721. This message may use a diameter protocol. The message may use one of the instructions, such as "AA request," "Accounting request," "Credit-Control request," or "Re-Auth request." The message may include information stating that the sponsored data service is free of charge.

The PCRF 1740 may transmit a response message informing that the requested rule for the sponsored data service has been successfully applied, to the SES 1740 at operation S1723. This message may use a diameter protocol. The message may use one of the instructions, such as "AA request," "Accounting request," "Credit-Control request," or "Re-Auth request." The message may include information stating that the sponsored data service is free of charge.

The SES 1730 may transmit a message informing that messages are to be free of charge, to the UE 1710 at operation S1725. This message may be encoded using the HTTP protocol, or the SIP protocol. Particularly, in the case of using the SIP protocol, the message may be a message using 200 OK.

The UE 1710 may use the web service in a free sponsored data method at operation S1727. In addition, the UE 1710 display information showing that a free sponsored data service is to be provided through a screen to the user.

According to an extended embodiment of FIG. 17, the properties (e.g., maximum data usage, allowed time, and the like) of sponsored data may be changed depending on activities of the user as well as the conditional sponsored data service. For example, in the case where the initial allowed data usage of the sponsored data service is given a traffic of 1 GB, if the user satisfies a specific condition (e.g., the case of buying a product, or viewing advertisement more than a predetermined number of times), another 1 GB may be added to the data usage. The condition above may be configured in the server for providing the sponsored data service.

Figure 18:
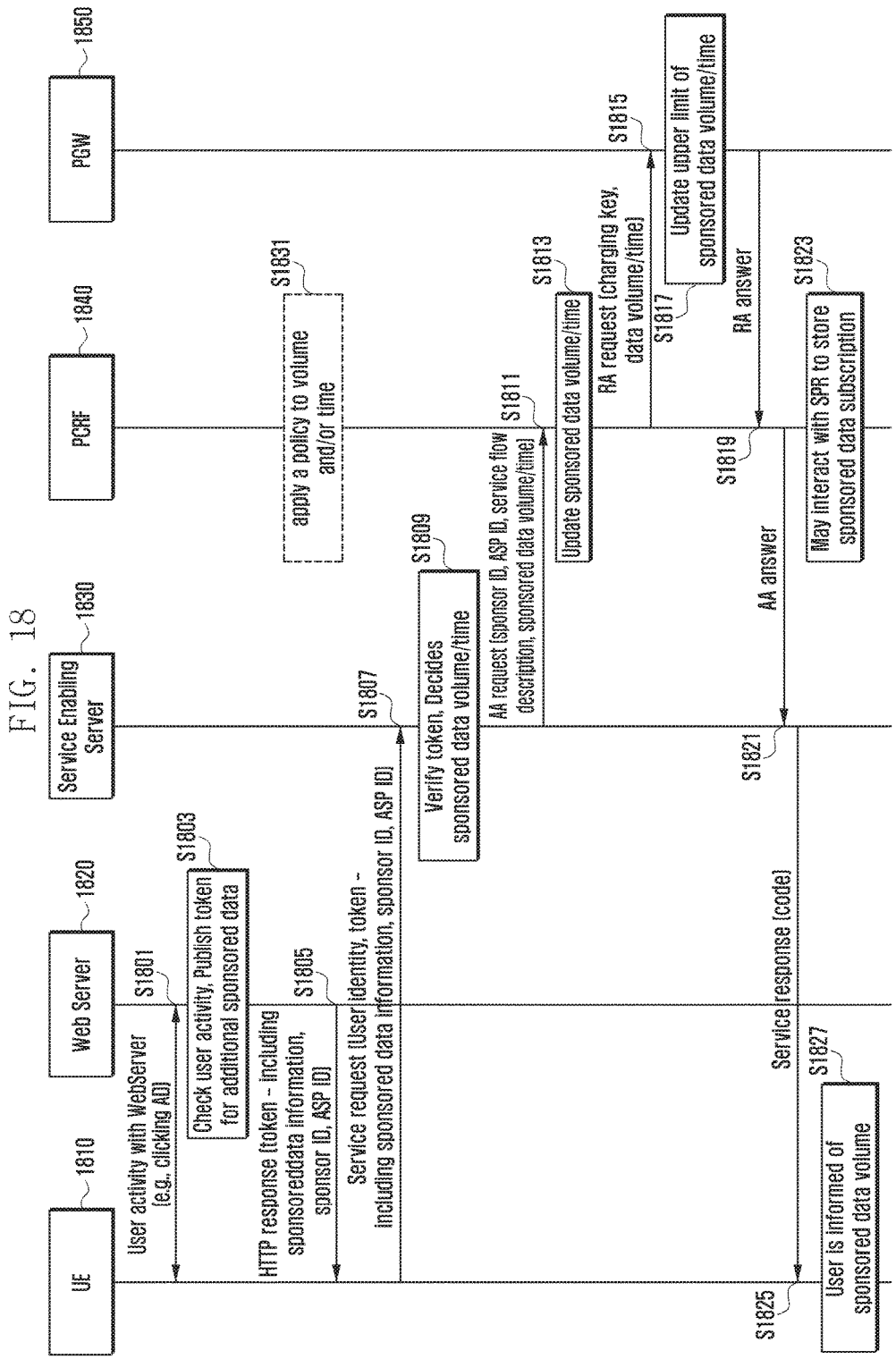
FIG. 18 illustrates a method for changing a sponsored data service according to activities of a user according to an embodiment of the present disclosure.

FIG. 18 illustrates a method for changing a sponsored data service according to activities of a user.

Referring to FIG. 18, a UE 1810, a web server 1820, and the communication provider network have completed information exchange for using the sponsored data service according to the various embodiments of FIGS. 14 to 17.

The UE 1810 and the service provider web server 1820 exchange messages for the service at operation S1801. For example, web pages for buying a product or including advertisement are continuously requested. During the operation above, the web server 1820 may continue to check whether or not a condition for changing the properties (maximum allowed data usage, or allowed time) of the sponsored data service is satisfied at operation S1803 is satisfied. The condition may include the case in which transaction of buying a product in an on-line shopping mall has been completed, or the case in which transaction of viewing a specific advertisement more than a predetermined number of times has been completed.

If the condition for changing the properties is satisfied, the web server 1820 may transmit information by which the sponsored data is upgraded, to the UE 1810 at operation S1805. This message may be a message using HTTP GET, POST or PUT methods, and may include information for upgrading the sponsored data service and an access token. In addition, the message may further include the sponsor ID, and the ASP ID.

The access token of the present embodiment is different from the first access token showing that use of the sponsored data service has been approved. The access token is information that is configured in a format agreed by the service provider and the communication network provider, and the access token may be preliminarily issued by the communication network provider to be thereby transferred to the service provider. Particularly, the access token may contain information stating that the sponsored data service has been approved to be upgraded. That is, the access token may include upgraded information (e.g., upgraded data usage and allowed time) of the sponsored data service. Alternatively, the access token may include only information stating that the upgrading of the sponsored data service has been approved, and the upgraded information (e.g., upgraded data usage, allowed time, charging method, and the like) may be separately transmitted.

The UE 1810 may transmit a service request message for using a service through the communication provider network to the SES 1830 (or the eP-CSCF). The message may be encoded using the HTTP protocol, or the SIP protocol. Particularly, in using the SIP protocol, the message may use a register method, an invite method, or an option method. The request message may include the access token received in the operation above. In addition, the request message may further include the sponsor ID and the ASP ID. The access token may include upgraded information (e.g., upgraded data usage and allowed time) of the sponsored data service. Alternatively, the access token may include only information stating that the upgrading of the sponsored data service has been approved, and the upgraded information (e.g., upgraded data usage, allowed time, charging method, and the like) may be separately transmitted.

The SES 1830 may check whether or not the UE is entitled to use an upgraded sponsored data service through the information receive from the UE 1810 at operation S1809. During the operation, the SES 1830 may use a part of or all of the access token transmitted from the UE 1810. In addition, the SES 1830 may perform information exchange with the UE for additional authentication and security.

If the UE 1810 is entitled to use an upgraded sponsored data service, the SES 1830 may transmit a request message informing that the sponsored data service is to be upgraded, to a PCRF 1840 at operation S1811. The message may use a diameter protocol. The message may use one of the instructions, such as "AA request," "Accounting request," "Credit-Control request," "Session Termination request" or "Re-Auth request." The message may include the sponsor ID and the ASP ID.

In addition, the message may include a service descriptor by which a service data flow of an actual service may be recognized. The service descriptor may include at least one of an IP address, a port, a domain name, an application ID, or a URI, by which the service is to be provided. In addition, the message may include information showing the properties (e.g., data usage, allowed time, charging method, and the like) of the renewed sponsored data service, and the information may be obtained through a part of or all of the access token received from the UE.

The PCRF 1840 may create a PCC rule, based on the information received from the SES 1830, or may renew an old PCC rule that has been previously created for use at operation S1813. Particularly, the created or renewed PCC rule may include information showing the properties of the upgraded sponsored data service.

The PCRF 1840 may transmit a message for transferring the created or renewed PCC rule to a P-GW 1850 (PCEF) at operation S1815. The message may use a diameter protocol. The message may use one of the instructions, such as "AA request," "Accounting request," "Credit-Control request," "Session Termination request," or "Re-Auth request." The message may include a charging key for separate charging of the sponsored data. The charging key for the sponsored data service may not be allotted to each user, but it may be allotted to be shared with respect to a specific sponsor and an ASP. In addition, the message may include a service descriptor by which an SDF to be charged according to the sponsored charging method may be identified. If the UE is not entitled to use data services except for the sponsored data service, the service descriptor may be configured so that a gate is closed in the case of the SDF except for the SDF to which the sponsored charging is applied. Furthermore, the message may include information showing the properties (e.g., maximum data usage, allowed time, and the like) of the upgraded sponsored data service.

The P-GW 1850 (PCEF) may begin to control charging and traffic according to the received PCC rule at operation S1817. Particularly, the sponsored data is charged for, by not using a general charging method but using the received charging key. In the case where use of specific data is not allowed (e.g., when all of data services except for the sponsored data service are blocked), the PCEF 1850 may control traffic according to the gate status of the received PCC rule.

The P-GW 1850 may transmit a response message informing that the requested PCC rule has been successfully applied, to the PCRF 1840 at operation S1819. This message may use a diameter protocol. The message may use one of the instructions, such as "AA request," "Accounting request," "Credit-Control request," or "Re-Auth request."

The PCRF 1840 transmits a response message, which informs that policy application for the requested sponsored data service has succeeded, to the SES 1830 at operation S1821. This message may use a diameter protocol. The message may use one of the instructions, such as "AA request," "Accounting request," "Credit-Control request," or "Re-Auth request."

Regardless of sequence of the operation, the PCRF 1840 may exchange messages with a subscription profile repository (SPR) to thereby store upgraded information of the sponsored data service for the UE 1810 at operation S1823. This enables the UE 1810 to be continuously provided with the sponsored data service, even though the UE 1810 has been detached or deregistered from the communication provider network. In the operation above, the message using a diameter protocol, for example, a profile update request message and a profile request answer message, may be used. The message may include upgraded information of the sponsored data service, i.e., maximum allowed data usage, allowed use time, used data usage, used time, and the like.

The SES 1830 may transmit a message informing that the upgraded sponsored data service is to be applied, to the UE 1810 at operation S1825. This message may be encoded using the HTTP protocol, or the SIP protocol. Particularly, in the case of using the SIP protocol, it may be a message using 200 OK.

The UE 1810 may use the web service in a sponsored data method according to the renewed condition. In addition, the UE 1710 display information showing that the properties (e.g., maximum data usage, or allowed time) of the sponsored data service have been changed through a screen to the user.

The various embodiments of the present disclosure above provide a method by which the UE informs the SES of the communication provider network of connection information for the sponsored data service, and then core network nodes (i.e., the PCRF, and the PCEF) transfer information for providing the sponsored data service to the UE. According to little modification of the present embodiments, the UE may directly transfer the information to the core network nodes without passing through a specific server.

Figure 19:
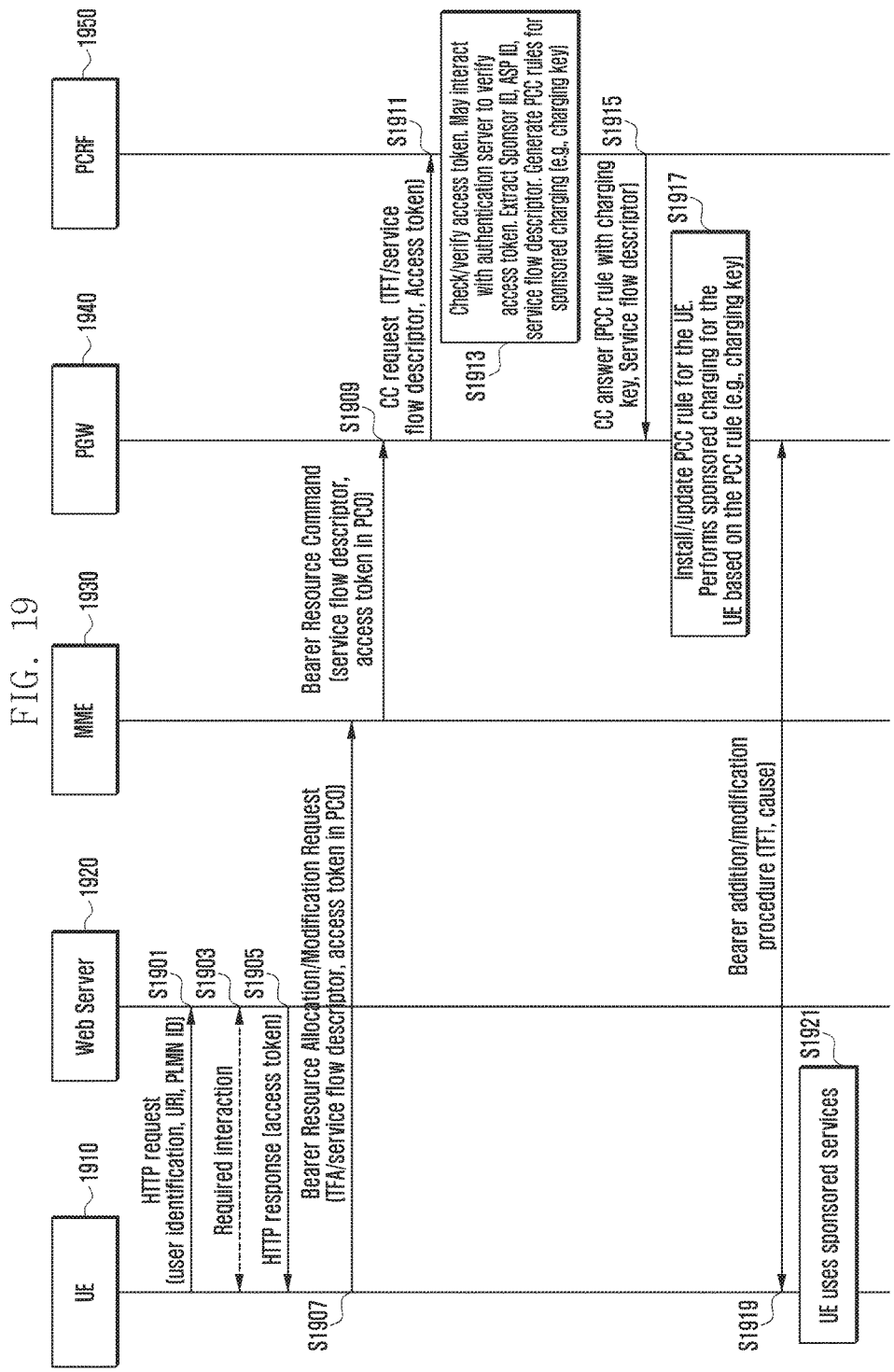
FIG. 19 illustrates a method for transmitting connection information to a core network node by user equipment using protocol configuration option (PCO)

FIG. 19 illustrates a method for transmitting connection information to a core network node by UE using PCO.

Referring to FIG. 19, a UE 1910 may transmit a request message for using a web service to a web server 1920 at operation S1901. The message may be a message using HTTP GET or POST methods, and may include a user ID, and a URI for requested pages or resources. Furthermore, the message may include a PLMN ID of the communication network provider.

The UE 1910 and the web server 1920 may additionally exchange messages with each other at operation S1903. During the operation above, information on mutual authentication between the UE 1910 and the web server may be exchanged.

The web server 1920 may transfer information for providing a web service of sponsored data, to the UE 1910 at operation S1905. The message may be a message using HTTP GET, POST or PUT methods, and may include an access token showing that access of the UE to the communication provider network and use of the sponsored data service have been approved. In addition, the message may further include a service flow descriptor, a sponsor ID, and an ASP ID. Furthermore, the message may include a PLMN ID of the communication network provider. The service flow descriptor is information based on IP 5-tuple, or a connection address (the domain name, or the URI). In addition, the access token may include a termination time of the access token, and a session termination time. Although the access token is separated from other service-related information in the description above, all kinds of service-related information may be included in the access token. In addition, the message may include information for identifying validity of the access token or authenticating the same. For example, the message may include a message authentication code (MAC) for verifying integrity of the access token.

The access token is information that is configured in a format agreed by the service provider and the communication network provider, and the access token may be preliminarily issued by the communication network provider to be thereby transferred to the service provider. Particularly, the access token may contain information stating that the UE has been approved to use the sponsored data service, and may additionally include information showing the properties (e.g., maximum data usage, allowed time, the type of service, and the like) of sponsored data. The access token is information to determine authority for a specific service or a resource, which is encoded according to a predetermined rule between the web server and the communication provider network (the SES in the present disclosure). In addition, in order to prevent abuse or spoofing, the access token should be used under security according to a predetermined rule between the same. To this end, the following method may be used.

The network provider provides a group of access tokens that may be issued to users in the web server, and the web server uses the access tokens one by one.

The network provider and the web server have credible authentication information (e.g., pre-shared key), to thereby verify integrity of the access token and authenticate the same. For example, the web server creates a payload of the access token using at least one of a service provider ID (at least one of the sponsor ID or the application service provider ID), current time, a PLMN ID, a service flow descriptor (e.g., list of IP 5-tuple, domain name, or URI), a termination time, or other service-related information, and creates a message authentication code (MAC) for verifying integrity of the access token, using a pre-shared key or a certificate with the payload. The communication provider network creates the MAC using the received access token and pre-shared key, and verifies validity of the received information by comparing the same with the received MAC.

Although the MAC is described to be separated from the access token in the present embodiment, it may be included in the access token. More specifically, the access token may include information (e.g. the service flow descriptor, the sponsor ID, the ASP ID, and the like) for providing the sponsored data service, and the MAC created using the information and the pre-shared key. That is, in this case, the access token is to be created the remaining part except for the MAC.

The UE 1910 may transmit a request message for a resource to get a data service to the communication provider network at operation S1907. More specifically, the UE 1910 may transmit a bearer resource allocation request message, or a bearer resource modification request message to the core network node. For example, the core network node may be an MME 1930. Hereinafter, the description will be made on the assumption that the core network node is the MME. The message may include information received from the web server 1920, which is included in protocol configuration option (PCO) to be transmitted. That is, the UE 1910 may include the access token received from the server in the PCO, and transmit the same. In the case where the access token is separated from the MAC, the MAC may be included in the PCO to be transmitted as well. In addition, the UE 1910 may include traffic flow aggregate (TFA) that is comprised of IP information for the sponsored data service in the message. The TFA is information created from the service flow descriptor received from the server. Even though the UE 1910 has a packet filter (i.e., a match-all filter) that may transmit and receive all of service data flows, or has an EPS bearer configured to perform the operation equivalent thereto, the UE 1910 may create and transmit the resource request message in order to use the sponsored data service provided. If the information received from the web server 1920 includes a domain name or a URI instead of IP address/port information (i.e., IP 5-tuple) of the server to be connected by the UE for the service, the UE 1910 may include the address of web servers that have been connected with the UE in the TFA, to be thereby transmitted.

The MME 1930 may begin an operation of creating or correcting the bearer context together with core network nodes, based the request message received from the UE 1910 at operation S1909. That is, the MME 1930 may create a bearer resource command message and may transmit the same to the SGW. The message may include information included in the message received from the UE 1910, that is, the PCO and the service flow descriptor. The service flow descriptor may be converted into a form of traffic aggregate description (TAD) to be thereby included. That is, the packet filters (information to identify IP 5-tuple) included in the service flow descriptor may be include in the TAD, and then may be include in the message to be thereby transmitted to the SGW. The SGW may forward the message to a P-GW 1940.

The PGW 1940 may perform an operation of creating or correcting an IP-connectivity access network (CAN) session using the received information together with a PCRF 1950 at operation S1911. More specifically, the P-GW 1940 may transmit a message to the PCRF 1950, and may perform an operation to receive the PCC rule for the UE 1910. The message may use a diameter protocol. The message may use one of the instructions, such as "AA request," "Accounting request," "Credit-Control request," or "Re-Auth request." The message may include information on the sponsor ID, i.e., the access token. If the access token is separated from the MAC, the message may include the MAC to be transmitted. In addition, the message may include information (the service flow descriptor received by TAD, TFT information, or packet filter information) showing a service flow with respect to the UE. In addition, the message may include the PLMN ID of the communication network provider. The service flow descriptor may include at least one of the IP 5-tuple (an IP address and port to provide the service), a domain name, an application ID, or a URI.

The PCRF 1950 may create a PCC rule for providing the sponsored data service, based on the information received from the P-GW 1940, or may renew an old PCC rule at operation S1913. Prior to that, the PCRF 1950 may determine whether or not the access token is valid in the information received from the P-GW 1940 at operation S1913. More specifically, the PCRF 1950 may search for security information for determining validity of the access token and the request of the UE 1910 with respect to the sponsored data service provider using at least one of the sponsor ID or the ASP ID, which are included in the received information, and may determine the validity (or integrity) of the received access token and the request of the UE.

More specifically, the PCRF 1950 may search for the stored security information (the pre-shared key or a certificate), using at least one of the sponsor ID or the ASP ID, which are included in the access token, and may create a MAC using the security information and the access token. Next, the PCRF 1950 may verify the validity of the received access token and the sponsored data service request of the UE 1910 by comparing the same with the received MAC (included in the access token, or received as separate information).

At this time, the PCRF 1950 may exchange information with a separate server in charge of authentication with respect to the access token (e.g., an authentication authorization accounting (AAA) server). More specifically, the PCRF 150 may transmit the received access token to the authentication server. If the MAC is received separately from the access token, the MAC is transmitted to the authentication server as well. The authentication server may determine the validity of the receive access token by performing the operation as described above, and may send the result back to the PCRF 1950.

When it is determined that the received access token and the request of the UE 1910 are valid, the PCRF 1950 may create a PCC rule, or may renew an old PCC rule that has been created before. Particularly, the created or renewed PCC rule may include information on the sponsored data, and may use a charging key with respect to a specific sponsor or ASP.

The PCRF 1950 may transmit a message for transferring the created or renewed PCC rule to the P-GW 1940 (PCEF) at operation S1915. The message may use a diameter protocol. The message may use one of the instructions, such as "AA request," "Accounting request," "Credit-Control request," or "Re-Auth request." The message may include a charging key for separate charging of the sponsored data. The charging key for the sponsored data service may not be allotted to each user, but it may be allotted to be shared with respect to a specific sponsor and a specific application service provider.

In addition, the message may include information by which an SDF to be charged according to the sponsored charging method may be identified. If the UE is not entitled to use data services except for the sponsored data service, the service descriptor may be configured so that a gate is closed in the case of the SDF except for the SDF to which the sponsored charging is applied.

If the service flow descriptor (that is, included in the access token) that has been received by the P-GW 1940 from the UE 1910 through the PCO includes a domain name or a URI instead of IP address/port information, the P-GW 1940 may inspect a domain name system enquiry request transmitted by the UE 1910 or a response message thereto. If a requested domain name is included in the domain name or the URI list, which are included in the service flow descriptor, the P-GW 1940 may perform an operation of adding a responded IP address information (the IP address and, if necessary, an additional port number) to packet filters that identify the sponsored traffic (i.e., an SDF template of the PCC rule for the sponsored data service). To this end, the P-GW 1940 may add the packet filters without exchanging information with the PCRF 1950, or may transmit a request for adding the IP address information to the PCC rule of the sponsored data service, to the PCRF 1950.

The P-GW 1940 (PCEF) may begin to control charging and traffic according to the received PCC rule at operation S1917. Particularly, the sponsored data is charged for, by using not a general charging method but the received charging key. In the case where use of specific data is not allowed (e.g., when all of data services except for the sponsored data service are blocked), the PCEF 1950 may control traffic according to the gate status of the received PCC rule.

When the creation or correction of an EPS bearer is required due to the sponsored data service, the P-GW 1940 may trigger an operation for the same at operation S1919. In this operation, the packet filters created by the P-GW 1940 for the sponsored data service may be installed in the UE 1910. In the case where use of specific data is not allowed (e.g., when all of data services except for the sponsored data service are blocked), the UE 1910 may be installed with packet filters that are configured to allow packet transmission/reception for a specific IP flow as well.

Afterwards, the UE 1910 may use the web service in the sponsored data method at operation S1921. When information on the sponsored data service is received through the operation above, it may be displayed to the user.

The access token may include more detailed information for the sponsored data service in the various embodiments of the present disclosure. For example, the access token may include information on user grades. That is, the sponsored data service may be differentiated depending on the UE grades (or priority). To this end, the service provider may issue the access token to be different according to the service grades of users, and the UE that has received the access token may transfer the same to the communication provider network. A core network node (P-GW) may separate user grades according to the access token. According to this, the properties (e.g., maximum allowed data usage, allowed time, charging method, and the like) of the sponsored data service may be differentiated. More specifically, for example, the sponsored data service may be given up to 1 GB to the UE of more than a predetermined grade, whereas it may be given up to 200 MB to the UE of less than the predetermined grade.

Although the embodiment of FIG. 19 discloses a method by which the P-GW transmits the access token received through the PCO to the PCRF, and the PCRF verifies the same for use, in another embodiment of the present disclosure, the P-GW processes the received access token by itself, and transmits necessary information to the PCRF to thereby create or renew the PCC rule.

Figure 20:
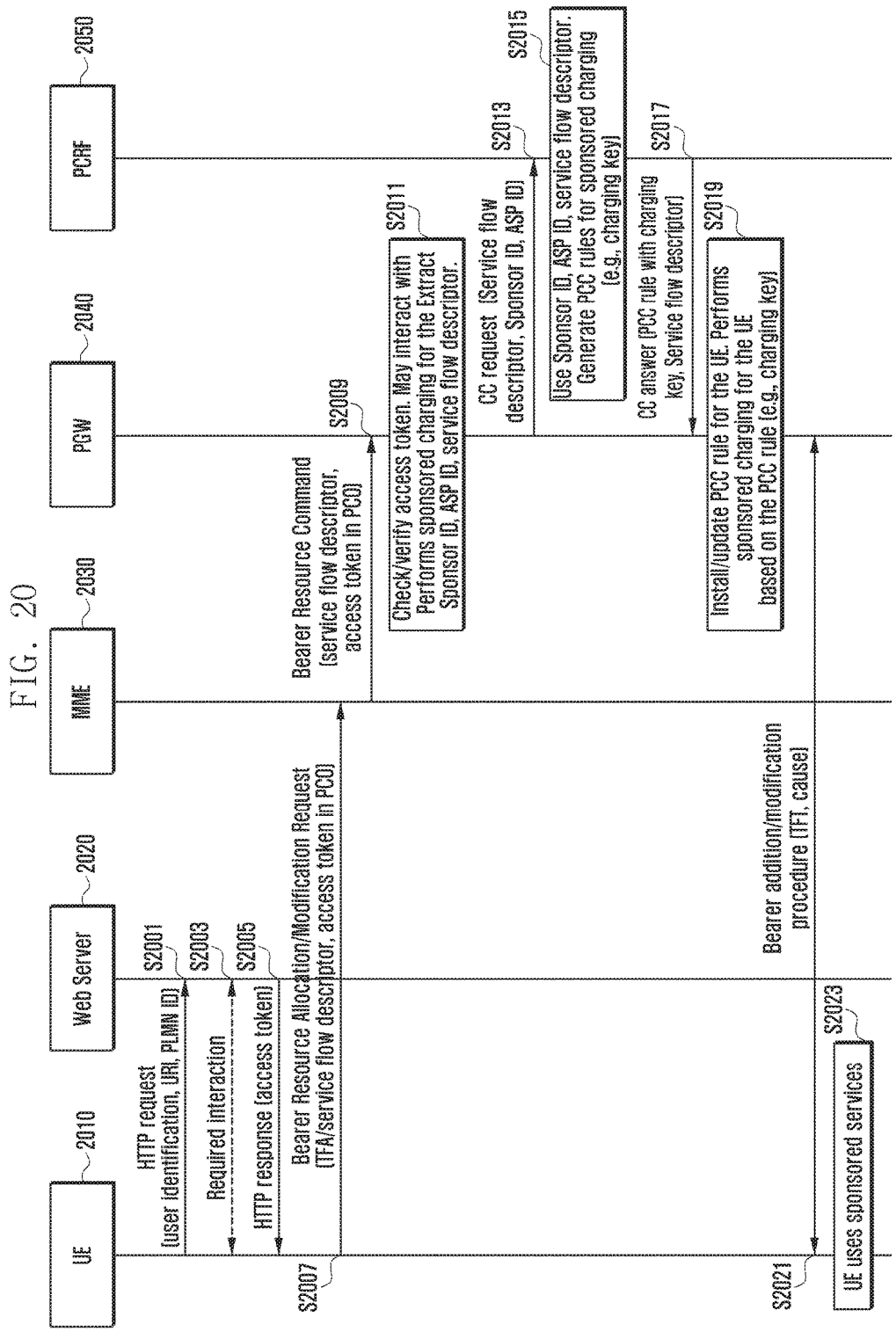
FIG. 20 illustrates another method for transmitting connection information to a core network node by user equipment using PCO according to an embodiment of the present disclosure.

FIG. 20 illustrates a method for transmitting connection information to a core network node by UE using the PCO.

Referring to FIG. 20, a UE 2010 may transmit a request message for using a web service to a web server 2020 at operation S2001. The message may be a message using HTTP GET or POST methods, and may include a user ID, and a URI for requested pages or resources. Furthermore, the message may include a PLMN ID of a communication network provider who is selected by the user.

The UE 2010 and the web server 2020 may additionally exchange messages with each other at operation S2003. During the operation above, information on mutual authentication between the UE 2010 and the web server may be exchanged.

The web server 2020 may transfer information for providing a web service of sponsored data, to the UE 2010 at operation S2005. The message may be a message using HTTP GET, POST or PUT methods, and may include an access token showing that access of the UE to the communication provider network and use of the sponsored data service have been approved. In addition, the message may further include a service flow descriptor (that is the same as the service descriptor), a sponsor ID, and an ASP ID. Furthermore, the message may include a PLMN ID of the communication network provider. The service flow descriptor is information based on IP 5-tuple, or a connection address (the domain name, or the URI). In addition, the access token may include a termination time of the access token, and a session termination time. Although the access token is separated from other service-related information in the description above, all kinds of service-related information may be included in the access token. In addition, the message may include information for identifying validity of the access token or authenticating the same. For example, the message may include a message authentication code (MAC) for verifying integrity of the access token.

The access token is information that is configured in a format agreed by the service provider and the communication network provider, and it may be preliminarily issued by the communication network provider to be thereby transferred to the service provider. Particularly, the access token may contain information stating that the UE has been approved to use the sponsored data service, and may additionally include information showing the properties (e.g., maximum data usage, allowed time, the type of service, and the like) of sponsored data. The access token is information to determine authority for a specific service or a resource, which is encoded according to a predetermined rule between the web server and the communication provider network (the SES in the present disclosure). In addition, in order to prevent abuse or spoofing, the access token should be used under security according to a predetermined rule between the same. To this end, the following method may be used.

The network provider provides a group of access tokens that may be issued to users in the web server, and the web server uses the access tokens one by one.

The network provider and the web server have credible authentication information (e.g., pre-shared key), to thereby verify integrity of the access token and authenticate the same. For example, the web server creates a payload of the access token using at least one of a service provider ID (at least one of the sponsor ID or the application service provider ID), current time, a PLMN ID, a service flow descriptor (e.g., list of IP 5-tuple, domain name, or URI), a termination time, or other service-related information, and creates a message authentication code (MAC) for verifying integrity of the access token, using a pre-shared key or a certificate with the payload. The communication provider network creates the MAC using the received access token and pre-shared key, and verifies validity of the received information by comparing the same with the received MAC.

Although the MAC is described to be separated from the access token in the present embodiment, the access token may be included in the access token. More specifically, the access token may include information (e.g. the service flow descriptor, the sponsor ID, the ASP ID, and the like) for providing the sponsored data service, and the MAC created using the information and the pre-shared key. That is, in this case, the access token is to be created the remaining part except for the MAC.

The UE 2010 may a request message for a resource to get a data service to the communication provider network at operation S2007. More specifically, the UE 2010 may transmit a bearer resource allocation request message, or a bearer resource modification request message to the core network node. For example, the core network node may be a MME 2030. Hereinafter, the description will be made on the assumption that the core network node is the MME. The message may include information received from the web server 2020, which is included in protocol configuration option (PCO) to be transmitted. That is, the UE may include the access token received from the server in the PCO, and may transmit the same. In the case where the access token is separated from the MAC, the MAC may be included in the PCO to be transmitted as well. In addition, the UE 2010 may include traffic flow aggregate (TFA) that is comprised of IP information for the sponsored data service in the message. The TFA is information created from the service flow descriptor received from the server. Even though the UE 2010 has a packet filter (i.e., a match-all filter) that may transmit and receive all of service data flows, or has an EPS bearer configured to perform the operation equivalent thereto, the UE 2010 may create and transmit the resource request message in order to use the sponsored data service provided. If the information received from the web server 2020 includes a domain name or a URI instead of IP address/port information (i.e., IP 5-tuple) of servers to be connected by the UE for the service, the UE 2010 may include the address of a web server that has been connected with the UE in the TFA, to be thereby transmitted.

The MME 2030 may begin an operation of creating or correcting the bearer context together with core network nodes, based the request message received from the UE 2010 at operation S2009. That is, the MME 2030 may create a bearer resource command message and may transmit the same to the SGW. The message may include information included in the message received from the UE 2010, that is, the PCO and the service flow descriptor. The service flow descriptor may be converted into a form of traffic aggregate description (TAD) to be thereby included. That is, the packet filters (information to identify IP 5-tuple) included in the service flow descriptor may be included in the TAD, and then may be included in the message to be thereby transmitted to the SGW. The SGW may forward the message to a P-GW 2040.

The P-GW 2040 may perform an operation of creating or correcting an IP-CAN session using the received information together with a PCRF 2050. Prior to that, the P-GW 2040 may determine whether or not the access token in the received information is valid at operation S2011. More specifically, the P-GW 2040 may search for security information for determining validity of the access token and the request of the UE 2010 with respect to the sponsored data service provider using at least one of the sponsor ID or the ASP ID, which are included in the received information. The P-GW 2040 may determine the validity (or integrity) of the received access token and the request of the UE 2010.

More specifically, the P-GW 2040 may search for the stored security information (the pre-shared key or a certificate), using at least one of the sponsor ID or the ASP ID, which are included in the access token, and may create a MAC using the security information and the access token. Next, the P-GW 2040 may verify validity of the received access token and the sponsored data service request of the UE by comparing the same with the received MAC (included in the access token, or receive as separate information).

At this time, the P-GW 2040 may exchange information with a separate server in charge of authentication with respect to the access token (e.g., an authentication authorization accounting (AAA) server). More specifically, the P-GW 2040 may transmit the received access token to the authentication server. If the MAC is received separately from the access token, the MAC is transmitted to the authentication server as well. The authentication server may determine the validity of the receive access token by performing the operation as described above, and may send the result back to the P-GW 2040.

If the verification is succeeds, the P-GW 2040 may transmit a message to the PCRF 2050, to thereby perform an operation of receiving the PCC rule of the UE 2010 at operation S2013. The message may use a diameter protocol. The message may use one of the instructions, such as "AA request," "Accounting request," "Credit-Control request," or "Re-Auth request." The request message may further include information on the sponsored data service, i.e., at least one of a sponsor ID and an ASP ID. In addition, the message may include information (the service flow descriptor received by TAD, TFT information, or packet filter information) showing a service flow with respect to the UE. In addition, the message may include a PLMN ID of the communication network provider. The service flow descriptor may include at least one of the IP 5-tuple (an IP address and port to provide the service), a domain name, an application ID, or a URI.

The PCRF 2050 may create a PCC rule for providing the sponsored data service, or may renew an old PCC rule, based on the information received from the P-GW 2040 at operation S2015. Particularly, the created or renewed PCC rule may include information on the sponsored data, and to this end, a charging key for a specific sponsor and a specific ASP is used.

The PCRF 2050 may transmit a message for transferring the created or renewed PCC rule to the P-GW 2040 (PCEF) at operation S2017. The message may use a diameter protocol. The message may use one of the instructions, such as "AA request," "Accounting request," "Credit-Control request," or "Re-Auth request." The message may include a charging key for separate charging of the sponsored data. The charging key for the sponsored data service may not be allotted to each user, but it may be allotted to be shared with respect to a specific sponsor and a specific application service provider.

In addition, the message may include a service descriptor by which an SDF to be charged according to the sponsored charging method may be identified. If the UE is not entitled to use data services except for the sponsored data service, the service descriptor may be configured so that a gate is closed in the case of the SDF except for the SDF to which the sponsored charging is applied.

If the service flow descriptor (that is, included in the access token) that has been received by the P-GW 2040 from the UE 2010 through the PCO includes a domain name or a URI instead of IP address/port information, the P-GW 2040 may inspect a domain name system enquiry request transmitted by the UE 2010 or a response message thereto. If a requested domain name is included in the domain name or the URI list, which are included in the service flow descriptor, the P-GW 2040 may perform an operation of adding a responded IP address information (the IP address and, if necessary, an additional port number) to packet filters that identify the sponsored traffic (i.e., an SDF template of the PCC rule for the sponsored data service). To this end, the P-GW 2040 may add the packet filters without exchanging information with the PCRF 2050, or may transmit a request for adding the IP address information to the PCC rule of the sponsored data service, to the PCRF 2050.

The P-GW 2040 (PCEF) may begin to control charging and traffic according to the received PCC rule at operation S2019. Particularly, the sponsored data is charged for, by using not a general charging method but the received charging key. In the case where use of specific data is not allowed (e.g., when all of data services except for the sponsored data service are blocked), the PCEF 2050 may control traffic according to the gate status of the received PCC rule.

When the creation or correction of an EPS bearer is required due to the sponsored data service, the P-GW 2040 may trigger an operation for the same at operation S2021. In this operation, the packet filters created by the P-GW 2040 for the sponsored data service may be installed in the UE 2010. In the case where use of specific data is not allowed (e.g., when all of data services except for the sponsored data service are blocked), the UE 2010 may be installed with packet filters that are configured to allow packet transmission/reception for a specific IP flow as well.

The UE 2010 may use the web service in the sponsored data method at operation S2023. When information on the sponsored data service is received through the operation above, it may be displayed to the user.

The access token may include more detailed information for the sponsored data service in the various embodiments of the present disclosure. For example, the access token may include information on user grades. That is, the provided sponsored data service may be differentiated depending on the UE grades (or priority). To this end, the service provider may issue the access token to be different according to the service grades of users, and the UE that has received the access token may forward the same to the communication provider network. A core network node (P-GW) may separate user grades according to the access token. According to this, the properties (e.g., maximum allowed data usage, allowed time, charging method, and the like) of the sponsored data service may be differentiated. More specifically, for example, the sponsored data service may be given up to 1 GB to the UE of more than a predetermined grade, whereas it may be given up to 200 MB to the UE of less than the predetermined grade.

Although the charging of the sponsored data service is changed according to the agreement between the service provider and the communication network provider, and the activities of the user in the present specification and FIGS. 14 to 20, it is only an example for convenience of explanation and understanding of the invention, and the present invention is not limited thereto. In the present invention, the sponsored data and the policy for applying the same may include a traffic control that includes a QoS control, as well as the charging. That is, according to the various embodiments of the present invention, the user may be provided with the sponsored data service, and the sponsored data service may encompass the charging and provision of special QoS. For example, the sponsored data service enables the user to use a specific web service with the guaranteed QoS, compared to other services that do not adopt the sponsored data service or users who are not provided with the sponsored data service.

Although the access token, and the information related to the service and the sponsor (e.g., the sponsor ID, the ASP ID, the service flow descriptor, and the like) are separately transmitted in the present embodiments, the information related to the service and the sponsor may be encoded in the access token to be thereby transmitted.

When the user uses the sponsored data service, the sponsored data service is required to provide information on the sponsored data service to the user. For example, the user wishes to know the volume of data that is processed as the free sponsored data service among the data that he or she has transmitted/received. In the case of a conditional sponsored data service (e.g., the sponsored data service is limited to the total amount of data or service time), the user is likely to want to know information on the remaining time for the sponsored data service. Hereinafter, various methods for informing of the amount of data processed as the sponsored data service will be described.

Figure 21:
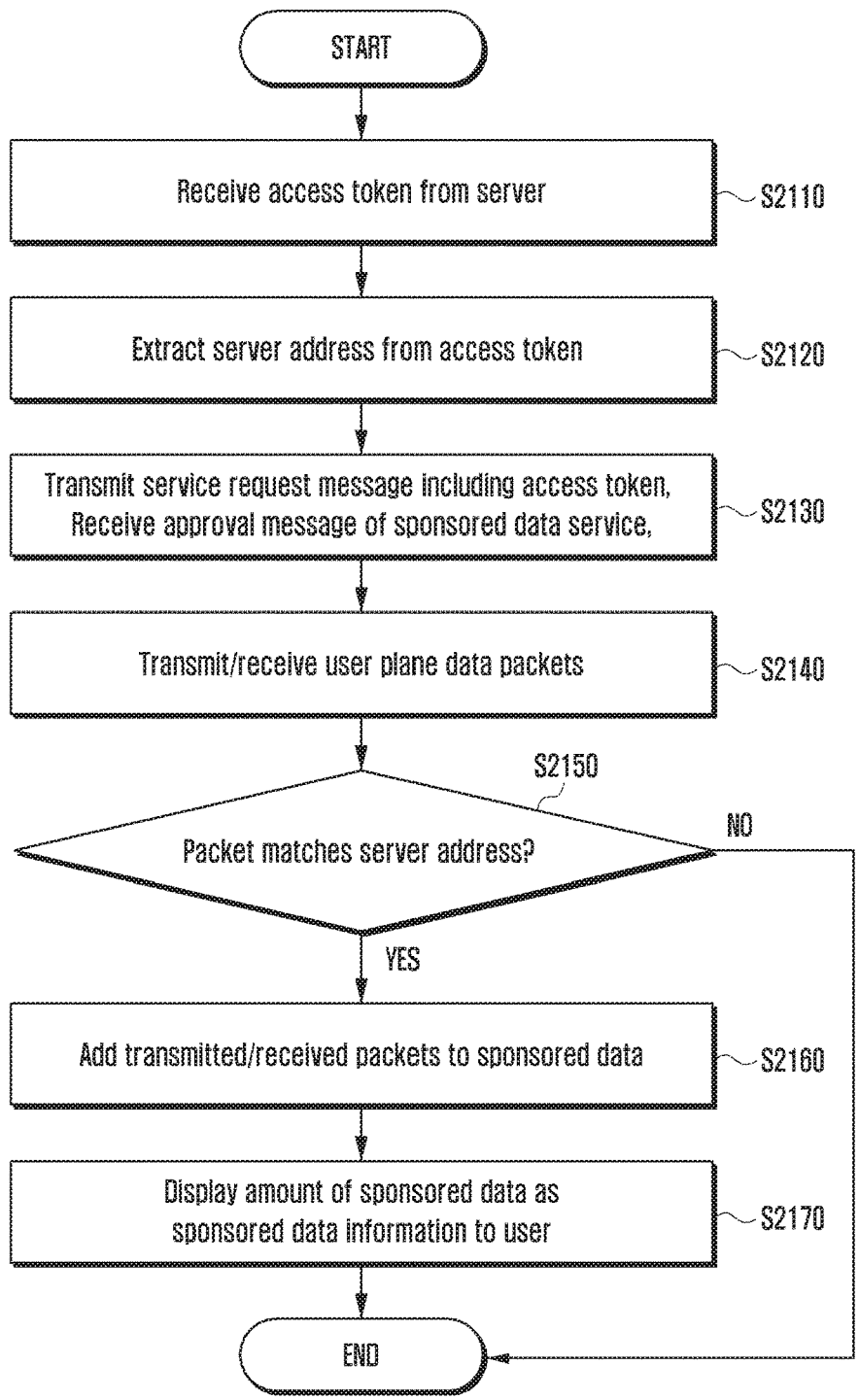
FIG. 21 illustrates a method for calculating a volume of data transmitted and received through a sponsored data service in the UE and informing a user of the volume of data according to an embodiment of the present disclosure.

FIG. 21 illustrates a method for calculating a volume of data transmitted and received through a sponsored data service in a UE and informing the user of a same according to an embodiment of the present disclosure. Packet filters may be installed for the sponsored data service in the UE. The packet filters are configured to allow packet transmission/reception for a specific IP flow as well, and the volume of data transmitted and received through the sponsored data service in the UE is calculated based on the operation of the packet filters.

Referring to FIG. 21, the UE provided with the sponsored data service may receive the access token for the sponsored data service from the server or the network entity at operation S2110. The access token may include at least one piece of information such as a sponsor ID of the sponsor provider, an ASP ID indicating service applications, an address (IP 5 tuple, or a uniform resource locator (URL) list) of the server providing the data service, creation data and time of the access token, a random number value, a key set ID for identifying a key used in security, an algorithm ID for identifying an algorithm used in security, and a message authentication code.

The UE may identify whether the data traffic transmitted and received by the UE corresponds to the sponsored data service, based on the information include in the access token. For example, the UE may extract identification information (e.g., a specific access point name (APN), a specific IP 5 tuple, a server URL, and the like) for identifying the traffic corresponding to the sponsored data service, i.e., an IP flow, from the received access token at operation S2120. The UE may store the extracted identification information. The UE may perform an operation of separating the traffic corresponding to the sponsored data service (that is, the traffic not to be charged) among the traffic transmitted and received by the UE, based on the extracted information. That is, the UE may identify the traffic corresponding to the sponsored data service, based on the extracted information.

The UE may transmit a service request message including the received access token to the provider network at operation S2130. The UE may get the approval message for the sponsored data service by a response to the message.

Although the UE extracts identification information for identifying the traffic corresponding to the sponsored data service form the received access token, and gets the approval message for the sponsored data service from the provider network in the embodiment above, the operations above may be performed in the opposite order, or may be modified. Particularly, if the validity of the access token received from the server cannot be identified, the UE may transmit the access token to the provider network to get the validity of the access token. Then, after approval for the sponsored data service, the UE may extract and store the service information included in the access token for use.

The UE may transmit or receive the user plane data packets to or from the provider network at operation S2140.

When the user plane data packets are transmitted or received, the UE may determine whether the user plane data packets are included in the traffic for the sponsored data service that has been stored before at operation S2150. The UE may determine whether or not the user traffic corresponds to the sponsored data service using the identification information extracted from the access token. The UE may determine whether or not the user traffic corresponds to the sponsored data service, based on the determination of whether the information included in the user plane data packet corresponds to the identification information. For example, the UE may identify whether or not the PDN connection or the EPS bearer context (e.g., APN, QCI/Address Resolution Protocol (ARP), and the like) included in the user plane data packets matches the identification information that has been extracted (or stored) to thereby determine whether the user traffic corresponds to the sponsored data service. In addition, the UE may identify whether some of or all of the IP address/port or the URL of the user plane data packets match the stored information to thereby determine whether the user traffic corresponds to the sponsored data service.

If the transmitted and received user plane data packets correspond to the sponsored data service traffic, the related user plane data packets may be managed as the traffic of the sponsored data service at operation S2160. For example, the UE may add the transmitted and received packets to the amount of sponsored data based on the packet filters. In addition to the method of adding the amount of traffic, the amount of service traffic may be managed by the UE in various ways. Although not described in the present disclosure, the initial value of the amount of sponsored data may be initiated or may be configured as a specific value when the sponsored data service is started. In addition, the traffic may be managed periodically at a predetermined time, or irregularly whenever the user plane data packets are created.

The UE may inform the user of the calculated volume of sponsored data (the amount of sponsored data) as information of the sponsored data service at operation S2170. The UE may output information on the amount of sponsored data service traffic. For example, the information on the amount of sponsored data service traffic includes total amount of sponsored data service traffic during a preconfigured period. The information may be expressed as graphs or numbers (e.g., by a byte unit). The information may be output by various output means, such as a voice, a vibration, sensors, and the like, as well as displaying the information on a screen of the UE.

Figure 22:
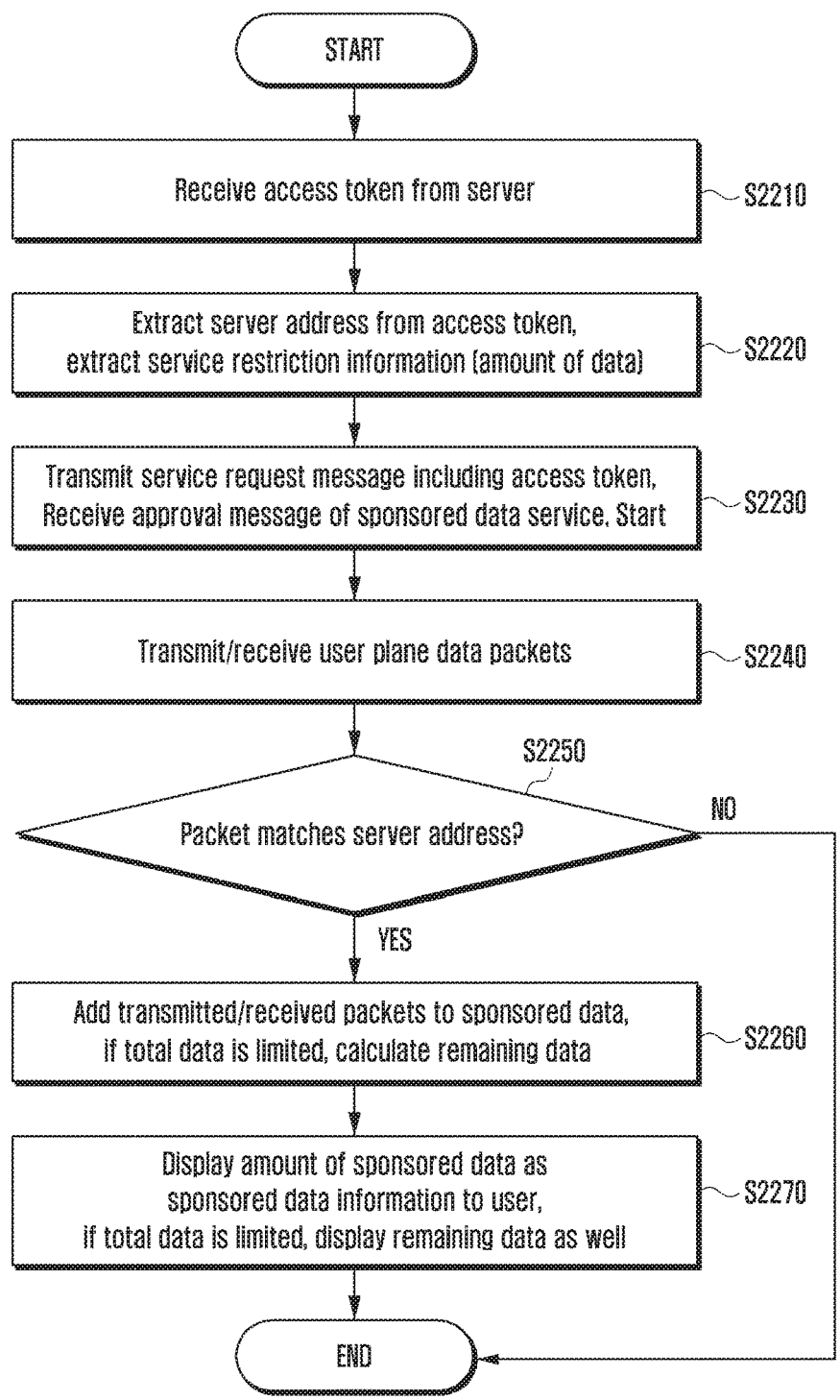
FIG. 22 illustrates an operation of a UE in a conditional sponsored data service according to an embodiment of the present disclosure.

FIG. 22 illustrates the operation of the UE in the conditional sponsored data service according to an embodiment of the present disclosure.

Referring to FIG. 22, the UE provided with the sponsored data service may receive the access token for the sponsored data service from the server or the network entity at operation S2210.

The UE may identify whether the data traffic transmitted and received by the UE corresponds to the sponsored data service, based on the information included in the access token. For example, the UE may extract identification information (e.g., a specific APN, a specific IP 5 tuple, a server URL, and the like) for identifying the traffic corresponding to the sponsored data service, i.e., an IP flow, from the received access token at operation S2220. The UE may store the extracted identification information. The UE may perform an operation of separating the traffic corresponding to the sponsored data service (that is, the traffic not to be charged) among the traffic transmitted and received by the UE, based on the extracted information. That is, the UE may identify the traffic corresponding to the sponsored data service, based on the extracted information. In addition, the UE may extract service restriction information (the maximum amount of data to which the sponsored data service is provided free of charge) from the access token. In addition, the UE may store the extracted service restriction information.

The UE may transmit a service request message including the received access token to the provider network at operation S2230. The UE may get the approval message for the sponsored data service by a response to the message.

Although the UE extracts identification information for identifying the traffic corresponding to the sponsored data service and the service restriction information from the received access token, and gets the approval message for the sponsored data service from the provider network in the embodiment above, the operations above may be performed in the opposite order, or may be modified. Particularly, if the validity of the access token received from the server cannot be identified, the UE may transmit the access token to the provider network to get the validity of the access token. Then, after approval for the sponsored data service, the UE may extract and store the service information included in the access token for use.

The UE may transmit or receive the user plane data packets to or from the provider network at operation S2240.

When the user plane data packets are transmitted or received, the UE may determine whether the user plane data packets are included in the traffic for the sponsored data service that has been stored before at operation S2250. The UE may determine whether or not the user traffic corresponds to the sponsored data service using the identification information extracted from the access token. The UE may determine whether or not the user traffic corresponds to the sponsored data service, based on whether the information included in the user plane data packet corresponds to the identification information. For example, the UE may identify whether or not the PDN connection or the EPS bearer context (e.g., APN, QCI/ARP, and the like) included in the user plane data packets matches the identification information that is extracted (or stored) to thereby determine whether the user traffic corresponds to the sponsored data service. In addition, the UE may identify whether some of or all of the IP address/port or the URL of the user plane data packets match the stored information to thereby determine whether the user traffic corresponds to the sponsored data service.

If the transmitted and received user plane data packets correspond to the sponsored data service traffic, the related user plane data packets may be managed as the traffic of the sponsored data service at operation S2260. For example, the UE may add the transmitted and received packets to the amount of sponsored data based on the packet filters. Although not described in the present disclosure, the initial value of the amount of sponsored data may be initiated or may be configured as a specific value when the sponsored data service is started. The amount of traffic may be managed in various manners as well as the adding method of the amount of traffic. When the total amount of sponsored data is limited, the UE may calculate the remaining amount of sponsored data. This may be obtained by subtracting the volume of sponsored data that has been transmitted and received until the present from the maximum amount of sponsored data. The traffic may be managed periodically at a predetermined time, or irregularly whenever the user plane data packets are created.

The UE may inform the user of the calculated volume of sponsored data (the amount of sponsored data) as information of the sponsored data service at operation S2270. The UE may output information on the amount of sponsored data service traffic. The information may be expressed as graphs, or numbers (e.g., by a byte unit). In addition, when the total amount of sponsored data is limited, the UE may inform the user of the remaining volume of sponsored data that has been calculated in the operation above as information on the sponsored data service. This information may be expressed as graphs, or numbers (e.g., by a byte unit).

Figure 23:
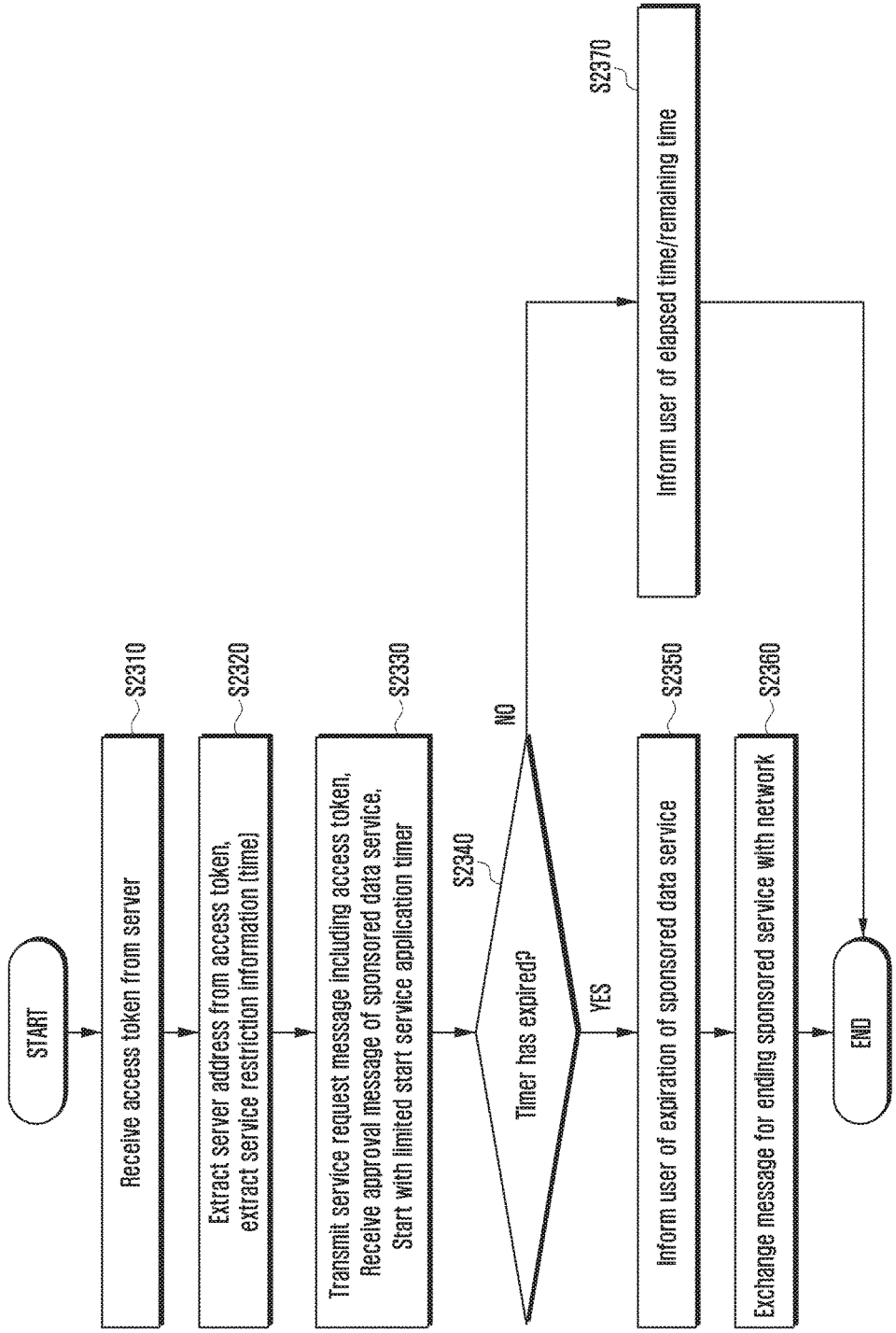
FIG. 23 illustrates an operation of a UE in a conditional sponsored data service according to an embodiment of the present disclosure.

FIG. 23 illustrates an operation of a UE in the conditional sponsored data service according to an embodiment of the present disclosure.

Referring to FIG. 23, the UE provided with the sponsored data service may receive the access token for the sponsored data service from the server or the network entity at operation S2310.

The UE may identify whether the data traffic transmitted and received by the UE corresponds to the sponsored data service, based on the information include in the access token. For example, the UE may extract identification information (e.g., a specific APN, a specific IP 5 tuple, a server URL, and the like) for identifying the traffic corresponding to the sponsored data service, i.e., an IP flow, from the received access token at operation S2320. The UE may store the extracted identification information. The UE may perform an operation of separating the traffic corresponding to the sponsored data service (that is, the traffic not to be charged) among the traffic transmitted and received by the UE, based on the extracted information. That is, the UE may identify the traffic corresponding to the sponsored data service, based on the extracted information. In addition, the UE may extract service restriction information (the maximum amount of data to which the sponsored data service is provided free of charge) from the access token. In addition, the UE may store the extracted service restriction information.

The UE may transmit a service request message including the received access token to the provider network at operation S2330. The UE may get the approval for the sponsored data service by a response to the message. The UE may trigger a timer for recording the time when the sponsored data service is provided to the user.

Although the UE extracts identification information for identifying the traffic corresponding to the sponsored data service and the service restriction information from the received access token, and gets the approval for the sponsored data service from the provider network in the embodiment above, the operations above may be performed in the opposite order, or may be modified. Particularly, if the validity of the access token received from the server cannot be identified, the UE may transmit the access token to the provider network to get the validity of the access token. Then, after approval for the sponsored data service, the UE may extract and store the service information included in the access token for use, and at this time, the timer may be triggered together. The timer relates to the allowed time of the sponsored data service for the UE. The sponsored data service may be provided free of charge if the timer does not has expired.

The UE may identify whether or not the timer has expired at operation S2340.

If the timer has expired, the UE may inform the user that the sponsored data service has been terminated due to the expiration of the timer at operation S2350.

In addition, the UE may selectively transmit a request message for ending the sponsored data service to the provider network at operation S2360. In addition, the UE may receive a response message informing that the sponsored data service has ended.

If the timer has not expired, the UE may inform the user of information on the remaining time for the sponsored data service at operation S2370. This information may be expressed by graphs or numbers (e.g., in hours, minutes, and seconds).

The various embodiments of FIGS. 21, 22, and 23 provide the method in which the UE extracts sponsored data service information (information for separating the traffic, the maximum volume, allowed time, and the like) included in the access token received from the server to use. The present disclosure is not limited thereto, and the UE may receive the sponsored data service information (information for separating the traffic, the maximum volume, allowed time, and the like) from the provider network instead of the access token for use.

Also the access token includes service information includes at least one of information on allowed amount of the sponsored service and information on allowed time of the sponsored service, and the output information includes at least one of information on remaining amount of the sponsored service based on the allowed amount and the calculated amount, and information on remaining time of the sponsored service based on the allowed time.

Figure 24:
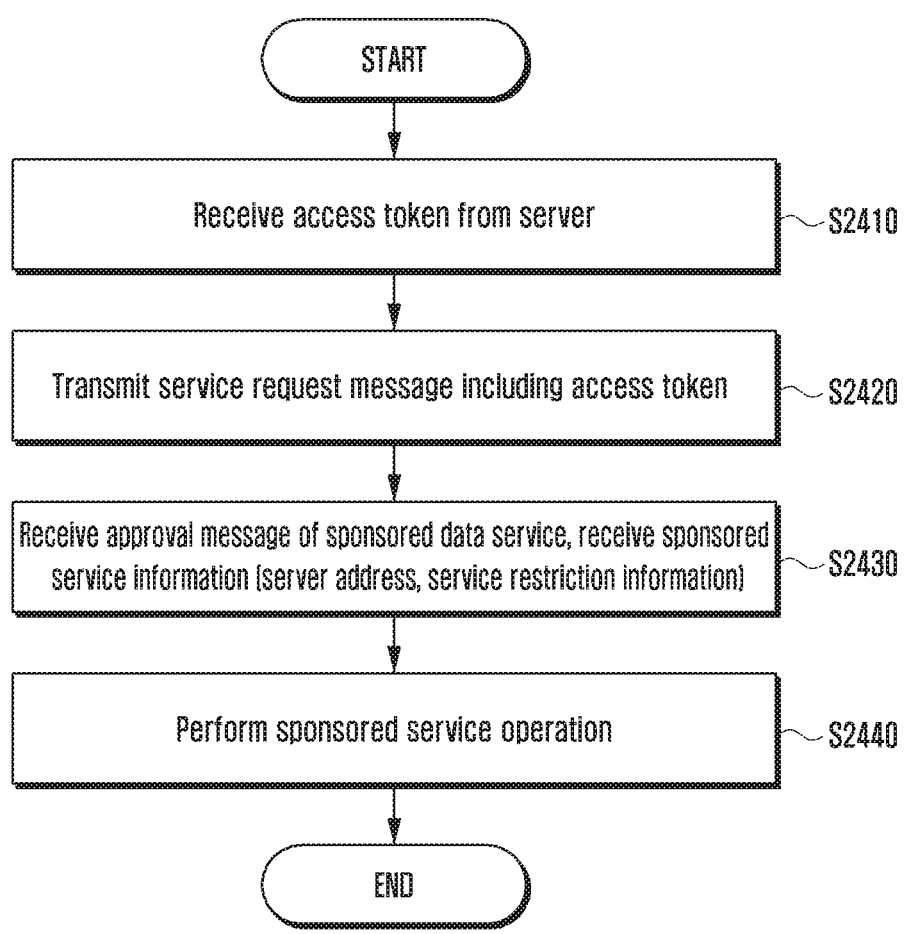
FIG. 24 illustrates a method by which a UE receives a sponsored data service information from a provider network for use according to an embodiment of the present disclosure.

FIG. 24 illustrates a method by which a UE receives a sponsored data service information from a provider network for use according to an embodiment of the present description.

Referring to FIG. 24, the UE provided with the sponsored data service may receive the access token for the sponsored data service from the server or the network entity at operation S2410.

The UE may transmit a service request message including the received access token to the provider network at operation S2420.

In response to the request, the UE may receive a message stating that the sponsored data service has been approved from the provider network at operation S2430. The message may include the sponsored data service information (that has been used in the various embodiments of FIGS. 21 to 23, more specifically, information for identifying the sponsored data service traffic, the maximum allowed volume of sponsored data, the application time of sponsored data service, and the like).

The UE may store the received information, and may perform the operation 2440 (i.e., the operation of identifying the amount of sponsored data by separating the sponsored data traffic, the operation of providing information to the user through limited time/volume, and the operation of making a request to the network for termination) of the various embodiments in FIGS. 21 to 23. The UE may perform the operations following operation S2150 of FIG. 21, based on the sponsored data service information (information for separating the sponsored data traffic). The UE may perform the operations following operation S2250 of FIG. 22, based on the sponsored data service information (information on the allowed volume of sponsored data). The UE may perform the operations following operation S2340 of FIG. 23, based on the sponsored data service information (information on the application time of sponsored data service).

The UE may make a request to the provider network for sponsored data service information (the volume of sponsored data traffic that has been transmitted and received until the present, or the remaining volume/time), and may receive the information to use without calculating or measuring the same. The UE may receive a message in response to the request message for the sponsored data service. The UE may output at least one piece of information on the volume of transmitted/received sponsored data traffic, information on the volume of available sponsored data traffic, and information on the application time of sponsored data service, based on the information included the response message.

Figure 25:
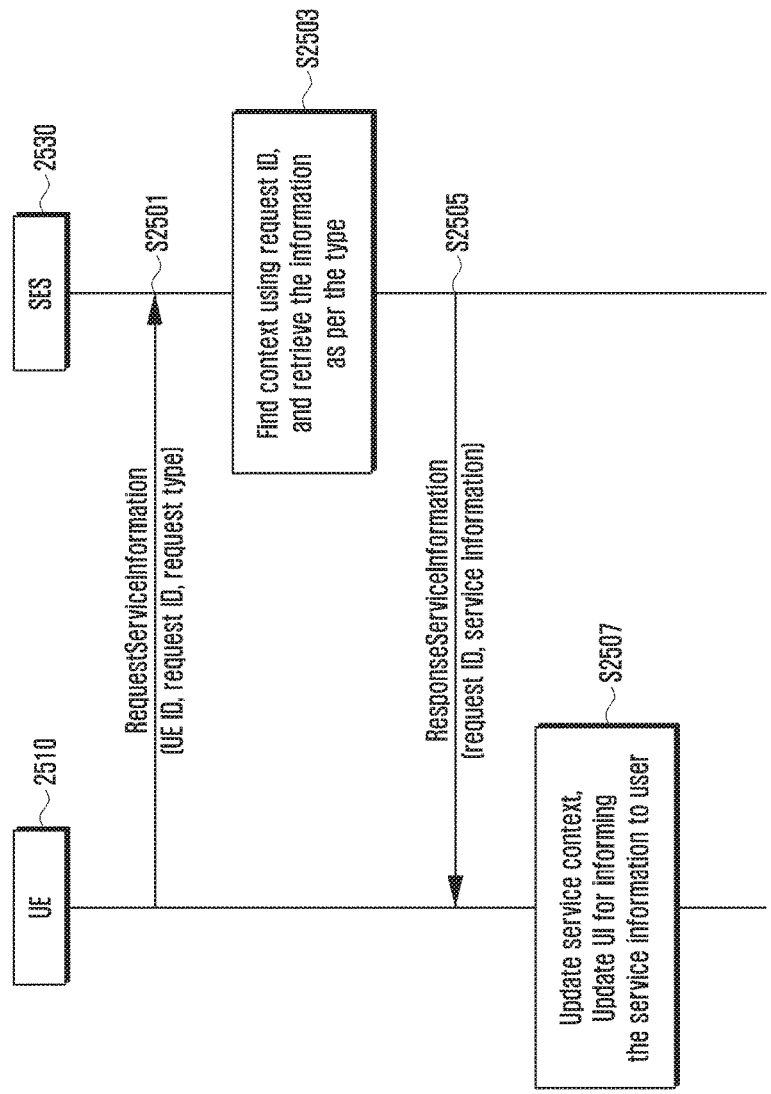
FIG. 25 illustrates a method by which a UE receives information on a sponsored data service in real time from a network for use according to an embodiment of the present disclosure.

FIG. 25 illustrates a method by which the UE receives information on the sponsored data service in real time from the network for use.

Referring to FIG. 25, a UE 2510 may performs the sponsored data service based on method described various embodiments of the present disclosure.

Referring to FIG. 25, a UE 2510 may transmit an information request message to figure out the current status of the sponsored data service (the volume of sponsored data traffic that has been transmitted and received until the present, the remaining volume, or the remaining time) to the provider network at operation S2501. The information request message may include at least one of a user ID, a sponsored data service ID, a request ID, a PLMN ID. The UE may request at least one piece of information on the volume of transmitted/received sponsored data traffic, information on the volume of available sponsored data traffic, and information on the application time of sponsored data service. The receiver of the request message may be an application function (AF) 2530, more specifically, an enhanced proxy-call session control function (eP-CSCF) or an SES.

In addition, the creation and transmission of the request message by the UE 2510 may be triggered by the operation of identifying the status information on the sponsored data service (i.e., executing applications for identifying the sponsored data service in the UE, pressing buttons/icons, or refreshing the status) by the user. Alternatively, the operation may be automatically performed every predetermined time configured in the UE 2510.

The message may be encoded using the HTTP protocol. Particularly, the message may include information stating that the AF 2530 of the provider network provides the sponsored data service to the UE 2510 in response to the request. Particularly, the information may be encoded using the SOAP protocol. In addition, the message may include at least one of a user ID, a sponsored data service ID, a request ID, a PLMN ID that has been obtained when requesting the sponsored data service at the beginning, or requested information (the amount of transmitted/received sponsored data until the present, the charge of the sponsored data service until the present, the remaining volume, the remaining time, and the like). The charge of the sponsored data service until the present means the charge that the sponsor (the third party) pays on behalf of the user through the sponsored data service.

The AF 2530 of the provider network that has received the request message may search for the sponsored data service information (the context) of the UE 2510 using at least one of the user ID, the UE ID, the service ID, or the request ID at operation S2503.

The AF 2530 may transmit a response message to the UE 2510 at operation S2505. The message may be encoded using the HTTP protocol. Particularly, the message may include information stating that the AF 2530 of the provider network provides the sponsored data service to the UE 2510 in response to the request. Particularly, the information may be encoded using the SOAP protocol. In addition, the message may include the sponsored data service ID, the request ID that has been obtained when requesting the sponsored data service at the beginning, or requested information (the amount of transmitted/received sponsored data until the present, the charge of the sponsored data service until the present, the remaining volume, the remaining time, and the like), which have been previously received.

The UE 2510 may renew the sponsored data service information on the user using the received message at operation S2507. In addition, the UE may inform the user of the renewed information. This operation may include displaying a pop-up window for informing of the current status of the sponsored data service (e.g., the amount of transmitted/received sponsored data until the present, the charge of the sponsored data service until the present, the remaining volume, the remaining time, and the like) on a screen, or refreshing a part of or all of a displayed image on the screen of the UE, which informs of the status of the sponsored data service.

Although the AF 2530 transmits the response message in operation S2503 in response to the request message transmitted by the UE 2510 in operation S2501, the AF 2530 may be configured to automatically transmit the information on the sponsored data service to the UE 2510 when a predetermined condition is satisfied. For example, period information, volume information of transmitted/received sponsored data service, sponsored charge information, or remaining volume information of the sponsored data service may be configured as a condition for triggering the transmission of information. The AF 2530 may transmit the information on the sponsored data service when the triggering condition is satisfied regardless of the request of the UE 2510. At this time, the triggering condition may be configured in the AF 2530 by the network operator, or may be configured according to a triggering condition setup request received from the UE 2510.

If one or more applications for the sponsored data service are installed in the UE, the UE may make a configuration for informing of the features of the sponsored data services.

Figure 26:
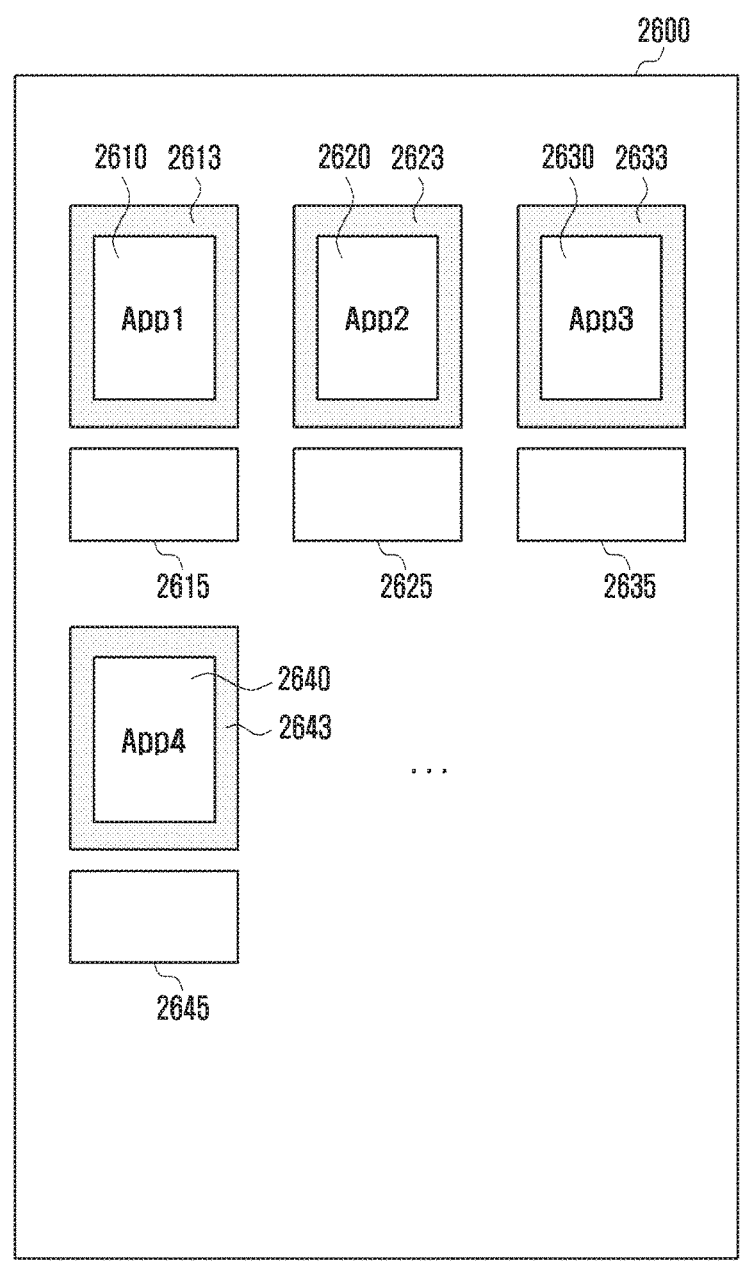
FIG. 26 illustrates an example of displaying features of a sponsored data services in a UE according to an embodiment of the present disclosure.

FIG. 26 illustrates an example of displaying features of a sponsored data services in a UE according to an embodiment of the present disclosure.

Referring to FIG. 26, the UE may include an output unit. The output unit may include various output means such as a display unit, a sound output unit, a vibration output unit, and the like. The output unit may be used for outputting the information on the sponsored data service. For example, the output unit may be a screen 2600 of the UE. The display unit of the UE may display sponsored data service applications (app). The display unit 2600 may display separate applications, a widget, or functions for showing information on the sponsored data service applications.

The display unit 2600 may display information on each sponsored data service application. The display unit 2600 may display at least one of the applications 2610, 2620, 2630, and 2640 related to the sponsored data service. The applications may be displayed by text, images, or icons. The sponsored data service applications may be pre-loaded in the UE.

The display unit 2600 of the UE may display a plurality of applications. According to an embodiment of the present disclosure, the UE may display the sponsored data service applications to be distinct from general applications. For example, indicators showing the sponsored data service applications may be displayed. In addition, the transparency or the size of the sponsored data service application may be different from the general applications. In addition, the sponsored data service applications may be displayed at a predetermined position. The predetermined position may be a position on the display unit, or a predetermined folder path. The information for separating the sponsored data service applications from the general applications may be configured by the UE or the network provider for providing the service. In addition, the sponsored data service applications and the general applications may be separated from each other using identification information showing features of the sponsored data service applications as described below. The network entity for supporting the sponsored data service may transmit the identification-related information to the UE to thereby display the same. The UE may display the ID by the configuration in the UE or based on the identification-related information received from the network entity.

In addition, the display unit 2600 may display the identification information 2613, 2623, 2633, and 2643 showing the features of the sponsored data service applications. The identification information showing the features of the applications may be always displayed on the display unit 2600, or may be additionally displayed by a user input. In the case of displaying the identification information by the user input, the identification information may be displayed for a predetermined amount of time, and then may disappear. The features of the sponsored data service application may include a rating of the sponsored data service, or current user grades of the sponsored data service. Information for identifying a rating of the sponsored data service or user grades may be displayed according to the application features. For example, identification information may be displayed using colors, images, icons, text, and the like. In the case of colors, the rating of the sponsored data service or the grades may be displayed in different colors. For example, a high rating of service may be displayed in a gold color, and the next may be displayed in a silver color. Alternatively, the rating of the sponsored data service or the grades may be displayed by separate images or icons. For example, a high rating of service may be displayed as "No. 1," and the next may be displayed as "No. 2." The sponsored data service applications may be arranged according to the features instead of displaying the identification information. For example, the sponsored data service applications may be displayed to be arranged according to the ratings or the grades on the display unit 2600. The sponsored data service applications may be arranged periodically in a predetermined period, or may be arranged upon the receipt of a user request. The UE may transmit an identification information request message to the network entity for supporting the sponsored data service.

The network entity that has received the identification information request message may transmit a response message including the identification information to the UE. The UE may display the identification information on the features of the sponsored data service applications in colors, icons, images, or text, based on the identification information received from the network entity.

Each sponsored data service application may have status information 2615, 2625, 2635, and 2645. The status information may refer to the information showing the current service status for the user. The service status may include at least one of the volume of sponsored data traffic that has been transmitted and received until the present, the sponsored charge until the present, the remaining volume, or the remaining time, as described above. In addition, the status information may include the grade, or the service level/class information, which have been obtained by the user in the corresponding sponsored data service. Such information may be expressed as numbers, text, graphs, images, or icons. The status information may be always displayed on the display unit 2600, or may be additionally displayed by the user input. In the case of displaying the status information by the user input, the status information may be displayed for a predetermined amount of time, and then may disappear. In addition, the status information may be displayed to be enlarged by the user input. For example, when at least one application is selected from among a plurality of sponsored data service applications, the status information corresponding to the selected application may be displayed to be enlarged, and the detailed information thereof, which has not been displayed due to the limitation of space, may be additionally displayed. The status information may provide statistical information on the use of the sponsored data service until the present as well as the current status information on the sponsored data service used by the UE. In order to display such status information, the UE may receive the status information from the network entity of the sponsored data service.

In the various embodiments of the present disclosure, although the access token is transmitted from the server (the web server or WWSF) to the UE, the UE may create the access token itself. That is, the operation of receiving the access token from the server may be replaced with the operation of obtaining information (element of the access token set forth above) for creating the access token, and afterwards, the UE may create the access token to be thereby transmitted to the provider network for the sponsored data service.

Although various embodiments of the present disclosure have been shown and described in this specification and the drawings, they are used in general sense in order to easily explain technical contents of the present disclosure, and to help comprehension of the present disclosure, and are not intended to limit the scope of the present disclosure. It is obvious to those skilled in the art to which the present disclosure pertains that other modified embodiments on the basis of the spirits of the present disclosure besides the embodiments disclosed herein may be carried out.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A terminal in a wireless communication system, the terminal comprising:
   a transceiver configured to transmit and receive a signal; and
   at least one processor configured to:
      transmit a public land mobile network identifier (PLMN ID) for a sponsored service, to a first server,
      receive a token related to the sponsored service from the first server,
      transmit a sponsored service request message based on the token, to a second server,
      receive authentication information from the second server, and
      display at least one of information on an identified amount of at least one of a packet transmission or a packet reception for the sponsored service, or information on remaining amount for the sponsored service based on allowed amount for the sponsored service and the identified amount.

2. The terminal of claim 1,
   wherein the at least one processor is further configured to configure a packet filter for the sponsored service, and
   wherein the amount of the at least one of the packet transmission or the packet reception for the sponsored service is identified based on the packet filter.

3. The terminal of claim 1, wherein the at least one processor is further configured to identify the amount of at least one of the packet transmission or a packet reception for the sponsored service.

4. The terminal of claim 1, wherein the token includes at least one of the allowed amount for the sponsored service or allowed time for the sponsored service.

5. The terminal of claim 1, wherein the at least one processor is further configured to display at least one of information on identified time of the at least one of the packet transmission or the packet reception or information on remaining time for the sponsored service based on allowed time for the sponsored service and identified time.

6. The terminal of claim 1,
   wherein the at least one processor is further configured to display at least two applications related to each of at least two sponsored services, and
   wherein the application includes status information corresponding to the each of the sponsored services.

7. The terminal of claim 1, wherein the sponsored service is a specific service that a service provider pays charge of a traffic between the terminal and the service provider to a network operator.

8. A server in a wireless communication system, the server comprising:
   a transceiver configured to transmit and receive a packet; and
   at least one processor configured to:
      store a token related to a sponsored service, the token corresponding to a public land mobile network identifier (PLMN ID) of a network operator,
      receive a sponsored service request message from a terminal,
      determine whether the terminal is authorized to use the sponsored service based on the token and the sponsored service request message, and
      transmit authentication information indicating whether the terminal is authorized to use the sponsored service to the terminal,
   wherein an amount of at least one of a packet transmission or a packet reception for the sponsored service is identified by the terminal, and
   wherein at least one of information on the identified amount or information on remaining amount for the sponsored service based on allowed amount for the sponsored service and the identified amount is displayed by the terminal.

9. The server of claim 8, wherein the sponsored service is a specific service that the service provider pays charge for a traffic between the terminal and a service provider to the network operator.

10. The server of claim 8, wherein the token includes at least one of the allowed amount for the sponsored service or allowed time for the sponsored service.

11. A method by a terminal in a wireless communication system, the method comprising:
transmitting a public land mobile network identifier (PLMN ID) for a sponsored service, to a first server;
receiving a token related to the sponsored service from the first server;
transmitting a sponsored service request message based on the token, to a second server;
receiving authentication information from the second server; and
displaying at least one of information on an identified amount or information on remaining amount for the sponsored service based on allowed amount for the sponsored service and the identified amount.

12. The method of claim 11, further comprising:
configuring a packet filter for the sponsored service,
wherein the amount of the at least one of the packet transmission or the packet reception for the sponsored service is identified based on the packet filter.

13. The method of claim 11, further comprising identifying the amount of at least one of the packet transmission or a packet reception for the sponsored service.

14. The method of claim 11, wherein the token includes at least one of the allowed amount for the sponsored service or allowed time for the sponsored service.

15. The method of claim 11, further comprising:
displaying at least one of information on identified time of the at least one of the packet transmission or the packet reception or information on remaining time for the sponsored service based on allowed time for the sponsored service and identified time.

16. The method of claim 11, further comprising:
displaying at least two applications related to each of at least two sponsored services,
wherein the application includes status information corresponding to the each of the sponsored services.

17. The method of claim 11, wherein the sponsored service is a specific service that a service provider pays charge of a traffic between the terminal and the service provider to a network operator.

18. A method by a server in a wireless communication system, the method comprising:
storing a token related to a sponsored service, the token corresponding to a public land mobile network identifier (PLMN ID) of a network operator;
receiving a sponsored service request message from a terminal;
determining whether the terminal is authorized to use the sponsored service based on the token and the sponsored service request message; and
transmitting authentication information indicating whether the terminal is authorized to use the sponsored service to the terminal,
wherein an amount of at least one of a packet transmission or a packet reception for the sponsored service is identified by the terminal, and
wherein at least one of information on the identified amount or information on remaining amount for the sponsored service based on allowed amount for the sponsored service and the identified amount is displayed by the terminal.

19. The method of claim 18, wherein the sponsored service is a specific service that the service provider pays a charge of for traffic between the terminal and the service provider to the network operator.

20. The method of claim 18, wherein the token includes at least one of the allowed amount for the sponsored service or allowed time for the sponsored service.

* * * * *